United States Patent
Turney et al.

(10) Patent No.: US 10,146,237 B2
(45) Date of Patent: Dec. 4, 2018

(54) SMART THERMOSTAT WITH MODEL PREDICTIVE CONTROL

(71) Applicant: Johnson Controls Technology Company, Plymouth, MI (US)

(72) Inventors: Robert D. Turney, Watertown, WI (US); Matthew J. Ellis, Milwaukee, WI (US); Michael J. Wenzel, Grafton, WI (US); Mohammad N. Elbsat, Milwaukee, WI (US); Juan Esteban Tapiero Bernal, Wauwatosa, WI (US); Brennan H. Fentzlaff, Oconomowoc, WI (US)

(73) Assignee: Johnson Controls Technology Company, Auburn Hills, MI (US)

(*) Notice: Subject to any disclaimer, the term of this patent is extended or adjusted under 35 U.S.C. 154(b) by 0 days.

(21) Appl. No.: 15/625,830

(22) Filed: Jun. 16, 2017

(65) Prior Publication Data

US 2018/0313557 A1    Nov. 1, 2018

Related U.S. Application Data

(60) Provisional application No. 62/491,545, filed on Apr. 28, 2017.

(51) Int. Cl.
  G05D 23/19 (2006.01)
  G05B 19/048 (2006.01)
  (Continued)

(52) U.S. Cl.
  CPC ......... *G05D 23/1904* (2013.01); *F24F 11/30* (2018.01); *F24F 11/62* (2018.01);
  (Continued)

(58) Field of Classification Search
  CPC ...... F24F 11/001; F24F 11/006; F24F 1/0012; F24F 11/0047; F24F 2011/0061;
  (Continued)

(56) References Cited

U.S. PATENT DOCUMENTS 5,456,870 A * 10/1995 Bulgrin .................. B29C 45/76
                                              264/211.21
6,216,956 B1 * 4/2001 Ehlers ..................... F24F 11/006
                                              236/47
(Continued)

FOREIGN PATENT DOCUMENTS

| WO | WO-2011/072332 A1 | 6/2011 |
| WO | WO-2014/055059 A1 | 4/2014 |
| WO | WO-2015/071654 A1 | 5/2015 |

OTHER PUBLICATIONS

U.S. Appl. No. 13/802,154, filed Mar. 13, 2013, Johnson Controls Technology Company.
(Continued)

*Primary Examiner* — Crystal J Barnes-Bullock
(74) *Attorney, Agent, or Firm* — Foley & Lardner LLP

(57) ABSTRACT

A thermostat includes an equipment controller and a model predictive controller. The equipment controller is configured to drive the temperature of a building zone to an optimal temperature setpoint by operating HVAC equipment to provide heating or cooling to the building zone. The model predictive controller is configured to determine the optimal temperature setpoint by generating a cost function that accounts for a cost operating the HVAC equipment during each of a plurality of time steps in an optimization period, using a predictive model to predict the temperature of the building zone during each of the plurality of time steps, and optimizing the cost function subject to a constraint on the
(Continued)

predicted temperature of the building zone to determine optimal temperature setpoints for each of the time steps.

18 Claims, 10 Drawing Sheets

(51) Int. Cl.
*G05B 19/042* (2006.01)
*F24F 11/30* (2018.01)
*F24F 11/62* (2018.01)
*F24F 110/10* (2018.01)
*F24F 110/12* (2018.01)
*F24F 140/50* (2018.01)
*F24F 11/46* (2018.01)
*F24F 11/65* (2018.01)
*F24F 140/60* (2018.01)

(52) U.S. Cl.
CPC ....... *G05B 19/048* (2013.01); *G05B 19/0426* (2013.01); *G05D 23/1923* (2013.01); *F24F 11/46* (2018.01); *F24F 11/65* (2018.01); *F24F 2110/10* (2018.01); *F24F 2110/12* (2018.01); *F24F 2140/50* (2018.01); *F24F 2140/60* (2018.01); *G05B 2219/2614* (2013.01)

(58) Field of Classification Search
CPC ....... F24F 2011/0067; F24F 2011/0075; F24F 11/46; F24F 11/47; F24F 11/62; F24F 11/63; F24F 2110/10; G06Q 10/04; G06Q 10/06; G06Q 50/06; G06F 17/5009; G05D 23/1904; G05D 23/1917; G05D 23/1923; G05B 13/04; G05B 2219/2642; G05B 2219/2614; H02J 2003/003; H02J 2003/007

See application file for complete search history.

(56) References Cited

U.S. PATENT DOCUMENTS

| | | | |
|---|---|---|---|
| 9,235,657 B1 | 1/2016 | Wenzel et al. | |
| 9,429,921 B2* | 8/2016 | Lu | G06N 3/126 |
| 9,436,179 B1 | 9/2016 | Turney et al. | |
| 9,651,929 B2* | 5/2017 | Horesh | G05B 17/02 |
| 9,982,903 B1* | 5/2018 | Ridder | F24F 11/30 |
| 2012/0054125 A1* | 3/2012 | Clifton | G05B 15/02 |
| | | | 705/412 |
| 2013/0013121 A1* | 1/2013 | Henze | G06Q 10/04 |
| | | | 700/291 |
| 2013/0179373 A1* | 7/2013 | Mutchnik | G06O 30/0283 |
| | | | 705/412 |
| 2013/0274940 A1* | 10/2013 | Wei | G05B 19/02 |
| | | | 700/291 |
| 2014/0052300 A1* | 2/2014 | Matsuoka | G05D 23/1917 |
| | | | 700/276 |
| 2014/0074542 A1* | 3/2014 | Edens | G06Q 50/06 |
| | | | 705/7.25 |
| 2015/0057820 A1* | 2/2015 | Kefayati | G06Q 50/06 |
| | | | 700/291 |
| 2015/0134124 A1* | 5/2015 | Carter | G05D 23/1923 |
| | | | 700/278 |
| 2015/0316907 A1 | 11/2015 | Elbsat et al. | |
| 2016/0327298 A1 | 11/2016 | Sinha et al. | |
| 2016/0327302 A1 | 11/2016 | Ribbich et al. | |
| 2016/0327921 A1 | 11/2016 | Ribbich et al. | |
| 2017/0030598 A1* | 2/2017 | Burns | F24F 3/065 |
| 2017/0059187 A1* | 3/2017 | Smith, Jr. | F24D 19/109 |
| 2017/0122613 A1 | 5/2017 | Sinha et al. | |
| 2017/0123391 A1 | 5/2017 | Sinha et al. | |
| 2017/0211829 A1* | 7/2017 | Slack | F24D 12/00 |
| 2017/0211837 A1* | 7/2017 | Gupta | G05B 13/04 |
| 2017/0211862 A1* | 7/2017 | Slack | F24D 12/00 |

OTHER PUBLICATIONS

U.S. Appl. No. 15/146,202, filed May 4, 2016, Johnson Controls Technology Company.
U.S. Appl. No. 15/146,649, filed May 4, 2016, Johnson Controls Technology Company.
U.S. Appl. No. 15/146,749, filed May 4, 2016, Johnson Controls Technology Company.
U.S. Appl. No. 15/298,191, filed Oct. 19, 2016, Johnson Controls Technology Company.
U.S. Appl. No. 15/336,789, filed Oct. 28, 2016, Johnson Controls Technology Company.
U.S. Appl. No. 15/336,791, filed Oct. 28, 2016, Johnson Controls Technology Company.
U.S. Appl. No. 15/336,792, filed Oct. 28, 2016, Johnson Controls Technology Company.
U.S. Appl. No. 15/338,215, filed Oct. 28, 2016, Johnson Controls Technology Company.
U.S. Appl. No. 15/338,221, filed Oct. 28, 2016, Johnson Controls Technology Company.
U.S. Appl. No. 15/405,234, filed Jan. 12, 2017, Johnson Controls Technology Company.
U.S. Appl. No. 15/405,236, filed Jan. 12, 2017, Johnson Controls Technology Company.
U.S. Appl. No. 15/426,962, filed Feb. 7, 2017, Johnson Controls Technology Company.
U.S. Appl. No. 15/473,496, filed Mar. 29, 2017, Johnson Controls Technology Company.
U.S. Appl. No. 15/616,616, Jun. 7, 2017, Johnson Controls Technology Company.
U.S. Appl. No. 62/331,863, filed May 4, 2016, Johnson Controls Technology Company.
U.S. Appl. No. 62/352,955, filed Jun. 21, 2016, Johnson Controls Technology Company.
U.S. Appl. No. 62/446,296, filed Jan. 13, 2017, Johnson Controls Technology Company.
International Search Report and Written Opinion on International Application No. PCT/US2018/022925 dated Jun. 25, 2018. 14 pages.

* cited by examiner

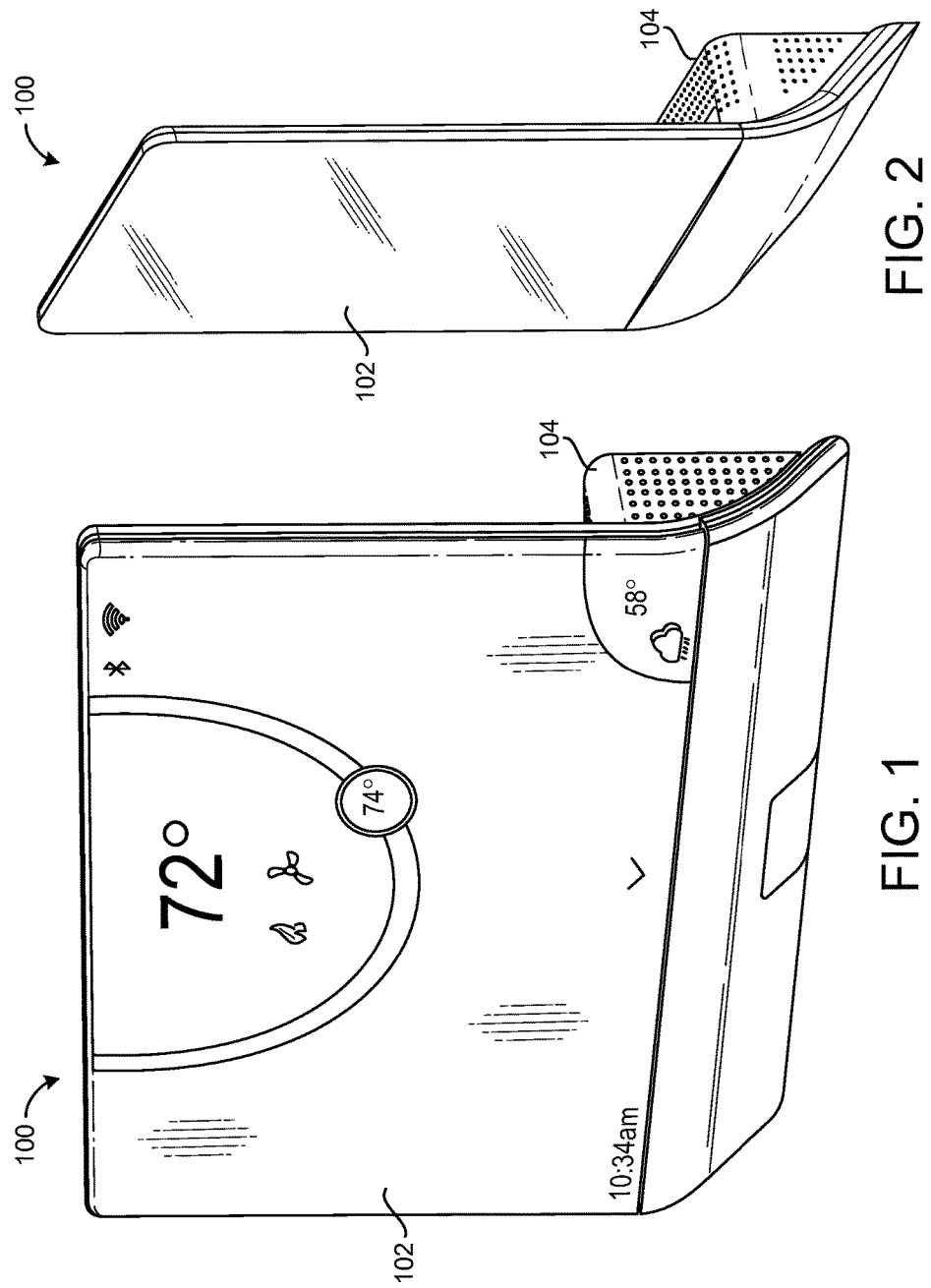

SMART THERMOSTAT WITH MODEL PREDICTIVE CONTROL

CROSS-REFERENCE TO RELATED PATENT APPLICATION

This application claims the benefit of and priority to U.S. Provisional Patent Application No. 62/491,545 filed Apr. 28, 2017, the entire disclosure of which is incorporated by reference herein.

BACKGROUND

The present disclosure relates generally to a smart thermostat and more particularly to a smart thermostat with model predictive control. Thermostats are often configured to monitor and control the temperature of a building zone or other space. For example, a thermostat can be mounted on a wall within the building zone and configured to measure the temperature of the building zone. Thermostats typically send commands to HVAC equipment (e.g., on/off commands, heating/cooling commands, etc.) to cause the HVAC equipment to affect the temperature of the building zone.

Conventional thermostats operate according to a fixed temperature setpoint schedule which defines the temperature setpoints for the thermostat at various times. The temperature setpoint schedule is typically set by a user via a local user interface on the thermostat. In many implementations, a fixed temperature setpoint schedule leads to suboptimal control of the HVAC equipment, which can increase the cost of heating/cooling the building zone. It would be desirable to automatically determine optimal temperature setpoints for a thermostat in order to take advantage of time-varying energy prices, zone heat transfer characteristics, and/or other factors that can affect the cost of heating/cooling the building zone.

SUMMARY

One implementation of the present disclosure is a thermostat for monitoring and controlling temperature of a building zone. The thermostat includes an equipment controller and a model predictive controller. The equipment controller is configured to drive the temperature of the building zone to an optimal temperature setpoint by operating HVAC equipment to provide heating or cooling to the building zone. The model predictive controller is configured to determine the optimal temperature setpoint by generating a cost function that accounts for a cost operating the HVAC equipment during each of a plurality of time steps in an optimization period, using a predictive model to predict the temperature of the building zone during each of the plurality of time steps, and optimizing the cost function subject to a constraint on the predicted temperature of the building zone to determine optimal temperature setpoints for each of the plurality of time steps.

In some embodiments, the model predictive controller is configured to determine the cost of operating the HVAC equipment during each of the plurality of time steps using a set of time-varying utility rates comprising a utility rate value for each time step. The time-varying utility rates may be received from a utility provider or predicted by the model predictive controller.

In some embodiments, the model predictive controller is configured to predict the temperature of the building zone during each of the plurality of time steps as a function of a temperature setpoint trajectory comprising a temperature setpoint for each of the plurality of time steps.

In some embodiments, the model predictive controller is configured to optimize the cost function subject to a constraint on the optimal temperature setpoints that limits the optimal temperature setpoints within a temperature setpoint range.

In some embodiments, the model predictive controller is configured to generate the predictive model by performing a system identification process. The system identification process may include modulating the temperature setpoint within a constrained temperature setpoint range, collecting a set of input-output data, and fitting parameters of the predictive model to the set of input-output data. The input-output data may include values of the temperature setpoint and values of the temperature of the building zone that result from modulating the temperature setpoint during each of a plurality of time steps during a learning period.

In some embodiments, the predictive model includes a thermal mass storage model that defines the temperature of the building zone as a function of at least one of heat transfer between air within the building zone and solid mass within the building zone, heat transfer between the building zone and the HVAC equipment, and an unmeasured heat load disturbance. In some embodiments, the model predictive controller is configured to predict a value of the unmeasured heat load disturbance experienced by the building zone at each of the plurality of time steps in the optimization period.

In some embodiments, the predictive model includes an HVAC load model that defines the heating or cooling provided by the HVAC equipment as a function of the temperature of the building zone and the temperature setpoint.

In some embodiments, the model predictive controller is configured to predict the cost of operating the HVAC equipment as a function of an amount of the heating or cooling provided by the HVAC equipment at each time step of the optimization period.

In some embodiments, the constraint on the predicted temperature of the building zone requires the model predictive controller to maintain the predicted temperature of the building zone within a first zone temperature range during a first time step of the optimization period and within a second zone temperature range, different from the first zone temperature range, during another time step of the optimization period subsequent to the first time step.

Another implementation of the present disclosure is a method performed by a thermostat for a building zone for monitoring and controlling temperature of the building zone. The method includes generating a cost function that accounts for a cost operating HVAC equipment during each of a plurality of time steps in an optimization period, using a predictive model to predict the temperature of the building zone during each of the plurality of time steps, optimizing the cost function subject to a constraint on the predicted temperature of the building zone to determine optimal temperature setpoints for each of the plurality of time steps, and operating HVAC equipment to provide heating or cooling to the building zone to drive the temperature of the building zone to the optimal temperature setpoints.

In some embodiments, the method includes receiving a set of time-varying utility rates from a utility provider or predicting the time-varying utility rates. The set of time-varying utility rates may include a utility rate value for each time step. The method may include determining the cost of operating the HVAC equipment during each of the plurality of time steps using the set of time-varying utility rates.

In some embodiments, using the predictive model to predict the temperature of the building zone includes predicting the temperature of the building zone during each of the plurality of time steps as a function of a temperature setpoint trajectory that includes a temperature setpoint for each of the plurality of time steps.

In some embodiments, optimizing the cost function includes optimizing the cost function subject to a constraint on the optimal temperature setpoints that limits the optimal temperature setpoints within a temperature setpoint range.

In some embodiments, the method includes generating the predictive model by performing a system identification process. The system identification process may include modulating the temperature setpoint within a constrained temperature setpoint range, collecting a set of input-output data, and fitting parameters of the predictive model to the set of input-output data. The input-output data include values of the temperature setpoint and values of the temperature of the building zone that result from modulating the temperature setpoint during each of a plurality of time steps during a learning period.

In some embodiments, the predictive model includes a thermal mass storage model that defines the temperature of the building zone as a function of at least one of heat transfer between air within the building zone and solid mass within the building zone, heat transfer between the building zone and the HVAC equipment, and an unmeasured heat load disturbance. In some embodiments, the method includes predicting a value of the unmeasured heat load disturbance experienced by the building zone at each of the plurality of time steps in the optimization period.

In some embodiments, the predictive model includes an HVAC load model that defines the heating or cooling provided by the HVAC equipment as a function of the temperature of the building zone and the temperature setpoint.

In some embodiments, the method includes predicting the cost of operating the HVAC equipment as a function of an amount of the heating or cooling provided by the HVAC equipment at each time step of the optimization period.

Another implementation of the present disclosure is a thermostat for monitoring and controlling temperature of a building zone. The thermostat includes an equipment controller and a model predictive controller. The equipment controller is configured to drive the temperature of the building zone to a zone temperature setpoint by operating HVAC equipment to provide heating or cooling to the building zone. The model predictive controller is configured to determine the zone temperature setpoint by generating a cost function that accounts for a cost operating the HVAC equipment during each of a plurality of time steps in an optimization period, using a predictive model to predict the temperature of the building zone during each of the plurality of time steps, and performing an optimization of the cost function subject to a constraint on the predicted temperature of the building zone to determine a temperature setpoint trajectory including a temperature setpoint value for each of the plurality of time steps.

Another implementation of the present disclosure is a model predictive control system for monitoring and controlling temperature of a building zone. The model predictive control system includes a thermostat and a model predictive controller. The thermostat is configured to drive the temperature of the building zone to an optimal temperature setpoint by operating HVAC equipment to provide heating or cooling to the building zone. The model predictive controller is configured to determine the optimal temperature setpoint and provide the optimal temperature setpoint to the thermostat via a communications network. The model predictive controller determines the optimal temperature setpoint by generating a cost function that accounts for a cost operating the HVAC equipment during each of a plurality of time steps in an optimization period, using a predictive model to predict the temperature of the building zone during each of the plurality of time steps, and optimizing the cost function subject to a constraint on the predicted temperature of the building zone to determine optimal temperature setpoints for each of the plurality of time steps.

In some embodiments, the model predictive controller is configured to determine the cost of operating the HVAC equipment during each of the plurality of time steps using a set of time-varying utility rates that includes a utility rate value for each time step. The time-varying utility rates may be received from a utility provider or predicted by the model predictive controller.

In some embodiments, the model predictive controller is configured to predict the temperature of the building zone during each of the plurality of time steps as a function of a temperature setpoint trajectory comprising a temperature setpoint for each of the plurality of time steps.

In some embodiments, the model predictive controller is configured to optimize the cost function subject to a constraint on the optimal temperature setpoints that limits the optimal temperature setpoints within a temperature setpoint range.

In some embodiments, the model predictive controller is configured to generate the predictive model by performing a system identification process. The system identification process may include modulating the temperature setpoint within a constrained temperature setpoint range, collecting a set of input-output data, and fitting parameters of the predictive model to the set of input-output data. The input-output data may include values of the temperature setpoint and values of the temperature of the building zone that result from modulating the temperature setpoint during each of a plurality of time steps during a learning period.

In some embodiments, the predictive model includes a thermal mass storage model that defines the temperature of the building zone as a function of at least one of heat transfer between air within the building zone and solid mass within the building zone, heat transfer between the building zone and the HVAC equipment, and an unmeasured heat load disturbance. In some embodiments, the model predictive controller is configured to predict a value of the unmeasured heat load disturbance experienced by the building zone at each of the plurality of time steps in the optimization period.

In some embodiments, the predictive model includes an HVAC load model that defines the heating or cooling provided by the HVAC equipment as a function of the temperature of the building zone and the temperature setpoint.

In some embodiments, the model predictive controller is configured to predict the cost of operating the HVAC equipment as a function of an amount of the heating or cooling provided by the HVAC equipment at each time step of the optimization period.

In some embodiments, the constraint on the predicted temperature of the building zone requires the model predictive controller to maintain the predicted temperature of the building zone within a first zone temperature range during a first time step of the optimization period and within a second zone temperature range, different from the first zone temperature range, during another time step of the optimization period subsequent to the first time step.

Another implementation of the present disclosure is a method for monitoring and controlling temperature of a building zone. The method includes generating a cost function that accounts for a cost operating HVAC equipment during each of a plurality of time steps in an optimization period, using a predictive model to predict the temperature of the building zone during each of the plurality of time steps, optimizing the cost function at a model predictive controller subject to a constraint on the predicted temperature of the building zone to determine optimal temperature setpoints for each of the plurality of time steps, and providing an optimal temperature setpoint from the model predictive controller to a thermostat for the building zone via a communications network. The method further includes, at the thermostat, driving the temperature of the building zone to the optimal temperature setpoint by operating HVAC equipment to provide heating or cooling to the building zone.

In some embodiments, the method includes receiving a set of time-varying utility rates from a utility provider or predicting the time-varying utility rates. The set of time-varying utility rates may include a utility rate value for each time step. The method may include determining the cost of operating the HVAC equipment during each of the plurality of time steps using the set of time-varying utility rates.

In some embodiments, using the predictive model to predict the temperature of the building zone includes predicting the temperature of the building zone during each of the plurality of time steps as a function of a temperature setpoint trajectory that includes a temperature setpoint for each of the plurality of time steps.

In some embodiments, optimizing the cost function includes optimizing the cost function subject to a constraint on the optimal temperature setpoints that limits the optimal temperature setpoints within a temperature setpoint range.

In some embodiments, the method includes generating the predictive model by performing a system identification process. The system identification process may include modulating the temperature setpoint within a constrained temperature setpoint range, collecting a set of input-output data, and fitting parameters of the predictive model to the set of input-output data. The input-output data include values of the temperature setpoint and values of the temperature of the building zone that result from modulating the temperature setpoint during each of a plurality of time steps during a learning period.

In some embodiments, the predictive model includes a thermal mass storage model that defines the temperature of the building zone as a function of at least one of heat transfer between air within the building zone and solid mass within the building zone, heat transfer between the building zone and the HVAC equipment, and an unmeasured heat load disturbance. In some embodiments, the method includes predicting a value of the unmeasured heat load disturbance experienced by the building zone at each of the plurality of time steps in the optimization period.

In some embodiments, the predictive model includes an HVAC load model that defines the heating or cooling provided by the HVAC equipment as a function of the temperature of the building zone and the temperature setpoint.

In some embodiments, the method includes predicting the cost of operating the HVAC equipment as a function of an amount of the heating or cooling provided by the HVAC equipment at each time step of the optimization period.

Another implementation of the present disclosure is a model predictive control system for monitoring and controlling temperature of a building zone. The model predictive control system includes a thermostat and a model predictive controller. The thermostat is configured to drive the temperature of the building zone to a zone temperature setpoint by operating HVAC equipment to provide heating or cooling to the building zone. The model predictive controller is configured to determine the zone temperature setpoint and provide the zone temperature setpoint to the thermostat via a communications network. The model predictive controller determines the zone temperature setpoint by generating a cost function that accounts for a cost operating the HVAC equipment during each of a plurality of time steps in an optimization period, using a predictive model to predict the temperature of the building zone during each of the plurality of time steps, and performing an optimization of cost function subject to a constraint on the predicted temperature of the building zone to determine the temperature setpoint trajectory.

Another implementation of the present disclosure is a model predictive controller for monitoring and controlling temperature of a building zone. The model predictive controller includes a system identifier and a predictive optimizer. The system identifier is configured to operate the model predictive controller in a system identification mode. Operating in the system identification mode includes performing a system identification process to automatically generate a predictive model based on heat transfer characteristics of the building zone. The predictive optimizer is configured to operate the model predictive controller in an operational mode. Operating in the operational mode includes using the predictive model to predict the temperature of the building zone. The model predictive controller is configured to automatically transition from the operational mode to the system identification mode in response to a determination that a prediction error of the predictive model exceeds a threshold value.

In some embodiments, operating in the operational mode includes optimizing a cost function subject to a constraint on the predicted temperature of the building zone to determine optimal temperature setpoints for each of a plurality of time steps in an optimization period. In some embodiments, the cost function accounts for a cost of operating HVAC equipment to provide heating or cooling to the building zone during each of the plurality of time steps in the optimization period.

In some embodiments, performing the system identification process includes collecting a set of input-output data and fitting parameters of the predictive model to the set of input-output data. The input-output data may include values of a temperature setpoint for the building zone and the temperature of the building zone during each of a plurality of time steps during a learning period.

In some embodiments, the set of input-output data includes a discrete HVAC staging trajectory for staged HVAC equipment. The HVAC staging trajectory may include a discrete HVAC equipment load at each of the plurality of time steps during the learning period. In some embodiments, performing the system identification process includes filtering the input-output data to generate a continuous HVAC equipment load signal from the discrete HVAC staging trajectory.

In some embodiments, collecting the set of input-output data includes modulating a temperature setpoint within a constrained temperature setpoint range and recording values of the modulated temperature setpoint and values of the temperature of the building zone that result from modulating the temperature setpoint. In some embodiments, performing the system identification process comprises filtering the input-output data to remove oscillations in the temperature of the building zone around the temperature setpoint resulting from activating and deactivating staged HVAC equipment.

In some embodiments, the predictive model includes a thermal mass storage model that defines the temperature of the building zone as a function of heat transfer between air within the building zone and solid mass within the building zone.

In some embodiments, the model predictive controller includes a load/rate predictor configured to predict a value of an unmeasured heat load disturbance experienced by the building zone at each of a plurality of time steps in an optimization period. In some embodiments, the predictive model defines the temperature of the building zone as a function of the unmeasured heat load disturbance.

In some embodiments, the predictive model includes an HVAC load model that defines an amount of heating or cooling provided by HVAC equipment controlled by the model predictive controller as a function of the temperature of the building zone and a temperature setpoint for the building zone.

Another implementation of the present disclosure is a method for monitoring and controlling temperature of a building zone. The method includes operating a model predictive controller in a system identification mode. Operating in the system identification mode includes performing a system identification process to automatically generate a predictive model based on heat transfer characteristics of the building zone. The method further includes operating the model predictive controller in an operational mode. Operating in the operational mode includes using the predictive model to predict the temperature of the building zone. The method further includes automatically transitioning from the operational mode to the system identification mode in response to a determination that a prediction error of the predictive model exceeds a threshold value.

In some embodiments, operating in the operational mode includes optimizing a cost function subject to a constraint on the predicted temperature of the building zone to determine optimal temperature setpoints for each of a plurality of time steps in an optimization period. In some embodiments, the cost function accounts for a cost of operating HVAC equipment to provide heating or cooling to the building zone during each of the plurality of time steps in the optimization period.

In some embodiments, performing the system identification process includes collecting a set of input-output data and fitting parameters of the predictive model to the set of input-output data. The input-output data may include values of a temperature setpoint for the building zone and the temperature of the building zone during each of a plurality of time steps during a learning period.

In some embodiments, the set of input-output data includes a discrete HVAC staging trajectory for staged HVAC equipment. The HVAC staging trajectory may include a discrete HVAC equipment load at each of the plurality of time steps during the learning period. In some embodiments, performing the system identification process includes filtering the input-output data to generate a continuous HVAC equipment load signal from the discrete HVAC staging trajectory.

In some embodiments, collecting the set of input-output data comprises modulating a temperature setpoint within a constrained temperature setpoint range and recording values of the modulated temperature setpoint and values of the temperature of the building zone that result from modulating the temperature setpoint. In some embodiments, performing the system identification process includes filtering the input-output data to remove oscillations in the temperature of the building zone around the temperature setpoint resulting from activating and deactivating staged HVAC equipment.

In some embodiments, the predictive model includes a thermal mass storage model that defines the temperature of the building zone as a function of heat transfer between air within the building zone and solid mass within the building zone.

In some embodiments, the method includes predicting a value of an unmeasured heat load disturbance experienced by the building zone at each of a plurality of time steps in an optimization period. In some embodiments, the predictive model defines the temperature of the building zone as a function of the unmeasured heat load disturbance.

In some embodiments, the predictive model includes an HVAC load model that defines an amount of heating or cooling provided by HVAC equipment controlled by the model predictive controller as a function of the temperature of the building zone and a temperature setpoint for the building zone.

Another implementation of the present disclosure is a model predictive controller for monitoring and controlling temperature of a building zone. The model predictive controller includes a state/disturbance estimator and a predictive optimizer. The state/disturbance estimator is configured to estimate an initial state of the building zone at a beginning of an optimization period. The state of the building zone includes a temperature of air within the building zone and a temperature of solid mass within the building zone. The predictive optimizer is configured to use a predictive model of the building zone to predict the state of the building zone at each of a plurality of time steps of the optimization period based on the estimated initial state of the building zone and a temperature setpoint trajectory comprising a temperature setpoint for each of the plurality of time steps. The predictive optimizer is configured to generate optimal temperature setpoints for each of the plurality of time steps by optimizing a cost function that accounts for a cost operating HVAC equipment during each of the plurality of time steps.

In some embodiments, the predictive optimizer is configured to generate the cost function and determine the cost operating the HVAC equipment during each time step using a set of time-varying utility rates that includes a utility rate value for each time step. The set of time-varying utility rates can be received from a utility provider or predicted by the model predictive controller.

In some embodiments, the predicted state of the building zone includes a predicted temperature of the building zone. The predictive optimizer may be configured to optimize the cost function subject to a constraint on the predicted temperature of the building zone.

In some embodiments, the model predictive controller includes a load/rate predictor configured to predict a value of an unmeasured heat load disturbance experienced by the building zone at each of the plurality of time steps in the optimization period. In some embodiments, the predictive model defines the temperature of the building zone as a function of the unmeasured heat load disturbance experienced by the building zone at each time step.

In some embodiments, the predictive model includes a mass storage model that defines the temperature of the building zone as a function of heat transfer between air within the building zone and solid mass within the building zone. In some embodiments, the predictive model defines the temperature of the building zone as a function of heat transfer between the building zone and the HVAC equipment. In some embodiments, the predictive model includes an HVAC load model that defines an amount of heating or cooling provided by the HVAC equipment as a function of the temperature of the building zone and the temperature setpoint.

In some embodiments, the predictive optimizer is configured to predict the cost of operating the HVAC equipment as a function of an amount of heating or cooling provided by the HVAC equipment at each time step of the optimization period.

In some embodiments, the model predictive controller includes a system identifier configured to generate the predictive model by performing a system identification process. The system identification process may include collecting a set of input-output data and fitting parameters of the predictive model to the set of input-output data. The input-output data may include values of the temperature setpoint and the temperature of the building zone during each of a plurality of time steps during a learning period.

In some embodiments, performing system identification process includes modulating the temperature setpoint within a constrained temperature setpoint range and recording values of the modulated temperature setpoint and values of the temperature of the building zone that result from modulating the temperature setpoint.

Another implementation of the present disclosure is a method for monitoring and controlling temperature of a building zone. The method includes estimating an initial state of the building zone at a beginning of an optimization period. The state of the building zone includes a temperature of air within the building zone and a temperature of solid mass within the building zone. The method includes using a predictive model of the building zone to predict the state of the building zone at each of a plurality of time steps of the optimization period based on the estimated initial state of the building zone and a temperature setpoint trajectory including a temperature setpoint for each of the plurality of time steps. The method includes generating optimal temperature setpoints for each of the plurality of time steps by optimizing a cost function that accounts for a cost operating HVAC equipment during each of the plurality of time steps.

In some embodiments, the method includes generating the cost function and determining the cost operating the HVAC equipment during each time step using a set of time-varying utility rates comprising a utility rate value for each time step. The set of time-varying utility rates can be received from a utility provider or predicted as part of the method.

In some embodiments, the predicted state of the building zone includes a predicted temperature of the building zone. The method may include optimizing the cost function subject to a constraint on the predicted temperature of the building zone.

In some embodiments, the method includes predicting a value of an unmeasured heat load disturbance experienced by the building zone at each of the plurality of time steps in the optimization period. In some embodiments, the predictive model defines the temperature of the building zone as a function of the unmeasured heat load disturbance experienced by the building zone at each time step.

In some embodiments, the predictive model includes a thermal mass storage model that defines the temperature of the building zone as a function of heat transfer between air within the building zone and solid mass within the building zone. In some embodiments, the predictive model defines the temperature of the building zone as a function of heat transfer between the building zone and the HVAC equipment. In some embodiments, the predictive model includes an HVAC load model that defines an amount of heating or cooling provided by the HVAC equipment as a function of the temperature of the building zone and the temperature setpoint.

In some embodiments, the method includes predicting the cost of operating the HVAC equipment as a function of an amount of heating or cooling provided by the HVAC equipment at each time step of the optimization period.

In some embodiments, the method includes generating the predictive model by performing a system identification process. The system identification process includes collecting a set of input-output data and fitting parameters of the predictive model to the set of input-output data. The input-output data may include values of the temperature setpoint and the temperature of the building zone during each of a plurality of time steps during a learning period.

Another implementation of the present disclosure is a model predictive controller for monitoring and controlling temperature of a building zone. The model predictive controller includes a state/disturbance estimator and a predictive optimizer. The state/disturbance estimator is configured to estimate an initial state of the building zone at a beginning of an optimization period. The state of the building zone includes a temperature of air within the building zone and a temperature of solid mass within the building zone. The predictive optimizer is configured to use a predictive model of the building zone to predict the state of the building zone at each of a plurality of time steps of the optimization period based on the estimated initial state of the building zone and a temperature setpoint trajectory including a temperature setpoint for each of the plurality of time steps. The predictive optimizer is configured to generate temperature setpoints for each of the plurality of time steps by optimizing a cost function that accounts for a cost operating HVAC equipment during each of the plurality of time steps.

Another implementation of the present disclosure is a thermostat for monitoring and controlling temperature of a building zone. The thermostat includes a load/rate predictor and a predictive optimizer. The load/rate predictor is configured to predict a price of one or more resources consumed by HVAC equipment to generate heating or cooling for the building zone at each of a plurality of time steps of an optimization period. The predictive optimizer is configured to generate a cost function that accounts for a cost of operating the HVAC equipment during each time step as a function of the predicted prices at each time step, use a predictive model to predict the temperature of the building zone during each of the plurality of time steps as a function of a temperature setpoint trajectory including a temperature setpoint for each of the plurality of time steps, and optimize the cost function subject to a constraint on the predicted temperature of the building zone to determine optimal temperature setpoints for each of the plurality of time steps.

In some embodiments, the thermostat includes an equipment controller configured to drive the temperature of the building zone to an optimal temperature setpoint by operating the HVAC equipment to provide heating or cooling to the building zone.

In some embodiments, the predictive model defines the temperature of the building zone as a function of an unmeasured heat load disturbance. In some embodiments, the load/rate predictor is configured to predict a value of the unmeasured heat load disturbance experienced by the building zone at each of the plurality of time steps in the optimization period as a function of at least one of day type, time of day, building occupancy, outdoor air temperature, and weather forecasts.

In some embodiments, the thermostat includes a system identifier configured to generate the predictive model by performing a system identification process. The system identification process includes collecting a set of input-output data and fitting parameters of the predictive model to the set of input-output data. The input-output data may include values of the temperature setpoint and the temperature of the building zone during each of a plurality of time steps during a learning period.

In some embodiments, the system identification process includes modulating the temperature setpoint within a constrained temperature setpoint range and recording values of the modulated temperature setpoint and values of the temperature of the building zone that result from modulating the temperature setpoint.

In some embodiments, the predictive model includes a thermal mass storage model that defines the temperature of the building zone as a function of heat transfer between air within the building zone and solid mass within the building zone. In some embodiments, the predictive model defines the temperature of the building zone as a function of heat transfer between the building zone and the HVAC equipment. In some embodiments, the predictive model includes an HVAC load model that defines the heating or cooling provided by the HVAC equipment as a function of the temperature of the building zone and the temperature setpoint.

In some embodiments, the predictive optimizer is configured to predict the cost of operating the HVAC equipment as a function of an amount of the heating or cooling provided by the HVAC equipment at each time step of the optimization period.

Another implementation of the present disclosure is a method performed by a thermostat for a building zone for monitoring and controlling temperature of the building zone. The method includes predicting a price of one or more resources consumed by HVAC equipment to generate heating or cooling for the building zone at each of a plurality of time steps of an optimization period, generating a cost function that accounts for a cost of operating the HVAC equipment during each time step as a function of the predicted prices at each time step, using a predictive model to predict the temperature of the building zone during each of the plurality of time steps as a function of a temperature setpoint trajectory including a temperature setpoint for each of the plurality of time steps, and optimizing the cost function subject to a constraint on the predicted temperature of the building zone to determine optimal temperature setpoints for each of the plurality of time steps.

In some embodiments, the method includes driving the temperature of the building zone to an optimal temperature setpoint by operating the HVAC equipment to provide heating or cooling to the building zone.

In some embodiments, the predictive model defines the temperature of the building zone as a function of an unmeasured heat load disturbance. In some embodiments, the method includes predicting a value of the unmeasured heat load disturbance experienced by the building zone at each of the plurality of time steps in the optimization period as a function of at least one of day type, time of day, building occupancy, outdoor air temperature, and weather forecasts.

In some embodiments, the method includes generating the predictive model by performing a system identification process. The system identification process may include collecting a set of input-output data and fitting parameters of the predictive model to the set of input-output data. The input-output data may include values of the temperature setpoint and the temperature of the building zone during each of a plurality of time steps during a learning period.

In some embodiments, performing the system identification process includes modulating the temperature setpoint within a constrained temperature setpoint range and recording values of the modulated temperature setpoint and values of the temperature of the building zone that result from modulating the temperature setpoint.

In some embodiments, the predictive model includes a thermal mass storage model that defines the temperature of the building zone as a function of heat transfer between air within the building zone and solid mass within the building zone. In some embodiments, the predictive model defines the temperature of the building zone as a function of heat transfer between the building zone and the HVAC equipment. In some embodiments, the predictive model includes an HVAC load model that defines the heating or cooling provided by the HVAC equipment as a function of the temperature of the building zone and the temperature setpoint.

Another implementation of the present disclosure is a thermostat for monitoring and controlling temperature of a building zone. The thermostat includes a load/rate predictor and a predictive optimizer. The load/rate predictor is configured to predict a price of one or more resources consumed by HVAC equipment to generate heating or cooling for the building zone at each of a plurality of time steps of an optimization period. The predictive optimizer is configured to generate a cost function that accounts for a cost of operating the HVAC equipment during each time step as a function of the predicted prices at each time step, use a predictive model to predict the temperature of the building zone during each of the plurality of time steps as a function of a temperature setpoint trajectory including a temperature setpoint for each of the plurality of time steps, and perform an optimization of the cost function subject to a constraint on the predicted temperature of the building zone to determine temperature setpoints for each of the plurality of time steps.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 1 is a drawing of a smart thermostat having a landscape aspect ratio, according to some embodiments.

FIG. 2 is a drawing of a smart thermostat having a portrait aspect ratio, according to some embodiments.

DETAILED DESCRIPTION

Overview

Figure 3:
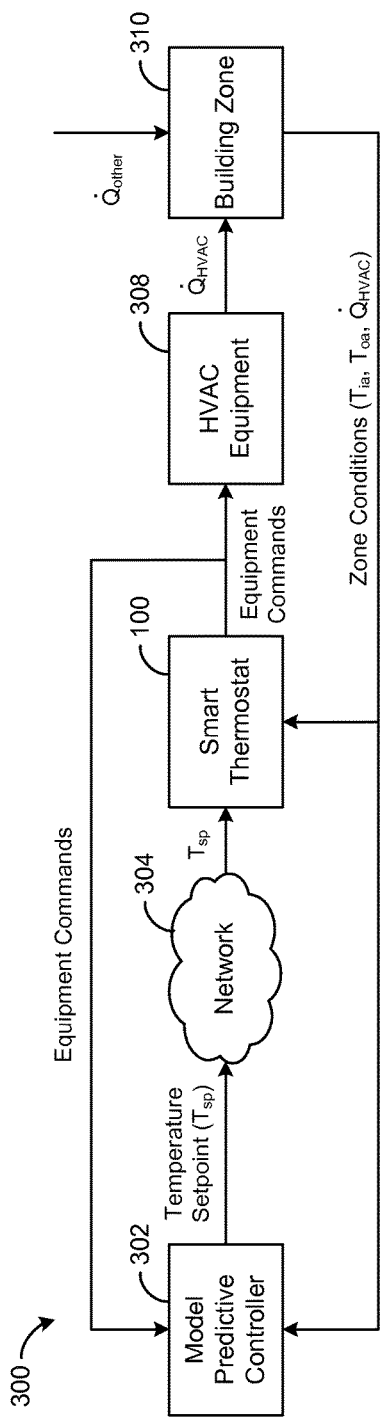
FIG. 3 is a block diagram of a model predictive control system including a model predictive controller and a smart thermostat which communicates with the model predictive controller via a network, according to some embodiments.

Referring generally to the FIGURES, a smart thermostat with model predictive control and components thereof are shown according, to some embodiments. The smart thermostat can be configured to monitor and control one or more environmental conditions of a building zone (e.g., temperature, humidity, air quality, etc.). In some embodiments, the smart thermostat is mounted on a wall within the building zone and configured to measure the temperature, humidity, and/or other environmental conditions of the building zone. The smart thermostat can be configured to communicate with HVAC equipment that operates to affect the measured environmental conditions.

In some embodiments, the smart thermostat includes a model predictive controller and an equipment controller. In other embodiments, the model predictive controller is separate from the smart thermostat and communicates with the smart thermostat via a communications network (e.g., the Internet, a building network, etc.). The model predictive controller can be configured to determine optimal temperature setpoints $T_{sp}$ for the building zone for each of a plurality of time steps in an optimization period. The equipment controller can be configured to receive the optimal temperature setpoints $T_{sp}$ from the model predictive controller and can operate HVAC equipment to drive the temperature of the building zone to the optimal temperature setpoints.

To determine the optimal temperature setpoints $T_{sp}$, the model predictive controller can optimize an objective function (i.e., a cost function) that accounts for the cost of operating the HVAC equipment over the duration of the optimization period. The costs of operating the HVAC equipment can include, for example, the costs of resources consumed by the HVAC equipment during operation (e.g., electricity, natural gas, water, etc.), demand charges imposed by an electric utility, peak load contribution charges, equipment degradation/replacement costs, and/or other costs associated with the operation of the HVAC equipment. The optimization performed by the model predictive controller is described in greater detail below.

The model predictive controller can optimize the objective function subject to a set of constraints. The constraints may include temperature constraints (e.g., a maximum temperature limit and a minimum temperature limit for the building zone), equipment capacity constraints, load change constraints, thermal mass storage constraints, HVAC load constraints, and/or other constraints that limit the operation of the HVAC equipment and/or describe the temperature evolution of the building zone. The model predictive controller can automatically generate the optimization constraints by performing a system identification process and generating predictive models that describe the controlled system (i.e., the HVAC equipment and the building zone).

In some embodiments, the model predictive controller generates a thermal mass storage model that describes the temperature of the air within the building zone $T_{ia}$ as a function of several physical parameters and variables. The physical parameters in the thermal mass storage model may include, for example, the thermal capacitance $C_{ia}$ of the air in the building zone, the thermal capacitance $C_m$ of the solid mass within the building zone, the thermal resistance $R_{mi}$ between the air within the building zone and the solid mass, the thermal resistance $R_{oi}$ between the air within the building zone and the ambient environment, etc. The variables in the thermal mass storage model may include the temperature of air within the building zone $T_{ia}$, the temperature of the solid mass within the building zone $T_m$, the outside air temperature $T_{oa}$, the amount of heating or cooling provided by the HVAC equipment $\dot{Q}_{HVAC}$, and/or a thermal energy load disturbance (i.e., a heat load disturbance) $\dot{Q}_{other}$.

In some embodiments, the model predictive controller generates an HVAC load model. The HVAC load model may describe the amount of heating or cooling $\dot{Q}_{HVAC}$ provided by the HVAC equipment as a function of the temperature setpoint $T_{sp}$ and the temperature of the air $T_{ia}$ within the building zone. The model predictive controller can use the thermal mass storage model and the HVAC load model to predict system states (i.e., building mass temperature $T_m$, building air temperature $T_{ia}$, etc.), predict the load disturbance $\dot{Q}_{other}$, and establish constraints on the optimization performed by the model predictive controller.

In some embodiments, the model predictive controller uses the thermal mass storage model and the HVAC load model to take advantage of the building mass as a thermal energy storage medium. For example, thermal energy can be stored in the solid building mass (i.e., precooling or preheating the building zone) to allow the model predictive controller to take advantage of time-varying utility rates and demand charges when determining the optimal temperature setpoints $T_{sp}$. To precool the building zone, thermal energy may be removed from the thermal mass during periods when energy prices are lowest. During periods when energy prices are largest, thermal energy may be moved back into the solid mass from the zone air, which reduces the sensible HVAC load $\dot{Q}_{HVAC}$ needed to maintain the zone air within a comfortable temperature range. Similarly, the model predictive controller can preheat the solid mass within the building zone when energy prices are low and use the stored thermal energy to warm the zone air when energy prices are higher.

In some embodiments, the model predictive controller is configured to operate in two distinct modes: (1) parameter identification mode and (2) operational mode. In the parameter identification mode, the model predictive controller can manipulate the temperature setpoint $T_{sp}$ provided to the smart thermostat and/or the equipment controller to induce a dynamic response in the zone temperature $T_{ia}$. This procedure of inducing a dynamic response is referred to as the parameter identification experiment or system identification process and can be used to identify the values of the parameters in the thermal mass storage model and the HVAC load model. In the operational mode, the model predictive controller can solve an optimal control problem to determine the optimal temperature setpoint trajectory $T_{sp}$ (i.e., a time series of temperature setpoints) that minimizes the cost of energy consumed by the HVAC equipment over the duration of the optimization period. The optimal temperature setpoints $T_{sp}$ can be provided to the smart thermostat and/or the equipment controller for use in generating operating commands for the HVAC equipment.

The setpoint $T_{sp}$ computed for the first time step of the optimization period can be sent to the smart thermostat and/or the equipment controller to be implemented during the first time step. The smart thermostat and/or the equipment controller can turn stages of HVAC equipment on and/or off such that the temperature $T_{ia}$ of the zone is forced to and then maintained at the temperature setpoint $T_{sp}$. At the next time step, the model predictive controller receives updated information (i.e., feedback on the zone conditions), resolves the optimal control problem, and sends the temperature setpoint $T_{sp}$ for the next time step to the smart thermostat and/or the equipment controller.

The model predictive controller can collect feedback on the zone conditions (e.g., zone temperature $T_{ia}$, outdoor air temperature $T_{oa}$, heating/cooling load $\dot{Q}_{HVAC}$) when operating in the parameter identification mode. The zone conditions can be monitored and recorded over the identification experiment, along with the commanded zone temperature setpoint $T_{sp}$, as input-output data (i.e., training data). The model predictive controller can use the input-output data to compute the zone thermal model parameters by performing a system identification process. The feedback received from the smart thermostat may include the current minimum and maximum allowable setpoint to limit the adjustments to the zone temperature setpoint $T_{sp}$ made during the identification experiment. These and other features of the smart thermostat and/or the model predictive controller are described in greater detail below.

Throughout this disclosure, the terms "optimal," "optimized," "optimum," and the like are used to refer to values (e.g., temperature setpoint values, HVAC load values, etc.) that are determined by performing an optimization process. Similarly, the term "optimizing" is used to refer to the process of performing an optimization. In some instances, the values resulting from the optimization process are true optimal values (i.e., values that achieve the minimum possible value or maximum possible value for a performance variable given the constraints on the optimization process). In other instances, the values resulting from the optimization process are not true optimal values. This can result from imperfect information used to perform the optimization, inaccuracies in the predictive model used to constrain the optimization, and/or various other factors that can prevent the optimization from converging on the true optimal values. The terms "optimal," "optimized," "optimum," and the like should be interpreted to include any values that result from performing an optimization, regardless of whether the values are true optimal values. Similarly, the term "optimizing" should be interpreted to include the process of performing an optimization, regardless of whether that optimization converges on the true optimal values.

Smart Thermostat

Referring now to FIGS. 1-2, a smart thermostat 100 is shown, according to some embodiments. Smart thermostat 100 can be configured to monitor and control one or more environmental conditions of a building zone (e.g., temperature, humidity, air quality, etc.). In some embodiments, smart thermostat 100 is mounted on a wall within the building zone and configured to measure the temperature, humidity, and/or other environmental conditions of the building zone. Smart thermostat 100 can be configured to communicate with HVAC equipment that operates to affect the measured environmental conditions.

Smart thermostat 100 can be installed in a home, office building, school, hospital, or any other environment-controlled space. In residential implementations, the HVAC equipment controlled by smart thermostat 100 may include a home furnace, air conditioning unit, and/or other types of residential HVAC equipment. In commercial implementations, the HVAC equipment may include one or more chillers, boilers, air handling units, rooftop units, dampers, or other types of HVAC equipment configured to affect the environment of a building zone. It is contemplated that smart thermostat 100 can be configured to control any type of HVAC equipment.

In some embodiments, smart thermostat 100 includes a communications interface that enables smart thermostat 100 to connect to a communications network (e.g., a local area network, the Internet, a cellular network, etc.) and communicate with various external systems and devices (e.g., user devices, remote servers, remote controllers, etc.). For example, smart thermostat 100 can be configured to receive weather forecasts from a remote weather service via the Internet. In some embodiments, smart thermostat 100 receives temperature setpoints from a model predictive controller via the communications network. In other embodiments, the model predictive controller is a component of smart thermostat 100.

Smart thermostat 100 is shown to include a display screen 102 and a base 104. Base 104 can attach to a wall or other surface upon which smart thermostat 100 is mounted. Display screen 102 may be transparent or semi-transparent (e.g., an organic LED display) and can be configured to display text, graphics, and other information for presentation to a user. In some embodiments, display screen 102 is touch-sensitive (e.g., a capacitive or resistive touch screen) and configured to receive user input. Display screen 102 may have a landscape aspect ratio as shown in FIG. 1 (i.e., the width of display screen 102 may exceed the height of display screen 102) or a portrait aspect ratio as shown in FIG. 2 (i.e., the height of display screen 102 may exceed the width of display screen 102). Display screen 102 may be cantilevered from base 104 (i.e., attached to base 104 along a single edge of display screen 102) and may extend from base 104 in a direction substantially parallel to the mounting surface.

Smart thermostat 100 can include some of all of the features of the thermostats described in U.S. patent application Ser. No. 15/143,373 filed Apr. 29, 2016, U.S. patent application Ser. No. 15/146,763 filed May 4, 2016, U.S. patent application Ser. No. 15/146,749 filed May 4, 2016, U.S. patent application Ser. No. 15/146,202 filed May 4, 2016, U.S. patent application Ser. No. 15/146,134 filed May 4, 2016, U.S. patent application Ser. No. 15/146,649 filed May 4, 2016, U.S. Provisional Patent Application No. 62/331,863 filed May 4, 2016, U.S. Provisional Patent Application No. 62/352,955 filed Jun. 21, 2016, U.S. patent application Ser. No. 15/298,191 filed Oct. 19, 2016, U.S. patent application Ser. No. 15/336,793 filed Oct. 28, 2016, U.S. patent application Ser. No. 15/336,792 filed Oct. 28, 2016, U.S. patent application Ser. No. 15/336,789 filed Oct. 28, 2016, U.S. patent application Ser. No. 15/338,221 filed Oct. 28, 2016, U.S. patent application Ser. No. 15/338,215 filed Oct. 28, 2016, U.S. patent application Ser. No. 15/336,791 filed Oct. 28, 2016, U.S. patent application Ser. No. 15/397,722 filed Jan. 3, 2017, and/or U.S. Provisional Patent Application No. 62/446,296 filed Jan. 13, 2017. The entire disclosure of each of these patent applications is incorporated by reference herein.

Model Predictive Control Systems

Figure 4:
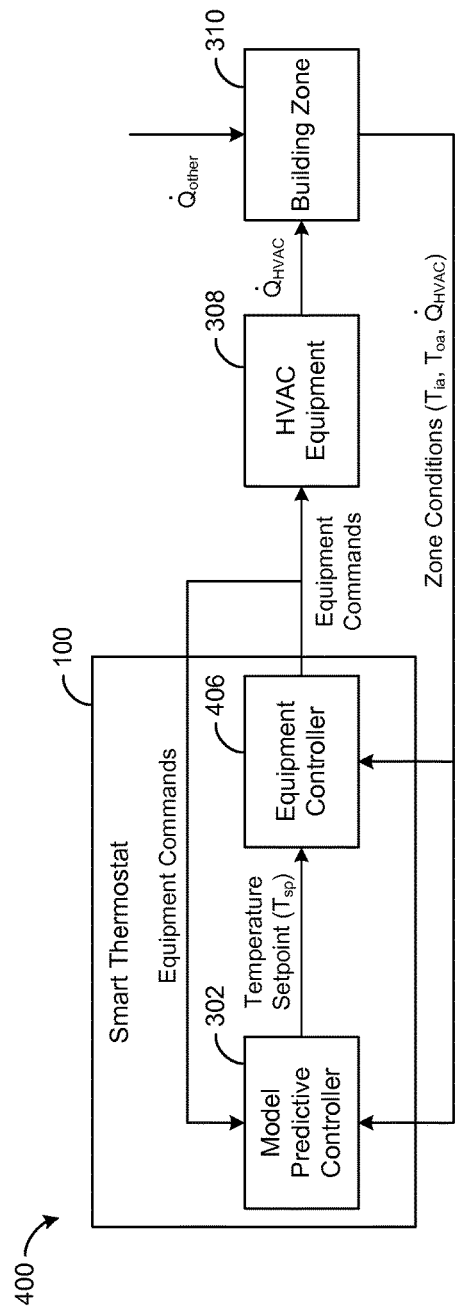
FIG. 4 is a block diagram of a model predictive control system including a smart thermostat that includes a model predictive controller and an equipment controller, according to some embodiments.

Referring now to FIGS. 3-4, a pair of model predictive control (MPC) systems 300 and 400 are shown, according to some embodiments. MPC system 300 is shown to include a model predictive controller 302, a communications network 304, smart thermostat 100, HVAC equipment 308, and a building zone 310. In MPC system 300, model predictive controller 302 is separate from smart thermostat 100 and configured to provide a temperature setpoint $T_{sp}$ to smart thermostat 100 via communications network 304. In MPC system 400, model predictive controller 302 is a component of smart thermostat 100 along with an equipment controller 406.

Building zone 310 can include one or more rooms or zones within a home, office building, school, hospital, or any other environment-controlled space. HVAC equipment 308 can include any type of equipment operable to affect the temperature, humidity, and/or other environmental conditions of building zone 310. For example, HVAC equipment 308 can include a home furnace, air conditioning unit, one or more chillers, boilers, air handling units, rooftop units, dampers, or other types of HVAC equipment configured to affect the environment of building zone 310.

Model predictive controller 302 can be configured to determine an optimal temperature setpoint $T_{sp}$ for smart thermostat 100 for each of a plurality of time steps during an optimization period. Smart thermostat 100 can use the temperature setpoints $T_{sp}$ provided by model predictive controller 302 to generate equipment commands for HVAC equipment 308. The equipment commands can be generated by smart thermostat 100 and/or equipment controller 406 (e.g., an on/off controller, an equipment staging controller, a proportional-integral (PI) controller, a proportional-integral-derivative (PID) controller, etc.). HVAC equipment 308 operate according to the equipment commands to provide variable amount of heating or cooling $\dot{Q}_{HVAC}$ to building zone 310. By controlling the temperature setpoint $T_{sp}$, model predictive controller 302 can modulate the amount of heating or cooling $\dot{Q}_{HVAC}$ provided by HVAC equipment 308, thereby affecting the temperature of building zone 310.

To determine the optimal temperature setpoints $T_{sp}$, model predictive controller 302 can optimize an objective function (i.e., a cost function) that accounts for the cost of operating HVAC equipment 308 over the duration of the optimization period. The costs of operating HVAC equipment 308 can include, for example, the costs of resources consumed by HVAC equipment 308 during operation (e.g., electricity, natural gas, water, etc.), demand charges imposed by an electric utility, peak load contribution charges, equipment degradation/replacement costs, and/or other costs associated with the operation of HVAC equipment 308. The optimization performed by model predictive controller 302 is described in greater detail with reference to FIG. 5.

Model predictive controller 302 can optimize the objective function subject to a set of constraints. The constraints may include temperature constraints (e.g., a maximum temperature limit and a minimum temperature limit for building zone 310), equipment capacity constraints, load change constraints, thermal mass storage constraints, HVAC load constraints, and/or other constraints that limit the operation of HVAC equipment 308 and/or describe the temperature evolution of building zone 310. Model predictive controller 302 can automatically generate the optimization constraints by performing a system identification process and generating predictive models that describe the controlled system (i.e., HVAC equipment 308 and building zone 310).

In some embodiments, model predictive controller 302 generates a thermal mass storage model that describes the temperature of the air within building zone 310 $T_{ia}$ as a function of several physical parameters and variables. The physical parameters in the thermal mass storage model may include, for example, the thermal capacitance $C_{ia}$ of the air in building zone 310, the thermal capacitance $C_m$ of the solid mass within building zone 310, the thermal resistance $R_{mi}$ between the air within building zone 310 and the solid mass, the thermal resistance $R_{oi}$ between the air within building zone 310 and the ambient environment, etc. The variables in the thermal mass storage model may include the temperature of air within building zone 310 $T_{ia}$, the temperature of the solid mass within building zone 310 $T_m$, the outside air temperature $T_{oa}$, the amount of heating or cooling provided by HVAC equipment 308 $\dot{Q}_{HVAC}$, and/or a thermal energy load disturbance $\dot{Q}_{other}$.

In some embodiments, model predictive controller 302 generates a HVAC load model. The HVAC load model may describe the amount of heating or cooling $\dot{Q}_{HVAC}$ provided by HVAC equipment 308 as a function of the temperature setpoint $T_{sp}$ and the temperature of the air $T_{ia}$ within building zone 310. Model predictive controller 302 can use the thermal mass storage model and the HVAC load model to predict system states (i.e., building mass temperature $T_m$, building air temperature $T_{ia}$, etc.), predict the load disturbance $\dot{Q}_{other}$, and establish constraints on the optimization performed by model predictive controller 302.

In some embodiments, model predictive controller 302 uses the thermal mass storage model and the HVAC load model to take advantage of the building mass as a thermal energy storage medium. For example, thermal energy can be stored in the solid building mass (i.e., precooling or preheating building zone 310) to allow model predictive controller 302 to take advantage of time-varying utility rates and demand charges when determining the optimal temperature setpoints $T_{sp}$. To precool building zone 310, thermal energy may be removed from the thermal mass during periods when energy prices are lowest. During periods when energy prices are largest, thermal energy may be moved back into the solid mass from the zone air, which reduces the sensible HVAC load $\dot{Q}_{HVAC}$ needed to maintain the zone air within a comfortable temperature range. Similarly, model predictive controller 302 can preheat the solid mass within building zone 310 when energy prices are low and use the stored thermal energy to warm the zone air when energy prices are higher.

In some embodiments, model predictive controller 302 is configured to operate in two distinct modes: (1) parameter identification mode and (2) operational mode. In the parameter identification mode, model predictive controller 302 can manipulate the temperature setpoint $T_{sp}$ provided to smart thermostat 100 and/or equipment controller 406 to induce a dynamic response in the zone temperature $T_{ia}$. This procedure of inducing a dynamic response is referred to as the parameter identification experiment or system identification process and can be used to identify the values of the parameters in the thermal mass storage model and the HVAC load model. In the operational mode, model predictive controller 302 can solve an optimal control problem to determine the optimal temperature setpoint trajectory $T_{sp}$ (i.e., a time series of temperature setpoints) that minimizes the cost of energy consumed by HVAC equipment 308 over the duration of the optimization period. The optimal temperature setpoints $T_{sp}$ can be provided to smart thermostat 100 and/or equipment controller 406 for use in generating operating commands for HVAC equipment 308.

The setpoint $T_{sp}$ computed for the first time step of the optimization period can be sent to smart thermostat 100 and/or equipment controller 406 to be implemented during the first time step. Smart thermostat 100 and/or equipment controller 406 can turn stages of HVAC equipment 308 on and/or off such that the temperature $T_{ia}$ of the zone is forced to and then maintained at the temperature setpoint $T_{sp}$. At the next time step, model predictive controller 302 receives updated information (i.e., feedback on the zone conditions), resolves the optimal control problem, and sends the temperature setpoint $T_{sp}$ for the next time step to smart thermostat 100 and/or equipment controller 406.

Model predictive controller 302 can collect feedback on the zone conditions (e.g., zone temperature $T_{ia}$, outdoor air temperature $T_{oa}$, heating/cooling load $\dot{Q}_{HVAC}$ when operating in the parameter identification mode. The zone conditions can be monitored and recorded over the identification experiment, along with the commanded zone temperature setpoint $T_{sp}$, as input-output data (i.e., training data). Model predictive controller 302 can use the input-output data to compute the zone thermal model parameters by performing a system identification process. The feedback received from smart thermostat 100 may include the current minimum and maximum allowable setpoint to limit the adjustments to the zone temperature setpoint $T_{sp}$ made during the identification experiment.

In some embodiments, a pseudo-random binary signal (PRBS) is generated that is subsequently used to produce a signal that takes values in the set $\{T_{sp,1}, T_{sp,2}\}$, where $T_{sp,1}$ and $T_{sp,2}$ are maximum and minimum allowable temperature setpoints depending on mode of operation of smart thermostat 100 (e.g., heating, cooling, home, sleep, or away mode). The minimum and maximum temperature setpoints may be time-varying to account for the different operational modes of smart thermostat 100 (e.g., home, sleep, and away). In some embodiments, smart thermostat 100 uses occupancy detection and/or user feedback to change the mode.

To determine the optimal temperature setpoints $T_{sp}$ in the operational mode, model predictive controller 302 can use the thermal model of building zone 310 to predict the zone temperature $T_{ia}$ and HVAC fuel consumption over the optimization period, given a forecast of the weather and heat disturbance load on the zone (e.g., heat generated from people and electrical equipment and gained through solar radiation). The zone temperature $T_{ia}$ may be subject to comfort constraints. The predicted trajectories of the zone temperature $T_{ia}$, temperature setpoint $T_{sp}$, and HVAC fuel consumption can be sent to smart thermostat 100 to be displayed to the user allowing the user to better understand the setpoint decision made by model predictive controller 302.

In some embodiments, smart thermostat 100 allows a user to override the optimal temperature setpoints computed by model predictive controller 302. Smart thermostat 100 may include a savings estimator configured to determine a potential cost savings resulting from the optimal temperature setpoints relative to the user-specified temperature setpoints. Smart thermostat 100 can be configured to display the potential cost savings via display screen 102 to inform the user of the economic cost predicted to result from overriding the optimal temperature setpoints. These and other features of model predictive controller 302 are described in greater detail below.

Model Predictive Controller

Figure 5:
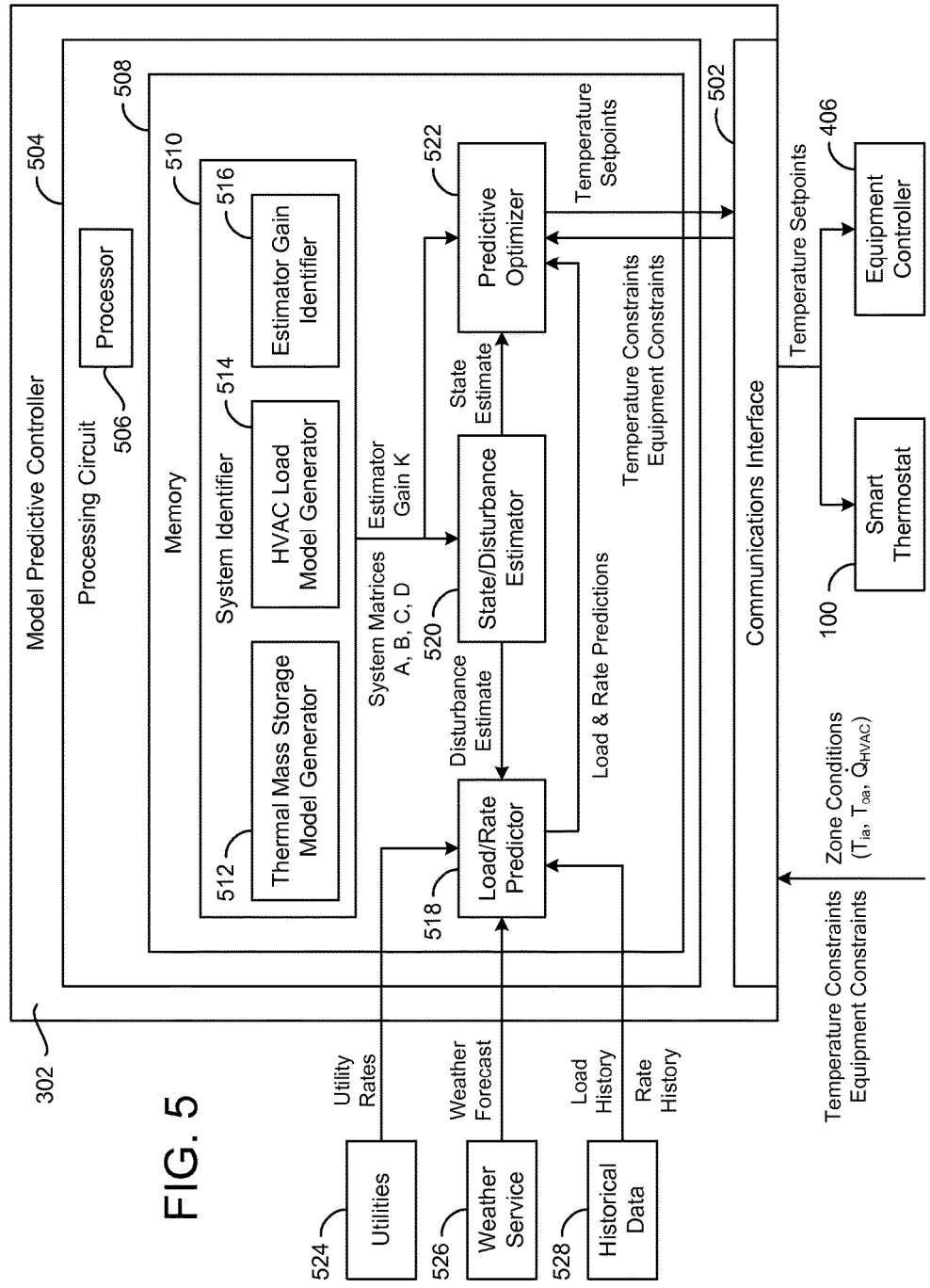
FIG. 5 is a block diagram illustrating the model predictive controller of FIGS. 3-4 in greater detail, according to some embodiments.

Referring now to FIG. 5, a block diagram illustrating model predictive controller 302 in greater detail is shown, according to come embodiments. Model predictive controller 302 is shown to include a communications interface 502 and a processing circuit 504. Communications interface 502 may facilitate communications between model predictive controller 302 and external systems or devices. For example, communications interface 502 may receive measurements of zone conditions from smart thermostat 100, HVAC equipment 308, and/or building zone 310. Zone conditions may include the temperature $T_{ia}$ of the air within building zone 310, the outside air temperature $T_{oa}$, and/or the amount of heating/cooling $\dot{Q}_{HVAC}$ provided to building zone 310 at each time step of the optimization period. Communications interface 502 may also receive temperature constraints for building zone 310 and/or equipment constraints for HVAC equipment 308. In some embodiments, communications interface 502 receives utility rates from utilities 524 (e.g., time-varying energy prices, demand charges, etc.), weather forecasts from a weather service 526, and/or historical load and rate data from historical data 528. In some embodiments, model predictive controller 302 uses communications interface 502 to provide temperature setpoints $T_{sp}$ to smart thermostat 100 and/or equipment controller 406.

Communications interface 502 may include wired or wireless communications interfaces (e.g., jacks, antennas, transmitters, receivers, transceivers, wire terminals, etc.) for conducting data communications external systems or devices. In various embodiments, the communications may be direct (e.g., local wired or wireless communications) or via a communications network (e.g., a WAN, the Internet, a cellular network, etc.). For example, communications interface 502 can include an Ethernet card and port for sending and receiving data via an Ethernet-based communications link or network. In another example, communications interface 502 can include a Wi-Fi transceiver for communicating via a wireless communications network or cellular or mobile phone communications transceivers.

Processing circuit 504 is shown to include a processor 506 and memory 508. Processor 506 may be a general purpose or specific purpose processor, an application specific integrated circuit (ASIC), one or more field programmable gate arrays (FPGAs), a group of processing components, or other suitable processing components. Processor 506 is configured to execute computer code or instructions stored in memory 508 or received from other computer readable media (e.g., CDROM, network storage, a remote server, etc.).

Memory 508 may include one or more devices (e.g., memory units, memory devices, storage devices, etc.) for storing data and/or computer code for completing and/or facilitating the various processes described in the present disclosure. Memory 508 may include random access memory (RAM), read-only memory (ROM), hard drive storage, temporary storage, non-volatile memory, flash memory, optical memory, or any other suitable memory for storing software objects and/or computer instructions. Memory 508 may include database components, object code components, script components, or any other type of information structure for supporting the various activities and information structures described in the present disclosure. Memory 508 may be communicably connected to processor 506 via processing circuit 504 and may include computer code for executing (e.g., by processor 506) one or more processes described herein. When processor 506 executes instructions stored in memory 508 for completing the various activities described herein, processor 506 generally configures controller 302 (and more particularly processing circuit 504) to complete such activities.

Still referring to FIG. 5, model predictive controller 302 is shown to include a system identifier 510, a load/rate predictor 518, a state/disturbance estimator 520, and a predictive optimizer 522. In brief overview, system identifier 510 can be configured to perform a system identification process to identify the values of the parameters in the building thermal mass model and the HVAC load model. The parameters identified by system identifier 510 may define the values of the system matrices A, B, C, and D and the estimator gain K. State/disturbance estimator 520 can be configured to compute an estimate of the current state $\hat{x}(k)$ and unmeasured disturbance $\hat{d}(k)$. The estimation performed by state/disturbance estimator 520 can be performed at each sample time and may use the system matrices A, B, C, D and estimator gain K identified by system identifier 510.

Load/rate predictor 518 can generate predictions or forecasts of the internal heat load $\dot{Q}_{other}$, the non-HVAC building electricity consumption (used to calculate electrical demand charges), and the utility rates at each time step of the optimization period as a function of historical data 528 and several key predictor variables (e.g., time-of-day, outdoor air conditions, etc.). The models used by load/rate predictor 518 may be different than that identified by system identifier 510. In some embodiments, load/rate predictor 518 uses the prediction techniques described in U.S. patent application Ser. No. 14/717,593 filed May 20, 2015, the entire disclosure of which is incorporated by reference herein.

Predictive optimizer 522 can manipulate the temperature setpoint $T_{sp}$ of building zone 310 to minimize the economic cost of operating HVAC equipment 308 over the duration of the optimization period using the building thermal mass storage model, the HVAC load model, and state and disturbance estimates and forecasts. In some embodiments, predictive optimizer 522 uses open-loop predictions to optimize the temperature setpoint $T_{sp}$ trajectory over the optimization period. At each time step of the optimization period, the predictions can be updated based on feedback from the controlled system (e.g., measured temperatures, measured HVAC loads, etc.).

Before discussing system identifier 510, load/rate predictor 518, state/disturbance estimator 520, and predictive optimizer 522 in detail, the notation used throughout the remainder of the present disclosure and the class of system model used by model predictive controller 302 are explained. The set of integers is denoted by $\mathbb{I}$ and the set of positive integers is denoted by $\mathbb{I}_{\geq 0}$, and the set of integers contained in the interval [a, b] is denoted by $\mathbb{I}_{a:b}$. For a time-dependent vector $x(k) \in \mathbb{R}^n$, $\hat{x}(i|k) \in \mathbb{R}^n$ denotes the estimated value of x at time step $i \in \mathbb{I}_{\geq 0}$ given the measurement at time step $k \in \mathbb{I}_{\geq 0}$ where $i \geq k$ and $\hat{x}(i|k) \in \mathbb{R}^n$ denotes the (open-loop) predicted value of x at time step $i \in \mathbb{I}_{\geq 0}$ with the prediction initialized at time $k \in \mathbb{I}_{\geq 0}$ ($i \geq k$). For notational simplicity, the notation of the predicted value of x at time i starting from time k is abbreviated to $\hat{x}(i)$. Boldface letters are used to represent a sequence with cardinality $N \in \mathbb{I}_{\geq 0}$ (i.e., $\mathbf{x} := \{x(0), \ldots, x(N-1)\}$). The notation •* (e.g., x*) denotes an optimal quantity with respect to some optimization problem.

In some embodiments, the model generated and used by model predictive controller 302 is a discrete-time linear time-invariant model, as shown in the following equation:

$$x(k+1) = Ax(k) + Bu(k)$$

$$y(k) = Cx(k) + Du(k) \quad \text{(Equation 1)}$$

where $k \in \mathbb{I}_{\geq 0}$ is the time index, $x(k) \in \mathbb{R}^n$ is the state vector, $y(k) \in \mathbb{R}^p$ is the measured output, and $u(k) \in \mathbb{R}^m$ is the input vector. The matrix A can be assumed to be stable; that is the real parts of the eigenvalues of A lie within the unit circle. The pair (A, B) can be assumed to be controllable and the pair (A, C) can be assumed to be observable. Some HVAC equipment 308 and devices are only operated at finite operating stages. In the building models considered, this gives rise to discrete outputs whereby the measured output takes values within a finite set of numbers: $y_i(k) \in \{y_{i,stage,1}, y_{i,stage,2}, \ldots, y_{i,stage,m}\}$ for some i. In this case, the output does not evolve according to Equation 1.

In some embodiments, the model generated and used by model predictive controller 302 is a grey box continuous-time models derived from thermal resistance-capacitance (RC) modeling principals. Model predictive controller 302 can be configured to parameterize the resulting continuous-time thermal models and identify the continuous-time model parameters. The continuous-time version of the model of Equation 1 can be represented as shown in the following equation $$\dot{x}(t) = A_c x(t) + B_c u(t)$$

$$y(t) = C_c x(t) + D_c u(t) \quad \text{(Equation 2)}$$

where $t \geq 0$ is continuous time (the initial time is taken to be zero) and $A_c$, $B_c$, $C_c$, $D_c$ are the continuous-time versions of the discrete-time system matrices A, B, C, and D. The values of the parameters in the matrices A, B, C, and D as well as an estimator gain K can be determined by system identifier 510 by performing a system identification process (described in greater detail below)

State/Disturbance Estimator

State/disturbance estimator 520 can be configured to compute an estimate of the current state $\hat{x}(k)$ and unmeasured disturbance $\hat{d}(k)$. The estimation performed by state/disturbance estimator 520 can be performed at each sample time (i.e., when operating in the operational mode) and may use the system matrices A, B, C, D and estimator gain K identified by system identifier 510. In some embodiments, state/disturbance estimator 520 modifies the system model to account for measurement noise and process noise, as shown in the following equation:

$$x(k+1) = Ax(k) + Bu(k) + w(k)$$

$$y(k) = Cx(k) + Du(k) + v(k) \quad \text{(Equation 3)}$$

where w(k) is the process noise and v(k) is the measurement noise.

State/disturbance estimator 520 can use the modified system model of Equation 3 to estimate the system state $\hat{x}(k)$ as shown in the following equation:

$$\hat{x}(k+1|k) = A\hat{x}(k|k-1) + Bu(k) + K(y(k) - \hat{y}(k|k-1))$$

$$\hat{y}(k|k-1) = C\hat{x}(k|k-1) + Du(k) \quad \text{(Equation 4)}$$

where $\hat{x}(k+1|k)$ is the estimated/predicted state at time step k+1 given the measurement at time step k, $\hat{y}(k|k-1)$ is the predicted output at time step k given the measurement at time step k−1, and K is the estimator gain. Equation 4 describes the prediction step of a Kalman filter. The Kalman filter may be the optimal linear filter under some ideal assumptions (e.g., the system is linear, no plant-model mismatch, the process and measurement noise are follow a white noise distribution with known covariance matrices).

In some embodiments, the estimated state vector $\hat{x}(k+1|k)$, the output vector $\hat{y}(k|k-1)$, and the input vector $u(k)$ are defined as follows:

$$\hat{x}(k+1|k) = \begin{bmatrix} \hat{T}_{ia}(k+1|k) \\ \hat{T}_m(k+1|k) \\ \hat{I}(k+1|k) \end{bmatrix},$$

$$\hat{y}(k|k-1) = \begin{bmatrix} \hat{T}_{ia}(k|k-1) \\ \hat{Q}_{HVAC}(k|k-1) \end{bmatrix},$$

$$u(k) = \begin{bmatrix} T_{sp}(k) \\ T_{oa}(k) \end{bmatrix}$$

where $\hat{T}_{ia}$, is an estimate of the zone air temperature $T_{ia}$, $\hat{T}_m$ is an estimate of the zone mass temperature $T_m$, $\hat{I}$ is an estimate of the integrating disturbance I, $\hat{Q}_{HVAC}$ is an estimate of the heating or cooling load provided by HVAC equipment 308, $T_{sp}$ is the temperature setpoint, and $T_{oa}$ is the outdoor air temperature.

The state estimation described by Equation 4 is effective in addressing stationary noise. However, unmeasured correlated disturbances are also common in practice. Correlated disturbances can lead to biased estimates/predictions. In some embodiments, state/disturbance estimator 520 accounts for disturbances by adding a disturbance state to the system model, as shown in the following equation:

$$\begin{bmatrix} \hat{x}(k+1|k) \\ \hat{d}(k+1|k) \end{bmatrix} = \begin{bmatrix} A & B_d \\ 0 & I \end{bmatrix} \begin{bmatrix} \hat{x}(k+1|k) \\ \hat{d}(k+1|k) \end{bmatrix} + \begin{bmatrix} B \\ 0 \end{bmatrix} u(k) + \begin{bmatrix} K_x \\ K_d \end{bmatrix} \quad \text{(Equation 5)}$$

$$(y(k) - \hat{y}(k|k-1))$$

$$\hat{y}(k|k-1) = \begin{bmatrix} C & C_d \end{bmatrix} \begin{bmatrix} \hat{x}(k|k-1) \\ \hat{d}(k|k-1) \end{bmatrix} + Du(k)$$

where $\hat{d}(k)$ is the unmeasured disturbance at time step k. The effect of adding the disturbance state is similar to that of the integral action of a proportional-integral controller. State/disturbance estimator 520 may select values of $B_d$ and $C_d$ and modify the estimation problem as shown in Equation 5. In some embodiments, state/disturbance estimator 520 selects values of $B_d$ and $C_d$ such that the system model is an integrating input and/or output disturbance model.

In some embodiments, the choice of disturbance models may have a significant impact on the ability of model predictive controller 302 to adequately estimate the lumped thermal building mass temperature $T_m$. Accurate estimation of the thermal mass temperature $T_m$, enables model predictive controller 302 to effectively use the solid building mass to store thermal energy when preheating or precooling building zone 310 in order to time-shift the thermal energy load and minimize the cost of operating HVAC equipment 308.

System Identifier

System identifier 510 can be configured to perform a system identification process to identify the values of the parameters in the building thermal mass model and the HVAC load model. The functions performed by system identifier 510 may be performed when operating in the parameter identification mode. The parameters identified by system identifier 510 may define the values of the system matrices A, B, C, and D and the estimator gain K. System identifier 510 can perform the system identification process during the commissioning phase of the control system and/or after the detection of a substantial change in the model parameters that has resulted in significant closed-loop performance deterioration. In some embodiments, the system identification process performed by system identifier 510 is the same or similar to the system identification process described in U.S. Pat. No. 9,235,657 titled "System Identification and Model Development" and granted Jan. 12, 2016. The entire disclosure of U.S. Pat. No. 9,235,657 is incorporated by reference herein.

Figure 6:
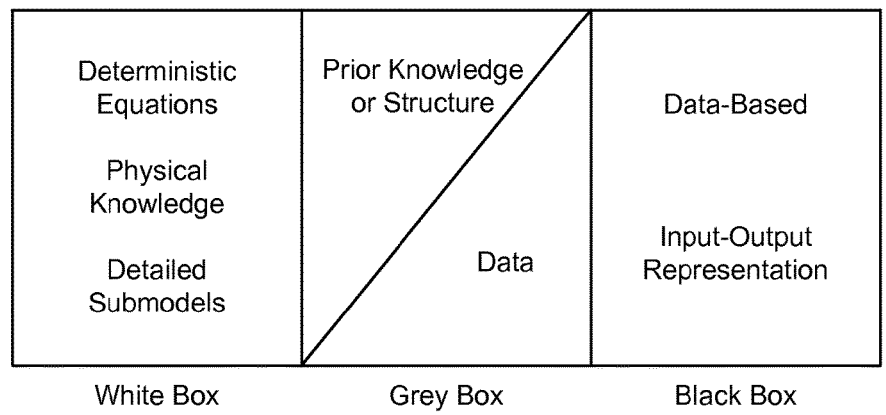
FIG. 6 is a block diagram illustrating various types of predictive models, according to some embodiments.

System identification (SI) is the art and science of building mathematical models of dynamic systems from observed input-output data. In general, a model for a system may be developed using three paradigms: white box, grey box or black box models. These three system identification modeling paradigms are summarized in FIG. 6.

For applications that require high fidelity models, white box models may be derived via detailed first-principles modeling approaches. This approach often requires a high degree of knowledge of the physical system and may result in a high-order nonlinear dynamic model. While the resulting model may capture most of the relevant physical behavior a system, there is usually a very high engineering investment required to develop such a model. Given the complexities of the resulting models, often white box models cannot be used in real-time predictive controllers owing to real-time computational restrictions. Nevertheless, white box models may help to evaluate control approaches in simulation to identify and mitigate potential pitfalls of the approach.

In a black box modeling paradigm, little a priori knowledge about the model structure is assumed except for standard assumptions like linearity and stability of the model. Black box methods fit the best model to the input-output data. While there is little to no assumed a priori knowledge about the model, which offers a deal of flexibility, there are a few drawbacks to the approach. Given that little about the model structure is assumed, black box models often tend to have a large amount of parameters, which requires a large amount of data to properly select the model order and appropriate input-output representation. To capture the necessary amount of input-output data needed for black box methods, an undesirable length for the system identification experiment may be required.

Finally, grey box modeling assumes that there is a known model structure often derived through simplified first-principals or semi-physical modeling. The model structure is parameterized and parameter estimation techniques are used to estimate the parameters. Owing to the incorporation of more a priori knowledge into grey box models, the resulting number of parameters for these types of models are often less than black box models. As a result of fewer parameters as well as the fact that the model structure (given it is valid) already encodes important relationships, less input-output data is typically needed to fit a good model with respect to that needed to fit a good model for black box methods.

In some embodiments, system identifier 510 uses a grey box model to represent HVAC equipment 308 and building zone 310 (i.e., the controlled system). In a grey box model system identification approach, a model structure $\mathcal{M}$ is selected, which is subsequently parameterized with a parameter $\theta \in D\mathbb{R} \subset \mathbb{R}^d$ where $D\mathcal{M}$ is the set of admissible model parameter values. The resulting possible models are given by the set:

$$M = \{\mathcal{M}(\theta) | \theta \in D\mathcal{M}\} \quad \text{(Equation 6)}$$

To fit a proper parameter vector to the controlled system, system identifier 510 can collect input-output data. The input-output data may include samples of the input vector u(k) and corresponding samples of the output vector y(k), as shown in the following equation:

$$Z^N = [y(1), u(1), y(2), u(2), \ldots, y(N), u(N)] \quad \text{(Equation 7)}$$

where N>0 is the number of samples collected. Parameter estimation is the problem of selecting the proper value $\hat{\theta}_N$ of the parameter vector given the input-output data $Z^N$ (i.e., it is the mapping: $Z^N \rightarrow \hat{\theta}_N \in D\mathcal{M}$).

In some embodiments, system identifier 510 uses a prediction error method to select the values of the parameter vector $\hat{\theta}_N$. A prediction error method (PEM) refers to a particular family of parameter estimation methods that is of interest in the context of the present disclosure. The prediction error method used by system identifier 510 may include fitting the parameter vector $\hat{\theta}_N$ by minimizing some function of the difference between the predicted output and observed output. For example, let $\hat{y}(k, \theta)$ be the predicted output at time step k given the past input-output sequence $Z^{k-1}$ and the model $\mathcal{M}(\theta)$ for $\theta \in D\mathcal{M}$. The prediction error at time step k is given by:

$$\varepsilon(k, \theta) := y(k) - \hat{y}(k, \theta) \quad \text{(Equation 8)}$$

In some embodiments, system identifier 510 filters the prediction error sequence through a stable linear filter and defines the following prediction performance metric:

$$V_N(\theta, Z^N) = \frac{1}{N} \sum_{k=1}^{N} l(\varepsilon_F(k, \theta)) \quad \text{(Equation 9)}$$

where $l(\cdot)$ is the cost function (e.g., a positive definite function) and $\varepsilon_F(k, \theta)$ is the filtered prediction error. The parameter estimate $\hat{\theta}_N$ of a prediction error method is then given by:

$$\hat{\theta}_N = \hat{\theta}_N(Z^N) = \arg\min_{\theta \in D_M} V_N(\theta, Z^N) \quad \text{(Equation 10)}$$

In various embodiments, system identifier 510 can use any parameter estimation method that corresponds to Equation 10. For example, system identifier 510 can define a quadratic cost function that is the square of the prediction errors, as shown in the following equation:

$$l(\varepsilon(k, \theta)) = l(y(k) - \hat{y}(k | k - 1, \theta)) = \|y(k) - \hat{y}(k | k - 1, \theta)\|_2^2 \quad \text{(Equation 11)}$$

where $\hat{y}(k|k-1, \theta)$ denotes the one-step ahead prediction of the output using the model $\mathcal{M}(\theta)$. When the prediction errors are independently and identically distributed random variables from a normal distribution (i.e., the process and measurement noise is Gaussian white noise) and the model being identified is linear, the cost function of Equation 11 is optimal from a statistical point-of-view.

Still referring to FIG. 5, system identifier 510 is shown to include a thermal mass storage model generator 512, a HVAC load model generator 514, and an estimator gain identifier 516. Thermal mass storage model generator 512 can be configured to estimate or identify the parameters of a thermal mass storage model that describes the relationship between indoor air temperature $T_{ia}$, building mass temperature $T_m$, outdoor air temperature $T_{oa}$, internal load $\dot{Q}_{other}$, and sensible HVAC load $\dot{Q}_{HVAC}$. The indoor air temperature $T_{ia}$ represents the temperature of the air within building zone 310. The building mass temperature $T_m$ represents the temperature of the solid objects within building zone 310. The internal load $\dot{Q}_{other}$ represents heat generated internally within building zone 310 by building occupants, electronics, resistive loads, and other sources of heat. The sensible HVAC load $\dot{Q}_{HVAC}$ represents the amount of heating or cooling applied to building zone 310 by HVAC equipment 308.

HVAC load model generator 514 can be configured to generate a HVAC load model that describes the relationship between indoor air temperature $T_{ia}$, the temperature setpoint $T_{sp}$, and the sensible HVAC load $\dot{Q}_{HVAC}$. In some embodiments, the HVAC load model describes the dynamics of HVAC equipment 308 when providing heating or cooling to building zone 310. For example, the HVAC load model may represent HVAC equipment 308 as a proportional-integral (PI) control system that provides the sensible HVAC load $\dot{Q}_{HVAC}$ as a function of the indoor air temperature $T_{ia}$ and the temperature setpoint $T_{sp}$.

Estimator gain identifier 516 can be configured to calculate the state/disturbance estimation gain (i.e., the estimator gain K). The estimator gain K may be referred to in other contexts as the disturbance matrix or Kalman filter gain. The operation of thermal mass storage model generator 512, HVAC load model generator 514, and estimator gain identifier 516 are described in greater detail below.

Thermal Mass Storage Model Generator

Thermal mass storage model generator 512 can be configured to estimate or identify the parameters of a thermal mass storage model that describes the relationship between indoor air temperature $T_{ia}$, building mass temperature $T_m$, outdoor air temperature $T_{oa}$, internal load $\dot{Q}_{other}$, and sensible HVAC load $\dot{Q}_{HVAC}$. In some embodiments, thermal mass storage model generator 512 performs a multi-stage system identification process to generate the parameters of the thermal mass storage model. The stages of the system identification process may include input-output data collection, generating a parameterized building thermal model, and estimating (i.e., fitting) the parameters of the parameterized building thermal model using a parameter identification algorithm.

The first stage of the system identification process is input-output data collection. The type of input-output data collected to fit the model parameters may have a significant impact in the usefulness and accuracy of the resulting model. In some embodiments, thermal mass storage model generator 512 manipulates the temperature setpoint $T_{sp}$ in an open-loop fashion as to sufficiently and persistently excite the system. For example, thermal mass storage model generator 512 can persistently excite (PE) a signal $\{s(k): k=0, 1, 2, \ldots\}$ with spectrum $\phi_s(\omega)$ if $\phi_s(\omega) > 0$ for almost all $\omega$ where:

$$\phi_s(\omega) = \sum_{m=-\infty}^{\infty} \left( \lim_{N \to \infty} \frac{1}{N} \sum_{k=1}^{N} s(k)s(k-m) \right) \quad \text{(Equation 12)}$$

Input-output data collected during closed-loop operation may not provide an information-rich dataset with respect to system identification because the inputs tend to be correlated to themselves as well as to the unmeasured disturbances as a result of closing the loop with a controller. As a result input-output data obtained via closed-loop operation may not meet the PE condition without adding perturbations to the inputs similar to that used in extremum seeking control.

Instead of closed-loop identification, thermal mass storage model generator 512 can perform a system identification experiment to meet the PE condition. In some embodiments, thermal mass storage model generator 512 performs the system identification experiment while building zone 310 is occupied. Accordingly, it may be desirable to design the system identification experiment to be as short as possible in order to prevent or minimize disruptions with building occupants. In some embodiments, thermal mass storage model generator 512 makes small changes to the temperature setpoints $T_{sp}$ (e.g., changes of 3-5° F.) in order to have minimal impact on the comfort of the building occupants.

Figure 7:
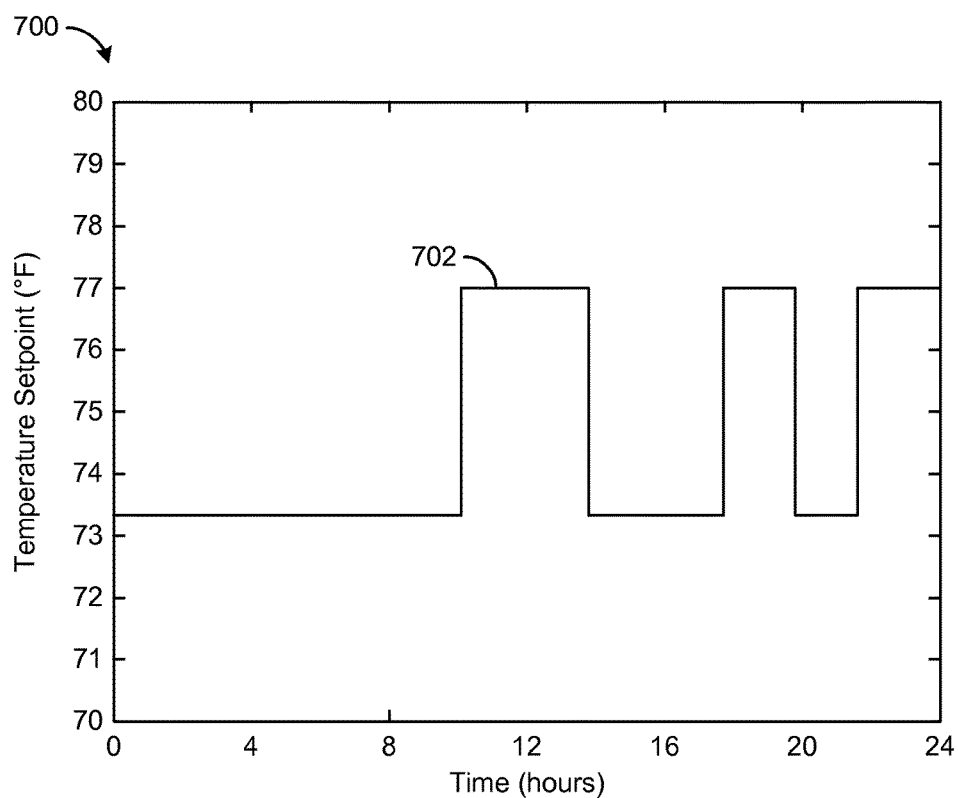
FIG. 7 is a graph of a temperature excitation signal over a one-day period, according to some embodiments.

In some embodiments, thermal mass storage model generator 512 generates the excitation signals using a pseudo-random binary sequence (PRBS). FIG. 7 shows a graph 700 of an example excitation temperature setpoint signal 702 over a one day period. Thermal mass storage model generator 512 can be configured to generate and provide temperature setpoint signal 702 to smart thermostat 100 during the system identification experiment. Temperature setpoint signal 702 can be generated a priori and tailored to meet the comfort constraints. The minimum and maximum temperature values of temperature setpoint signal 702 may be different depending on whether HVAC equipment 308 are operating in a heating dominated or cooling dominated mode. The values of temperature setpoint signal 702 may define the values of temperature setpoint variable $T_{sp}$ in the input data set used to fit the model parameters.

For variable speed systems, excitation signals generated from a PRBS may not be suitable in practice owing to concerns over saturation effects leading to nonlinearities in the experimental dataset. This issue can be monitored and analyzed via high-fidelity building simulations and setpoint experiments on buildings. Modifications to the excitation signal generation methodology can be evaluated first in simulation to understand the technical trade-offs and limitations. Experiments on buildings can also be performed to help assess the use of other types of excitation signals.

Thermal mass storage model generator 512 can generate a set of input data by modulating the temperature setpoint $T_{sp}$ and recording the values of the temperature setpoint $T_{sp}$ and the outside air temperature $T_{oa}$ at each time step during the system identification period. The set of input data may include a plurality of values of the temperature setpoint $T_{sp}$ and the outside air temperature $T_{oa}$. Thermal mass storage model generator 512 can generate a set of output data by monitoring and recording zone conditions at each time step of the system identification period. The zone conditions may include the zone air temperature $T_{ia}$ and the heating/cooling load $\dot{Q}_{HVAC}$. The set of output data may include a plurality of values of the zone air temperature $T_{ia}$ and the heating/cooling load $\dot{Q}_{HVAC}$.

The second stage of the system identification process is generating a parameterized building thermal model. The parameterized building thermal model may describe the relationship between zone temperature $T_{ia}$ and sensible HVAC load $\dot{Q}_{HVAC}$. In some embodiments, the parameterized building thermal model is based on a thermal circuit representation of building zone 310. An example a thermal circuit representing the heat transfer characteristics of building zone 310 is shown in FIG. 8.

Figure 8:
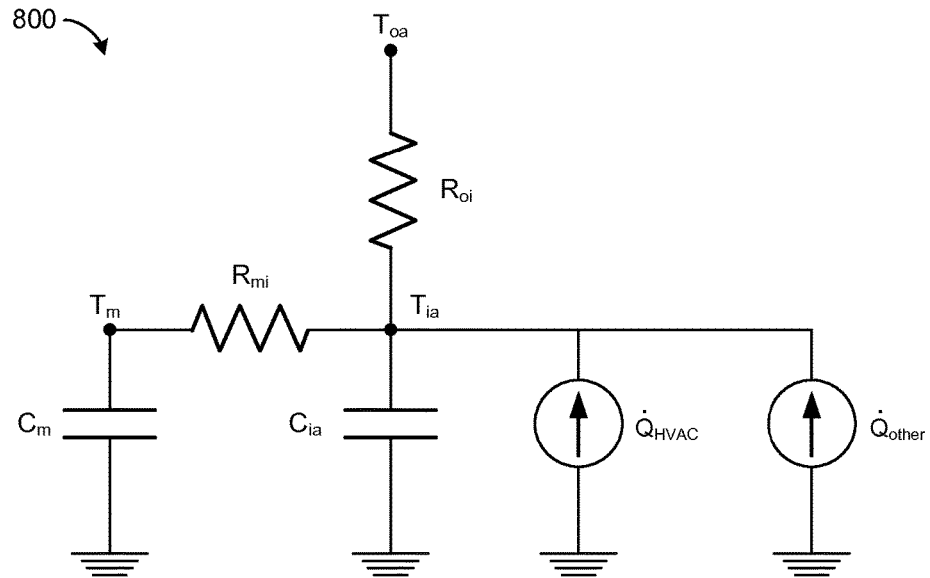
FIG. 8 is a thermal circuit diagram that models the heat transfer characteristics of a building zone, according to some embodiments.

Referring now to FIG. 8, a thermal circuit 800 representing the heat transfer characteristics of building zone 310 is shown, according to some embodiments. Thermal circuit 800 is a two thermal resistance, two thermal capacitance (2R2C) control-oriented thermal mass model. The thermal energy balance within thermal circuit 800 is given by the following linear differential equations:

$$C_{ia}\dot{T}_{ia} = \frac{1}{R_{mi}}(T_m - T_{ia}) + \frac{1}{R_{oi}}(T_{oa} - T_{ia}) + \dot{Q}_{HVAC} + \dot{Q}_{other} \quad \text{(Equation 13)}$$

$$C_m \dot{T}_m = \frac{1}{R_{mi}}(T_{ia} - T_m)$$

where $T_{ia}$ represents the indoor air temperature, $T_{oa}$ represents the outdoor air temperature, $T_m$ represents the thermal mass temperature (i.e., the average temperature of solid objects in building zone 310), $C_m$ represents thermal capacitance of the thermal mass, $C_{ia}$ represents the indoor air thermal capacitance, $R_{mi}$ represents the thermal resistance between the indoor air and the thermal mass, $R_{oi}$ represents the thermal resistance between the indoor air and the outdoor air, $\dot{Q}_{HVAC}$ represents the sensible heat added to building zone 310 by HVAC equipment 308 (or removed from building zone 310 if cooling is provided), and $\dot{Q}_{other}$ represents the heat load disturbance (e.g., internal heat generation within building zone 310 via solar radiation, occupancy, electrical equipment, etc.).

In some embodiments, heat transfer between adjacent zones is modeled as part of the heat load disturbance $\dot{Q}_{other}$ and thus, not explicitly accounted for in the model. In other embodiments, thermal interactions between adjacent zones can be accounted for by modeling the temperature of adjacent zones as additional temperature nodes and adding a thermal resistor between each adjacent zone and building zone 310. For buildings that have significant thermal coupling between zones (e.g., large stores, open floorplan buildings, etc.), it may be desirable to model the thermal interactions between adjacent zones.

The thermal dynamic model of Equation 13 describes the heat transfer between the indoor air and the thermal mass, the heat transfer through the building walls, the sensible heat/cooling duty of HVAC equipment 308 $\dot{Q}_{HVAC}$, and the internal heat load $\dot{Q}_{other}$ on the space generated by the occupants, electrical plug and lighting, and solar irradiation. Throughout this disclosure, the model of Equation 13 is referred to as the thermal model. The thermal model has been demonstrated to yield acceptable prediction accuracy while managing the trade-off between model complexity (e.g., number of model parameters) and model prediction accuracy. In some embodiments, the internal heat load $\dot{Q}_{other}$ cannot be measured and is therefore treated as an unmeasured, time-varying disturbance.

HVAC Load Model Generator

HVAC load model generator 514 can be configured to generate a HVAC load model that describes the relationship between indoor air temperature $T_{ia}$, the temperature setpoint $T_{sp}$, and the sensible HVAC load $\dot{Q}_{HVAC}$. In some embodiments, the HVAC load model describes the dynamics of HVAC equipment 308 when providing heating or cooling to building zone 310. For example, the HVAC load model may represent HVAC equipment 308 as a proportional-integral (PI) control system that provides the sensible HVAC load $\dot{Q}_{HVAC}$ as a function of the indoor air temperature $T_{ia}$ and the temperature setpoint $T_{sp}$.

In some embodiments, the sensible load $\dot{Q}_{HVAC}$ provided by HVAC equipment 308 is a function of the temperature setpoint $T_{sp}$ as well as other factors including the heat gained/lost through the building walls, the internal heat load $\dot{Q}_{other}$, and the heat transferred to/removed from the building thermal mass. To provide or remove heat to a particular zone, various actions may be performed by HVAC equipment 308. For example, for a chilled water cooled building with a central air handling unit (AHU) serving several variable air volume (VAV) terminal boxes, a chiller may generate chilled water. The chilled water can be pumped to the AHU cooling coil and air can be forced over the cooling coils of the AHU to cool the air to a supply air temperature setpoint (e.g., 55° F.). The cooled air can be delivered through the supply air duct to terminal VAV boxes at the location of building zone 310. The flow rate of cooled air can be adjusted via a damper such that building zone 310 reaches and/or stays at the temperature setpoint $T_{sp}$.

In some embodiments, the dynamics of the entire process of providing cooling or heating to building zone 310 is non-negligible on the time-scale of interest for utilizing the energy storage of a building mass. To account for the dynamics of the heating/cooling process, HVAC load model generator 514 can model the dynamics between the temperature setpoint $T_{sp}$ and the HVAC sensible load $\dot{Q}_{HVAC}$. An example of a model that can be model that can be generated by HVAC load model generator 514 is the following proportional-integral (PI) controller model:

$$\dot{Q}_{HVAC,j} = K_{p,j}\varepsilon_{sp} + K_{I,j}\int_0^t \varepsilon_{sp}(s)ds$$

$$\varepsilon_{sp} = T_{sp,j} - T_{ia} \qquad \text{(Equation 14)}$$

where $j \in \{clg, hlg\}$ is the index that is used to denote either heating or cooling mode. In some embodiments, different sets of parameters are generated for the heating and cooling modes. In other words, HVAC load model generator 514 can generate a first set of HVAC load model parameters for the cooling mode and a second set of HVAC load model parameters for the heating mode. In some embodiments, the heating and cooling load is constrained to the following set: $\dot{Q}_{HVAC,clg} \in [-\dot{Q}_{clg,cap}, 0]$ and $\dot{Q}_{HVAC,htg} \in [0, \dot{Q}_{htg,cap}]$ where $\dot{Q}_{HVAC} < 0$ indicates that HVAC equipment 308 are providing cooling and $\dot{Q}_{HVAC} > 0$ indicates that HVAC equipment 308 are providing heating The model of Equation 14 includes a proportional gain term (i.e., $K_{p,j}\varepsilon_{sp}$) that accounts for the error $\varepsilon_{sp}$ between the indoor air temperature $T_{ia}$ and the setpoint $T_{sp}$. The model of Equation 14 also includes an integrator term (i.e., $K_{I,j}\int_0^t \varepsilon_{sp}(s)ds$) to account for the time-varying nature of the HVAC load $\dot{Q}_{HVAC,j}$ required to force the indoor temperature $T_{ia}$ to its setpoint $T_{sp,j}$. The integrator value may be correlated with the internal heat load disturbance $\dot{Q}_{other}$ and thus, may play the role of an integrating disturbance model. In some embodiments, the model of Equation 14 does not represent a particular PI controller, but rather is a lumped dynamic model describing the relationship between the HVAC load $\dot{Q}_{HVAC,j}$ and the temperature setpoint $T_{sp,j}$. In some embodiments, the HVAC load model defines the HVAC load $\dot{Q}_{HVAC,j}$ as a function of the zone air temperature $T_{ia}$, the temperature setpoint $T_{sp,j}$, the zone air humidity $H_{ia}$, a zone air humidity setpoint $H_{sp,j}$ zone heat load $\dot{Q}_{other}$, and/or any of a variety of factors that affect the amount of heating or cooling provided by HVAC equipment. It is contemplated that the HVAC load model can include any combination of these or other variables in various embodiments.

In some embodiments, HVAC load model generator 514 accounts for staged HVAC equipment in the HVAC load model. For staged equipment, the sensible heating and cooling load $\dot{Q}_{HVAC,j}$ can be modeled to take values in the countable set $\dot{Q}_{HVAC,j} = \{\dot{Q}_{s1}, \dot{Q}_{s2}, \ldots, \dot{Q}_{sn}\}$, where $\dot{Q}_{si} i \in \{1, \ldots, n\}$ is the HVAC load with the first through ith stage on. The staging down and staging up dynamics can be assumed to be negligible. Alternatively, the staging down and staging up dynamics can be captured using a low-order linear model.

The model of Equation 14 allows for continuous values of $\dot{Q}_{HVAC,j}$ and may not be directly applicable to staged HVAC equipment. However, HVAC load model generator 514 can compute the time-averaged HVAC load $\dot{Q}_{HVAC,j}$ over a time period, which gives a continuous version of the HVAC load $\dot{Q}_{HVAC,j}$ needed to meet the temperature setpoint $T_{sp,j}$. For example, HVAC load model generator 514 can apply a filtering technique to the equipment stage on/off signal to compute a time-averaged version of the HVAC load $\dot{Q}_{HVAC,j}$. The filtered version of the HVAC load $\dot{Q}_{HVAC,j}$ can then be used as an input to the model of Equation 14 to describe the relationship between the HVAC load $\dot{Q}_{HVAC,j}$ and the temperature setpoint $T_{sp,j}$. Throughout this disclosure, the variable $\dot{Q}_{HVAC,j}$ is used to represent both the continuous HVAC load when HVAC equipment 308 have a variable speed and to represent the filtered HVAC load when HVAC equipment 308 are staged.

Incorporating the thermal and the HVAC load models together and writing the system of equations as a linear system of differential equations gives the following state space representation:

$$\begin{bmatrix} \dot{T}_{ia} \\ \dot{T}_m \\ \dot{I} \end{bmatrix} = \begin{bmatrix} \frac{1}{C_{ia}}\left(K_{p,j} - \frac{1}{R_{mi}} - \frac{1}{R_{oi}}\right) & \frac{1}{C_{ia}R_{mi}} & -\frac{K_{p,j}K_{I,j}}{C_{ia}} \\ \frac{1}{C_m R_{mi}} & -\frac{1}{C_m R_{mi}} & 0 \\ -1 & 0 & 0 \end{bmatrix} \begin{bmatrix} T_{ia} \\ T_m \\ I \end{bmatrix} +$$

$$\begin{bmatrix} -\frac{K_{p,j}}{C_{ia}} & \frac{1}{C_{ia}R_{oi}} \\ 0 & 0 \\ 1 & 0 \end{bmatrix} \begin{bmatrix} T_{sp,j} \\ T_{oa} \end{bmatrix} + \begin{bmatrix} \frac{1}{C_{ia}} \\ 0 \\ 0 \end{bmatrix} \dot{Q}_{other}$$

$$\begin{bmatrix} T_{ia} \\ \dot{Q}_{HVAC,j} \end{bmatrix} = \begin{bmatrix} 1 & 0 & 0 \\ -K_{p,j} & 0 & K_{I,j} \end{bmatrix} \begin{bmatrix} T_{ia} \\ T_m \\ I \end{bmatrix} + \begin{bmatrix} 0 & 0 \\ K_{p,j} & 0 \end{bmatrix} \begin{bmatrix} T_{sp,j} \\ T_{oa} \end{bmatrix}$$

or more compactly:

$$\dot{x} = A_c(\theta)x + B_c(\theta)u + B_d d$$

$$y = C_c(\theta)x + D_c(\theta)u \qquad \text{(Equation 15)}$$

where $x^T=[T_{ia}, T_m, I]$, $u^T=[T_{sp,j}, T_{oa}]$, $d=\dot{Q}_{other}/C_{ia}$, $y^T=[T_{ia}, \dot{Q}_{HVAC,j}]$, $\theta$ is a parameter vector containing all non-zero entries of the system matrices, and $$A_c(\theta) = \begin{bmatrix} -\theta_5(\theta_1+\theta_2+\theta_4) & \theta_5\theta_2 & \theta_3\theta_4\theta_5 \\ \theta_6\theta_2 & -\theta_6\theta_2 & 0 \\ -1 & 0 & 0 \end{bmatrix},$$

$$B_c(\theta) = \begin{bmatrix} \theta_1\theta_5 & \theta_4\theta_5 \\ 0 & 0 \\ 1 & 0 \end{bmatrix}, B_d = \begin{bmatrix} \theta_5 \\ 0 \\ 0 \end{bmatrix}, C_c(\theta) = \begin{bmatrix} 1 & 0 & 0 \\ -\theta_4 & 0 & \theta_3\theta_4 \end{bmatrix},$$

$$C_d(\theta) = \begin{bmatrix} 0 \\ 0 \end{bmatrix}, D_c(\theta) = \begin{bmatrix} 0 & 0 \\ \theta_4 & 0 \end{bmatrix}$$

Figure 9:
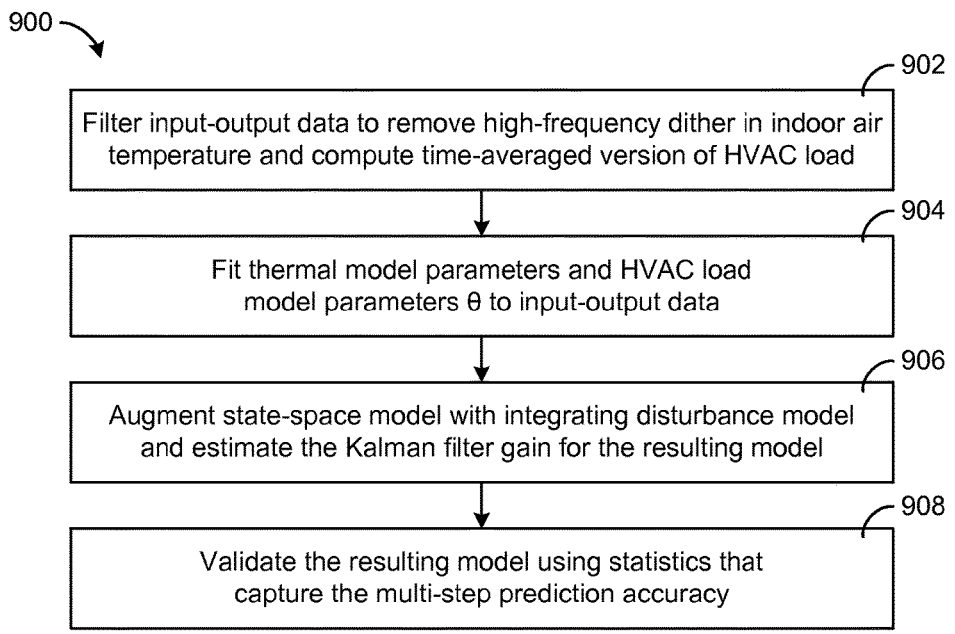
FIG. 9 is a flowchart of a process which can be performed by the model predictive controller of FIG. 5 to identify parameters of a predictive model, according to some embodiments.

The third stage of the system identification process includes fitting the parameters θ of the parameterized building thermal model (i.e., the model of Equation 15) to the input-output data using a parameter identification algorithm. FIG. 9 is a flowchart of a process 900 which can be performed by system identifier 510 to fit the parameters θ of the parameterized building thermal model. If HVAC equipment 308 is staged, system identifier 510 can filter input-output data to remove the high frequency dither in the indoor air temperature $T_{ia}$ and can compute a time-averaged version of the HVAC load $\dot{Q}_{HVAC}$ from the discrete HVAC staging trajectory (step 902). System identifier 510 can then fit the thermal model parameters and HVAC load model parameters θ to the input-output data (or filtered input-output data) obtained during the first stage of the system identification process (step 904). System identifier 510 can augment the resulting state-space model with another integrating disturbance model and can estimate the Kalman filter gain for the resulting model (step 906). Using data obtained in a secondary experiment or under normal operation, system identifier 510 can validate the model through the use of statistics that capture the multi-step prediction accuracy of the resulting model (step 908). Each of these steps is described in detail below.

Step 902 may include filtering the input-output data to remove a high frequency dither in the indoor air temperature $T_{ia}$ and computing a time-averaged version of the HVAC load $\dot{Q}_{HVAC}$ from the discrete HVAC staging trajectory. When HVAC equipment 308 are staged, the indoor air temperature trajectory may have a high frequency dither caused by HVAC equipment 308 staging up and down. For example, when operating in a cooling mode, HVAC equipment 308 can be staged up (e.g., by activating discrete chillers) to drive the indoor air temperature $T_{ia}$ to the temperature setpoint $T_{sp}$ minus a deadband. When the indoor air temperature $T_{ia}$ reaches the temperature setpoint $T_{sp}$ minus the deadband, HVAC stages can be deactivated, which results in an increase in the temperature $T_{ia}$. The indoor air temperature $T_{ia}$ may increase until it reaches the temperature setpoint $T_{sp}$ plus the deadband, at which time the HVAC stages can be activated again. The observed effect may be a high frequency dither or oscillation of the temperature $T_{ia}$ around the setpoint $T_{sp}$ (shown in FIG. 10). Also, the HVAC load trajectory may take discrete values as stages are turned on and off. The duty cycle of the on/off trajectory of the stages may depend on the heat transfer to/from building zone 310, the error between the setpoint and indoor air temperature, and the setpoint. Thus, a good indication of the HVAC load $\dot{Q}_{HVAC}$ on a continuous scale is some time-average of the HVAC load trajectory or stage on/off trajectories.

To remove the high frequency dither and to perform the time-averaging on the HVAC load trajectory, system identifier 510 can filter the input-output data obtained from the SI experiment. In some embodiments, system identifier 510 uses a first-order Savitzky-Golay filter (SGF) to filter the input-output data. The SGF involves fitting a polynomial to a set of data samples and evaluating the resulting polynomial at a single point within the approximation interval. The SGF is equivalent to performing discrete convolution with a fixed impulse response. However, the SGF is a non-casual filter. To address this issue, system identifier 510 can use the nearest past filtered measurements in the system identification process. For example, let $\Delta t_{filter}$ be the filtering window of the SGF. For the filter to compute its smoothed estimate of the data at a given time step t, it can use data from $t-\Delta t_{filter}/2$ to $t+\Delta t_{filter}/2$. To provide the filtered measurements (indoor air temperature $T_{ia}$ and HVAC load $\dot{Q}_{HVAC}$) at a sample time $t_k$, the filtered measurement from $t_k-\Delta t_{filter}/2$ can be used.

Figure 10:
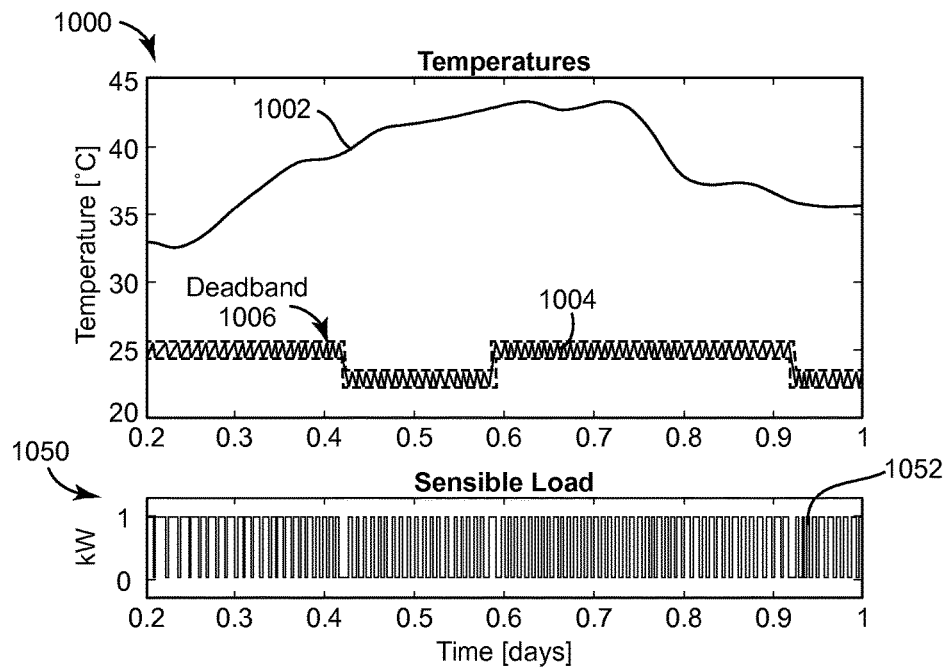
FIG. 10 is a graph of an unfiltered temperature signal and an unfiltered sensible load signal which can be received as feedback from a controlled HVAC system, according to some embodiments.

FIG. 10 is a pair of graphs 1000 and 1050 illustrating an example of the indoor air temperature $T_{ia}$ trajectory and the HVAC load $\dot{Q}_{HVAC}$ trajectory before filtering with the SGF. Line 1002 represents the outdoor air temperature $T_{oa}$ and line 1004 represents the unfiltered indoor air temperature $T_{ia}$. In steady-state, the indoor air temperature $T_{ia}$ may vary around the temperature setpoint within a region that is plus and minus the control deadband 1106. Line 1052 represents the unfiltered sensible load $\dot{Q}_{HVAC}$ for staged HVAC equipment.

Figure 11:
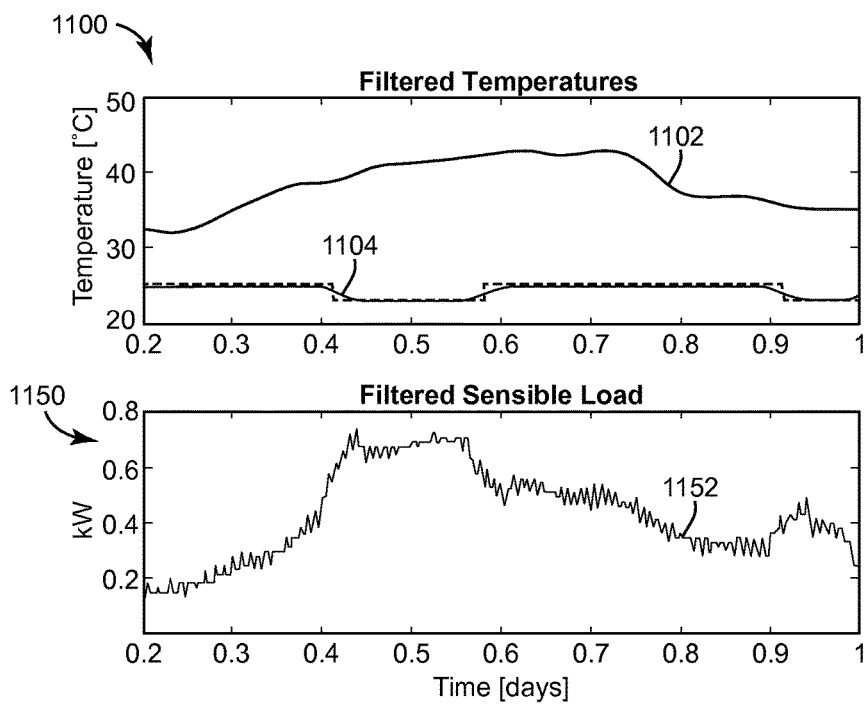
FIG. 11 is a graph of a filtered temperature signal and a filtered sensible load signal which can be generated by filtering the signals shown in FIG. 10, according to some embodiments.

FIG. 11 is a pair of graphs 1100 and 1150 illustrating an example of the indoor air temperature $T_{ia}$ trajectory and the HVAC load $\dot{Q}_{HVAC}$ trajectory after filtering with the SGF. Line 1102 represents the outdoor air temperature $T_{oa}$ and line 1004 represents the filtered indoor air temperature $T_{ia}$. In some embodiments, the filtering removes the variation of temperature about the setpoint to smooth the temperature trajectory. Line 1152 represents the filtered sensible load $\dot{Q}_{HVAC}$ for staged HVAC equipment and may be a time-averaged version of the unfiltered sensible load 1052 $\dot{Q}_{HVAC}$ shown in FIG. 10.

Referring again to FIG. 9, step 904 may include fitting the thermal model parameters and HVAC load model parameters to the input-output data (or filtered input-output data) obtained during the first stage of the system identification process. In step 904, the time-varying heat load disturbance d may be omitted. System identifier 510 can identify the parameters for the model given by:

$$\dot{x}(t) = \begin{bmatrix} \theta_1 & \theta_2 & \theta_3 \\ \theta_4 & -\theta_4 & 0 \\ -1 & 0 & 0 \end{bmatrix} x(t) + \begin{bmatrix} \theta_5\theta_7 & \theta_5\theta_6 \\ 0 & 0 \\ 1 & 0 \end{bmatrix} u(t) \quad \text{(Equation 16)}$$

$$y(t) = \begin{bmatrix} 1 & 0 & 0 \\ -\theta_7 & 0 & \theta_8 \end{bmatrix} x(t) + \begin{bmatrix} 0 & 0 \\ \theta_7 & 0 \end{bmatrix} u(t)$$

where the effect of the time-varying disturbance d is accounted for via the integrator model.

Using the prediction error method (PEM) described previously, system identifier 510 can obtain an estimate of the model parameters θ. In some embodiments, system identifier 510 estimates the model parameters θ using the functions provided by the Matlab System Identification toolbox. For example, the identification can be performed using the function greyest with the initial state option set to estimate, the disturbance model option set to none, and the estimation focus option is set to simulation. Other options may not be specifically set and therefore default values can be used.

The initial condition of the model of Equation 16 may be unknown, but can be from the data. The disturbance component (i.e., the Kalman gain estimate K) may not be included in the model of Equation 16. The estimation focus can be set to prediction so that the algorithm automatically computes the weighting function of the prediction errors. The stability estimation focus option may perform the same weighting as the prediction option, but also enforces model stability. Under the parameterization of the model of Equation 16, the values of the resistance, capacitance, and PI parameters may be computed from the parameter vector θ if necessary. Given that the resulting PEM optimization problem is a nonlinear, non-convex problem, the initial guess on the parameter values may have a significant impact on the parameter values obtained, and multiple executions of the PEM solver provided a different initial guess each time may converge to different local minima.

To perform step 904 autonomously, model verification can be performed before process 900 continues to 906. If any of the verification steps are not satisfied, the PEM solver can be reinitialized with a different random initial guess. The model verification steps that can be performed in step 904 may include ensuring stability by checking the eigenvalues of the obtained A. In some embodiments, the model verification steps include ensuring that the identified parameters are greater than zero. This is a condition arising from the physical meaningfulness of the model. The model verification steps may include ensuring that the thermal capacitance of the air $C_{ia}$ is less than the thermal capacitance $C_m$ of the building mass. In some embodiments, the model verification steps include verifying that the matrix A is well conditioned in order to avoid prediction problems and model sensitivity to noise. If the condition number of A is less than 10500, the conditioning of A may be deemed to be acceptable.

Once the obtained model satisfies all the checks, process 900 may proceed to step 906. It is possible that the conditions described above are not ever satisfied. However, this could be due to a number of reasons that may be difficult to autonomously diagnose and potentially, be associated with a problem beyond the limitations of the SI procedure. To address this problem, a limit can be set for the number of times through the steps above. If the parameter acceptability criteria is not satisfied after the maximum number of iterations through step 904, system identifier 510 can report an error for a human operator to investigate and address.

Estimator Gain Identifier

As discussed above, the model of Equation 16 may only account for the main thermal dynamics of the system and may not identify an appropriate estimator gain. In step 906, the model of Equation 16 can be augmented with another integrating disturbance model and the estimator gain can be identified. In some embodiments, step 906 is performed by estimator gain identifier 516. Estimator gain identifier 516 can be configured to augment the model of Equation 16 to produce the augmented model:

$$\begin{bmatrix} \dot{x}(t) \\ \dot{\hat{d}}(t) \end{bmatrix} = \begin{bmatrix} A_c & B_d \\ 0 & 0 \end{bmatrix} \begin{bmatrix} \hat{x}(t) \\ \hat{d}(t) \end{bmatrix} + \begin{bmatrix} B_c \\ 0 \end{bmatrix} u(t) + \underbrace{\begin{bmatrix} K_x(\phi) \\ K_d(\phi) \end{bmatrix}}_{=:K(\phi)} (y(t) - \hat{y}(t))$$

$$\hat{y}(t) = \begin{bmatrix} C_c & C_d \end{bmatrix} \begin{bmatrix} \hat{x}(t) \\ \hat{d}(t) \end{bmatrix} + D_c u(t)$$

where the parameters of $A_c$, $B_c$, $C_c$ and $D_c$ are the same as the parameters θ determined in step 904. The disturbance model can be selected such that $B_d=1$ and $C_d=0$, which is an input integrating disturbance model. $K(\phi)$ is the identified estimator gain parameterized with the parameter vector ϕ as shown in the following equation:

$$K_x(\phi) = \begin{bmatrix} \phi_1 & \phi_2 \\ 0 & 0 \\ \phi_3 & \phi_4 \end{bmatrix}, K_d(\phi) = \begin{bmatrix} \phi_5 & \phi_6 \end{bmatrix} \quad \text{(Equation 17)}$$

where the elements corresponding to the mass temperature $T_m$ (i.e., the middle row of the matrix $K_x(\phi)$) are set to zero. If these elements are allowed to take non-zero values, poor estimation performance may result. Accordingly, estimator gain identifier 516 may set the elements corresponding to the mass temperature $T_m$ to zero. The values for the parameters ϕ can be obtained using the function greyest on the augmented model, using the same input-output data as that used in step 904.

Estimator gain identifier 516 can be configured to generate the following augmented matrices:

$$A_{aug} = \begin{bmatrix} A_c & B_d \\ 0 & 0 \end{bmatrix}, B_{aug} = \begin{bmatrix} B_c \\ 0 \end{bmatrix}, C_{aug} = \begin{bmatrix} C_c & C_d \end{bmatrix}, D_{aug} = D_c$$

Similar to the verifications performed in step 904, estimator gain identifier 516 can check for the stability of the observer system $A_{aug}-KC_{aug}$, and its conditioning number. In this case, the conditioning number of $A_{aug}-KC_{aug}$ may be deemed acceptable if it is less than 70,000.

Step 908 may include validating the augmented model generated in step 906. As discussed above, system identifier 510 may select the optimal model parameters that fit the input-output data with respect to an objective function that depends on the one-step error prediction. In step 904, the PEM is the one-step ahead prediction without estimation (i.e., open-loop estimation), whereas step 906 represents the one-step ahead closed-loop estimation problem. However, within the context of MPC, multi-step open-loop predictions can be used to select the optimal input trajectory over the prediction horizon. Thus, the model validation performed in step 908 may ensure that the estimator is tuned appropriately and that the multi-step open-loop prediction performed with the identified model provides sufficient accuracy.

In some embodiments, system identifier 510 collects another input-output data set for model validation. This data may be collected during normal operation or from another SI experiment. Using this validation data set, system identifier 510 can generate one or more metrics that quantify the multi-step prediction accuracy. One example of a metric which can be generated in step 908 is the Coefficient of Variation Weighted Mean Absolute Prediction Error (CVWMAPE). CVWMAPE is an exponentially weighted average of the absolute prediction error at each time step that quantities the prediction error over time. System identifier 510 can calculate the CVWMAPE as follows:

$$CVWMAPE(k) = \frac{\sum_{i=k}^{k+N_h-1} e^{\frac{-i}{N_h}} |y(i) - \hat{y}(i|k)|}{\sum_{i=k}^{k+N_h-1} e^{\frac{-i}{N_h}} |y(i)|}, \quad \text{(Equation 18)}$$

$$k = 0, 1, 2, \ldots$$

where $N_h \in \mathbb{I}_{>0}$ is the prediction horizon, y(i) is the measured output at time step i, and ŷ(i|k) is the predicted output with the identified model given a measurement at time step k and the input sequence u(k), u(k+1), ..., u(i−1). For notational simplicity the variable y is used to denote one of the two outputs (i.e., in this subsection, y is a scalar). The CVW-MAPE can be computed for both outputs.

Another prediction error to consider is prediction error with respect to the q-step ahead prediction ($q \in \mathbb{I}_{\geq 0}$). System identifier 510 can calculate the Coefficient of Variation Root Mean Squared Prediction Error (CVRMSPE) is to evaluate the q-step ahead prediction error. For example, system identifier 510 can calculate the CVRMSPE for a range of values of q from zero-step ahead prediction up to $N_h$-step ahead prediction. Given a set of measured output values {y(0), ..., y(M)} for $M \in \mathbb{I}_{\geq 0}$, the CVRMSPE is given by:

$$CVRMSPE(q) = \frac{RMSPE(q)}{\bar{y}(q)} \quad \text{(Equation 19)}$$

where $$RMSPE(q) = \sqrt{\frac{\sum_{i=q+1}^{M} (y(i) - \hat{y}(i|i-q))}{M - q}}, \quad \text{(Equation 20)}$$

$$\bar{y}(q) = \frac{\sum_{i=q}^{M} y(i)}{M - q}, \quad \text{(Equation 21)}$$

for all $q \in \{0, \ldots, N_h-1\}$. The CVRMSPE helps identify the prediction error over the duration of the optimization period.

Once the system identification process is complete, system identifier 510 can provide the system matrices A, B, C, and D with identified parameters θ and the estimator gain K with identified parameters φ to state disturbance estimator 520 and predictive optimizer 522. State disturbance estimator 520 can use the system matrices A, B, C, and D and the estimator gain K to compute an estimate of the current state x̂(k) and unmeasured disturbance d̂(k) at each sample time.

Load/Rate Predictor

Referring again to FIG. 5, model predictive controller 302 is shown to include a load/rate predictor 518. Load/rate predictor 518 can be configured to predict the heat load disturbance $\overset{\wedge}{Q}_{other}(k)$ and the utility rates $\hat{r}_{elec}(k)$ for each time step k (e.g., k=1 ... n) of an optimization period. Load/rate predictor 518 can provide the load and rate predictions to predictive optimizer 522 for use in determining the optimal temperature setpoints $T_{sp}$.

In some embodiments, load/rate predictor 518 predicts the value of $\overset{\wedge}{Q}_{other}(k)$ at each time step k using a history of disturbance estimates $\hat{d}_{hist}$ generated by state/disturbance estimator 520. As described above, the state/disturbance estimation problem is given by:

$$\begin{bmatrix} \hat{T}_{ia}(k+1|k) \\ \hat{T}_m(k+1|k) \\ \hat{I}(k+1|k) \\ \hat{d}(k+1|k) \end{bmatrix} = \quad \text{(Equation 22)}$$

$$A_{aug} \begin{bmatrix} \hat{T}_{ia}(k|k-1) \\ \hat{T}_m(k|k-1) \\ \hat{I}(k|k-1) \\ \hat{d}(k|k-1) \end{bmatrix} + B_{aug} \begin{bmatrix} T_{sp}(k) \\ T_{oa}(k) \end{bmatrix} + \begin{bmatrix} K_x \\ K_d \end{bmatrix}$$

$$\left( \begin{bmatrix} T_{ia}(k) \\ \dot{Q}_{HVAC}(k) \end{bmatrix} - \begin{bmatrix} \hat{T}_{ia}(k|k-1) \\ \hat{\dot{Q}}_{HVAC}(k|k-1) \end{bmatrix} \right)$$

$$\begin{bmatrix} \hat{T}_{ia}(k|k-1) \\ \hat{\dot{Q}}_{HVAC}(k|k-1) \end{bmatrix} = C_{aug} \begin{bmatrix} \hat{T}_{ia}(k|k-1) \\ \hat{T}_m(k|k-1) \\ \hat{I}(k|k-1) \\ \hat{d}(k|k-1) \end{bmatrix} + D \begin{bmatrix} T_{sp}(k) \\ T_{oa}(k) \end{bmatrix}$$

where $$A_{aug} = \begin{bmatrix} A & B_d \\ 0 & I \end{bmatrix}, B_{aug} = \begin{bmatrix} B \\ 0 \end{bmatrix}, C_{aug} = \begin{bmatrix} C & 0 \end{bmatrix}.$$

State/disturbance estimator 520 can perform the state/disturbance estimation for each time step k to generate a disturbance estimate d̂(k) for each time step k. State/disturbance estimator 520 can record a history of disturbance estimates $\hat{d}_{hist} := \{\hat{d}(k|k-1)\}_{k=1}^{N_{hist}}$ and provide the history of disturbance estimates $\hat{d}_{hist}$ to load/rate predictor 518.

Load/rate predictor 518 can use the history of disturbance estimates $\hat{d}_{hist}$ to predict the value of $\overset{\wedge}{Q}_{other}(k)$ at each time step k. In some embodiments, the heat load disturbance $\overset{\wedge}{Q}_{other}(k)$ is a function of the time of day, the day type (e.g., weekend, weekday, holiday), the weather forecasts, building occupancy, and/or other factors which can be used by load/rate predictor 518 to predict the heat load disturbance $\overset{\wedge}{Q}_{other}(k)$. For example, load/rate predictor 518 can predict the heat load disturbance using the equation:

$$\overset{\wedge}{Q}_{other}(k) = f_{pred}(k\Delta + t_0, \hat{d}_{hist}) \quad \text{(Equation 23)}$$

where Δ>0 is the sample period and $t_0$ is an initial time. In some embodiments, load/rate predictor 518 uses weather forecasts from a weather service 526 and/or load history data from historical data 528 to predict the heat load disturbance $\overset{\wedge}{Q}_{other}(k)$ at each time step.

In some embodiments, load/rate predictor 518 uses a deterministic plus stochastic model trained from historical load data to predict the heat load disturbance $\overset{\wedge}{Q}_{other}(k)$. Load/rate predictor 518 may use any of a variety of prediction methods to predict the heat load disturbance $\overset{\wedge}{Q}_{other}(k)$ (e.g., linear regression for the deterministic portion and an AR model for the stochastic portion). In some embodiments, load/rate predictor 518 makes load/rate predictions using the techniques described in U.S. patent application Ser. No. 14/717,593.

Load/rate predictor 518 is shown receiving utility rates from utilities 524. Utility rates may indicate a cost or price per unit of a resource (e.g., electricity, natural gas, water, etc.) provided by utilities 524 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from utilities 524 or predicted utility rates estimated by load/rate predictor 518.

In some embodiments, the utility rates include demand charges for one or more resources provided by utilities 524. A demand charge may define a separate cost imposed by utilities 524 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Predictive optimizer 522 may be configured to account for demand charges in the high level optimization process performed by predictive optimizer 522. Utilities 524 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Load/rate predictor 518 may store the predicted heat load disturbance $\mathring{Q}_{other}(k)$ and the utility rates in memory 508 and/or provide the predicted heat load disturbance $\mathring{Q}_{other}(k)$ and the utility rates to predictive optimizer 522.

Predictive Optimizer

Still referring to FIG. 5, model predictive controller 302 is shown to include a predictive optimizer 522. Predictive optimizer 522 can manipulate the temperature setpoint $T_{sp}$ when operating in the operational mode to minimize the economic cost of operating HVAC equipment 308 over the duration of the optimization period. To determine the temperature setpoints $T_{sp}$, predictive optimizer 522 can optimize an objective function (i.e., a cost function) that accounts for the cost of operating HVAC equipment 308 over the duration of the optimization period. The costs of operating HVAC equipment 308 can include, for example, the costs of resources consumed by HVAC equipment 308 during operation (e.g., electricity, natural gas, water, etc.), demand charges imposed by an electric utility, peak load contribution charges, equipment degradation/replacement costs, and/or other costs associated with the operation of HVAC equipment 308.

An example of an objective function which can be optimized by predictive optimizer 522 is shown in the following equation:

$$\min_{T_{sp}\in_T,\delta T_{sp}} \sum_{k=0}^{N-1} (r_{elec}(k) \ell_{elec}(k) + p_{\in_T}\in_T(k) + p_{\delta T}\delta T_{sp}(k))) \quad \text{(Equation 24)}$$

where $r_{elec}(k)$ is the price of electricity at time step k, $\ell_{elec}(k)$ is the predicted electricity consumption of HVAC equipment 308 at time step k, $\in_T(k)$ is a number of degrees by which the zone temperature constraints are violated at time step k, $p_{\in_T}$ is a zone air temperature penalty coefficient applied to $\in_T(k)$, $\delta T_{sp}(k)$ is a number of degrees by which the zone temperature setpoint $T_{sp}$ changes between time step k−1 and time step k, and $p_{\delta T_{sp}}$ is a temperature setpoint change penalty coefficient applied to $\delta T_{sp}(k)$. Equation 24 accounts for the cost of electricity consumption ($r_{elec}(k)$ $\ell_{elec}(k)$), penalizes violations of the indoor air temperature bounds ($p_{\in_T}\in_T(k)$), and penalizes changes in the temperature setpoint ($p_{\delta T}\delta T_{sp}(k)$).

If additional resources (other than electricity) are consumed by HVAC equipment 308, additional terms can be added to Equation 24 to represent the cost of each resource consumed by HVAC equipment 308. For example, if HVAC equipment 308 consume natural gas and water in addition to electricity, Equation 24 can be updated to include the terms $r_{gas}(k)\ell_{gas}(k)$ and $r_{water}(k)\ell_{water}(k)$ in the summation, where $r_{gas}(k)$ is the cost per unit of natural gas at time step k, $\ell_{gas}(k)$ is the predicted natural gas consumption of HVAC equipment 308 at time step k, $r_{water}(k)$ is the cost per unit of water at time step k, and $\ell_{water}(k)$ is the predicted water consumption of HVAC equipment 308 at time step k.

Predictive optimizer 522 can be configured to estimate the amount of each resource consumed by HVAC equipment 308 (e.g., electricity, natural gas, water, etc.) as a function of the sensible heating or cooling load $\mathring{Q}_{HVAC}$. In some embodiments, a constant efficiency model is used to compute the resource consumption of HVAC equipment 308 as a fixed multiple heating or cooling load $\mathring{Q}_{HVAC}$ (e.g., $\ell_{elec}(k)=\eta \mathring{Q}_{HVAC}(k)$). In other embodiments, equipment models describing a relationship between resource consumption and heating/cooling production can be used to approximate the resource consumption of the HVAC equipment 308. The equipment models may account for variations in equipment efficiency as a function of load and/or other variables such as outdoor weather conditions (e.g., $\ell_{elec}(k)=f(\mathring{Q}_{HVAC}(k), T_{oa}(k), \eta_{base})$). Predictive optimizer 522 can convert the estimated heating/cooling load $\mathring{Q}_{HVAC}(k)$ at each time step to one or more resource consumption values (e.g., $\ell_{elec}(k)$, $\ell_{gas}(k)$, $\ell_{water}(k)$, etc.) for inclusion in the objective function.

In some embodiments, predictive optimizer 522 is configured to modify the objective function to account for various other costs associated with operating HVAC equipment 308. For example, predictive optimizer 522 can modify the objective function to account for one or more demand charges, peak load contribution charges, equipment degradation costs, equipment purchase costs, revenue generated from participating in incentive-based demand response programs, economic load demand response, and/or any other factors that can contribute to the cost incurred by operating HVAC equipment 308 or revenue generated by operating HVAC equipment 308. Predictive optimizer 522 can add one or more additional terms to the objective function to account for these or other factors. Several examples of such functionality are described in U.S. patent application Ser. No. 15/405,236 filed Jan. 12, 2017, U.S. patent application Ser. No. 15/405,234 filed Jan. 12, 2017, U.S. patent application Ser. No. 15/426,962 filed Feb. 7, 2017, U.S. patent application Ser. No. 15/473,496 filed Mar. 29, 2017, and U.S. patent application Ser. No. 15/616,616 filed Jun. 7, 2017. The entire disclosure of each of these patent applications is incorporated by reference herein. In some embodiments, model predictive controller 302 includes some or all of the functionality of the controllers and/or control systems described in these patent applications.

Predictive optimizer 522 can be configured to automatically generate and impose constraints on the optimization of the objective function. The constraints may be based on the system model provided by system identifier 510, the state estimates provided by state/disturbance estimator 520, the heat load disturbance predictions provided by load/rate predictor 518, and constraints on the zone air temperature $T_{ia}$. For example, predictive optimizer 522 can generate and impose the following constraints for each time step $k \in \{0, \ldots, N-1\}$:

$$\begin{bmatrix} T_{ia}(k+1) \\ T_m(k+1) \\ I(k+1) \end{bmatrix} = A \begin{bmatrix} T_{ia}(k) \\ T_m(k) \\ I(k) \end{bmatrix} + B \begin{bmatrix} T_{sp}(k) \\ T_{oa}(k) \end{bmatrix} + B_d \dot{Q}_{other}(k) \quad \text{(Equation 25)}$$

$$[\dot{Q}_{HVAC}(k)] = C \begin{bmatrix} T_{ia}(k) \\ T_m(k) \\ I(k) \end{bmatrix} + D \begin{bmatrix} T_{sp}(k) \\ T_{oa}(k) \end{bmatrix} \quad \text{(Equation 26)}$$

$$\hat{\ell}_{elec}(k) = \eta \dot{Q}_{HVAC}(k) \quad \text{(Equation 27)}$$

$$T_{ia}(k) \leq T_{max}(k) + T_{deadband} + \epsilon_T(k) \quad \text{(Equation 28)}$$

$$T_{ia}(k) \geq T_{min}(k) - T_{deadband} + \epsilon_T(k) \quad \text{(Equation 29)}$$

$$T_{sp}(k) \in [T_{sp,min}(k), T_{sp,max}(k)] \quad \text{(Equation 30)}$$

$$T_{sp}(k+1) - T_{sp}(k) \leq \delta T_{sp}(k) \quad \text{(Equation 31)}$$

$$-T_{sp}(k+1) + T_{sp}(k) \leq \delta T_{sp}(k) \quad \text{(Equation 32)}$$

$$\epsilon_T(k) \geq 0 \quad \text{(Equation 33)}$$

$$T_{ia}(0) = \hat{T}_{ia,0}, \; T_m(0) = \hat{T}_{m,0}, \; I(0) = \hat{I}_0 \quad \text{(Equation 34)}$$

Equation 25 is based on the thermal mass storage model provided by thermal mass storage model generator 512. The thermal mass storage model predicts the system states at each time step k+1 as a function of the system states x(k), inputs u(k), and heat load disturbance at the previous time step k. Specifically, Equation 25 defines the relationship between the system states $T_{ia}(k+1)$, $T_m(k+1)$, and $I(k+1)$ at time step k+1, the system states $T_{ia}(k)$, $T_m(k)$, and $I(k)$ at time step k, the controlled or measured inputs $T_{sp}(k)$ and $T_{oa}(k)$ at time step k, and the estimated heat load disturbance $\dot{Q}_{other}(k)$ at time step k. The parameters in the matrices A and B can be determined by system identifier 510, as previously described. The value of $\dot{Q}_{other}(k)$ at each time step k can be determined by load/rate predictor 518.

Equation 26 is based on the HVAC load model provided by HVAC load model generator 514. The HVAC load model defines the heating/cooling load $\dot{Q}_{HVAC}(k)$ at each time step k as a function of the system states $T_{ia}(k)$, $T_m(k)$, and $I(k)$ at time step k and the controlled or measured inputs $T_{sp}(k)$ and $T_{oa}(k)$ at time step k. The parameters in the matrices C and D can be determined by system identifier 510, as previously described.

Equation 27 defines the relationship between the predicted electric consumption $\hat{\ell}_{elec}(k)$ at time step k and the heating/cooling load $\dot{Q}_{HVAC}(k)$ at time step k. If additional resources (other than electricity) are consumed by HVAC equipment 308, additional constraints can be added to define the relationship between $\dot{Q}_{HVAC}(k)$ and the amount of each resource consumed by HVAC equipment 308.

Equations 28 and 29 constrain the zone air temperature $T_{ia}(k)$ at each time step k between the minimum temperature threshold $T_{min}(k)$ and the maximum temperature threshold $T_{max}(k)$ at that time step k, plus or minus the temperature deadband $T_{deadband}$ and a temperature error $\epsilon_T(k)$. In some embodiments, the values of the minimum temperature threshold $T_{min}(k)$ and the maximum temperature threshold $T_{max}(k)$ can vary over the duration of the optimization period. For example, the minimum temperature threshold $T_{min}(k)$ and the maximum temperature threshold $T_{max}(k)$ may define a first zone temperature range (i.e., $T_{min}(k)$ to $T_{max}(k)$) during time step k and a second zone temperature range (i.e., $T_{min}(k+1)$ to $T_{max}(k+1)$) during time step k+1. The values of $T_{min}$ and $T_{max}$ at each time step can vary as a function of the time of day, day of the week, building occupancy, or other factors. Predictive optimizer 522 may be allowed to violate the temperature constraints if necessary, but any deviation from the defined temperature range (i.e., between $T_{min}(k)-T_{deadband}$ and $T_{max}(k)+T_{deadband}$) may be penalized in the objective function by imposing a penalty $p_{\epsilon_T}$ on the temperature error $\epsilon_T(k)$. Equation 33 requires the temperature error $\epsilon_T(k)$ to be non-negative at each time step k.

Equation 30 limits the temperature setpoint $T_{sp}(k)$ at each time step between a minimum temperature setpoint $T_{sp,min}(k)$ and a maximum temperature setpoint $T_{sp,max}(k)$, whereas Equations 31-32 define the changes $\delta T_{sp}(k)$ in the temperature setpoint $T_{sp}(k)$ between consecutive time steps. The minimum temperature setpoint $T_{sp,min}(k)$ and the maximum temperature setpoint $T_{sp,max}(k)$ may be different from the minimum temperature threshold $T_{min}(k)$ and the maximum temperature threshold $T_{max}(k)$ used to constrain the zone air temperature $T_{ia}(k)$. In some embodiments, the values of the minimum temperature setpoint $T_{sp,min}(k)$ and the maximum temperature setpoint $T_{sp,max}(k)$ can vary over the duration of the optimization period. For example, the minimum temperature setpoint $T_{sp,min}(k)$ and the maximum temperature setpoint $T_{sp,max}(k)$ may define a first temperature setpoint range (i.e., $T_{sp,min}(k)$ to $T_{sp,max}(k)$) during time step k and a second temperature setpoint range (i.e., $T_{sp,min}(k+1)$ to $T_{sp,max}(k+1)$) during time step k+1. The values of $T_{sp,min}$ and $T_{sp,max}$ at each time step can vary as a function of the time of day, day of the week, building occupancy, or other factors. Changes in the temperature setpoint $T_{sp}$ may be penalized in the objective function by imposing a penalty $p_{\delta T_{sp}}$ on the temperature change $\delta T_{sp}(k)$.

Equation 34 sets the initial system states for the zone air temperature $T_{ia}(0)$, the zone mass temperature $T_m(0)$, and the integrated disturbance $I(0)$ at the first time step k=0 of the optimization period. The initial system states $T_{ia}(0)$, $T_m(0)$, and $I(0)$ may be set to the initial state estimates $\hat{T}_{ia,0}$, $\hat{T}_{m,0}$, and $\hat{I}_0$ provided by state/disturbance estimator 520. In other words, the predictive model shown in Equations 25-26 may be initialized using the state estimates provided by state/disturbance estimator 520.

Predictive optimizer 522 can be configured to optimize the objective function (Equation 24) subject to the optimization constraints (Equations 25-34) to determine optimal values of the temperature setpoint $T_{sp}(k)$ at each time step k of the optimization period. Predictive optimizer 522 can use any of a variety of optimization techniques to perform the optimization. For example, the optimization problem can be formulated as a linear program (Equations 24-34) and solved using a linear optimization technique (e.g., a basis exchange algorithm, an interior point algorithm, a cutting-plane algorithm, a branch and bound algorithm, etc.) using any of a variety solvers and/or programming languages. In some embodiments, predictive optimizer 522 performs the optimization at the beginning of each time step k to determine optimal temperature setpoints $T_{sp}(k)$ for the next N time steps.

Once the optimal temperature setpoints $T_{sp}$ have been determined, predictive optimizer 522 can provide the optimal temperature setpoint $T_{sp}(k)$ for the current time step k to smart thermostat 100 and/or equipment controller 406. State/disturbance estimator 520 can use the temperature setpoint $T_{sp}(k)$ for the current time step k along with feedback received from HVAC equipment 308 and building zone 310 during time step k (e.g., measurements of $T_{ia}(k)$, $T_{oa}(k)$, $\dot{Q}_{HVAC}(k)$, etc.) to update the state/disturbance estimates the next time the optimization is performed.

Model Predictive Control Processes

Figure 12:
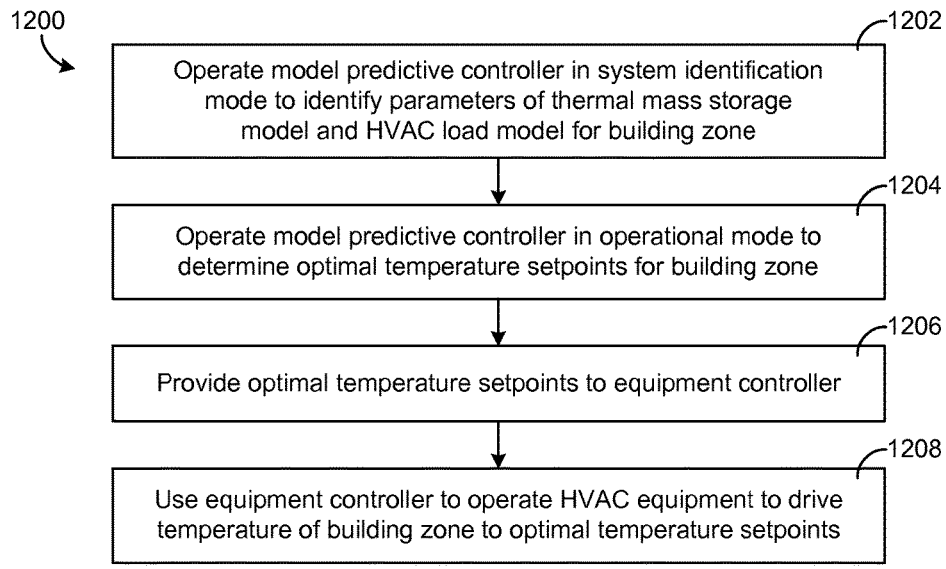
FIG. 12 is a flowchart of a process for operating the model predictive controller of FIG. 5 in a system identification mode and in an operational mode, according to some embodiments.
Figure 13:
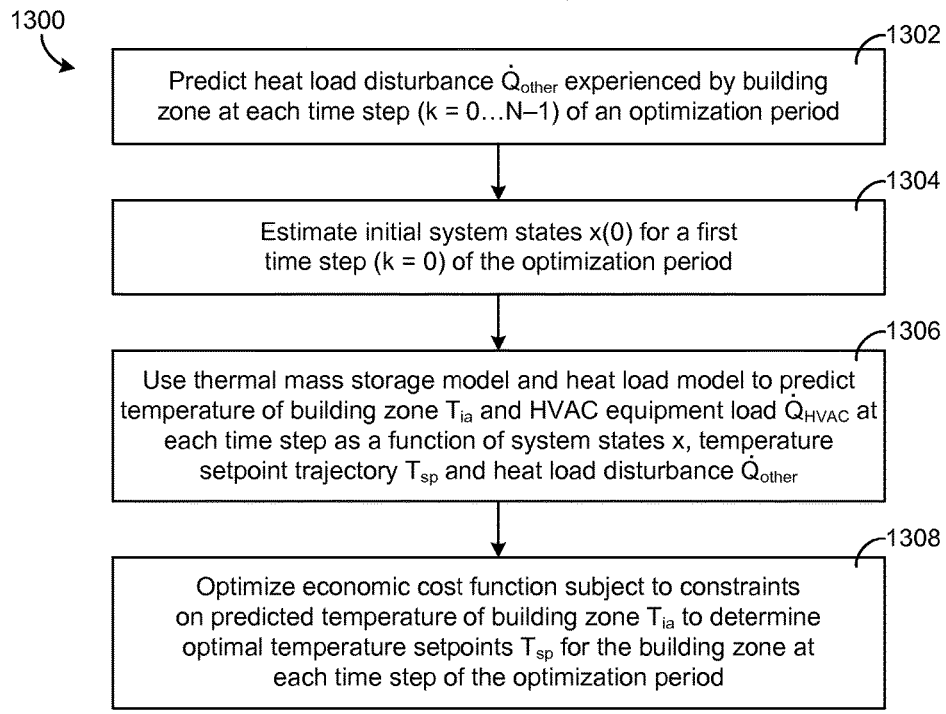
FIG. 13 is a flowchart of a process which can be performed by the model predictive controller of FIG. 5 to determine optimal temperature setpoints when operating in the operational mode, according to some embodiments.
Figure 14:
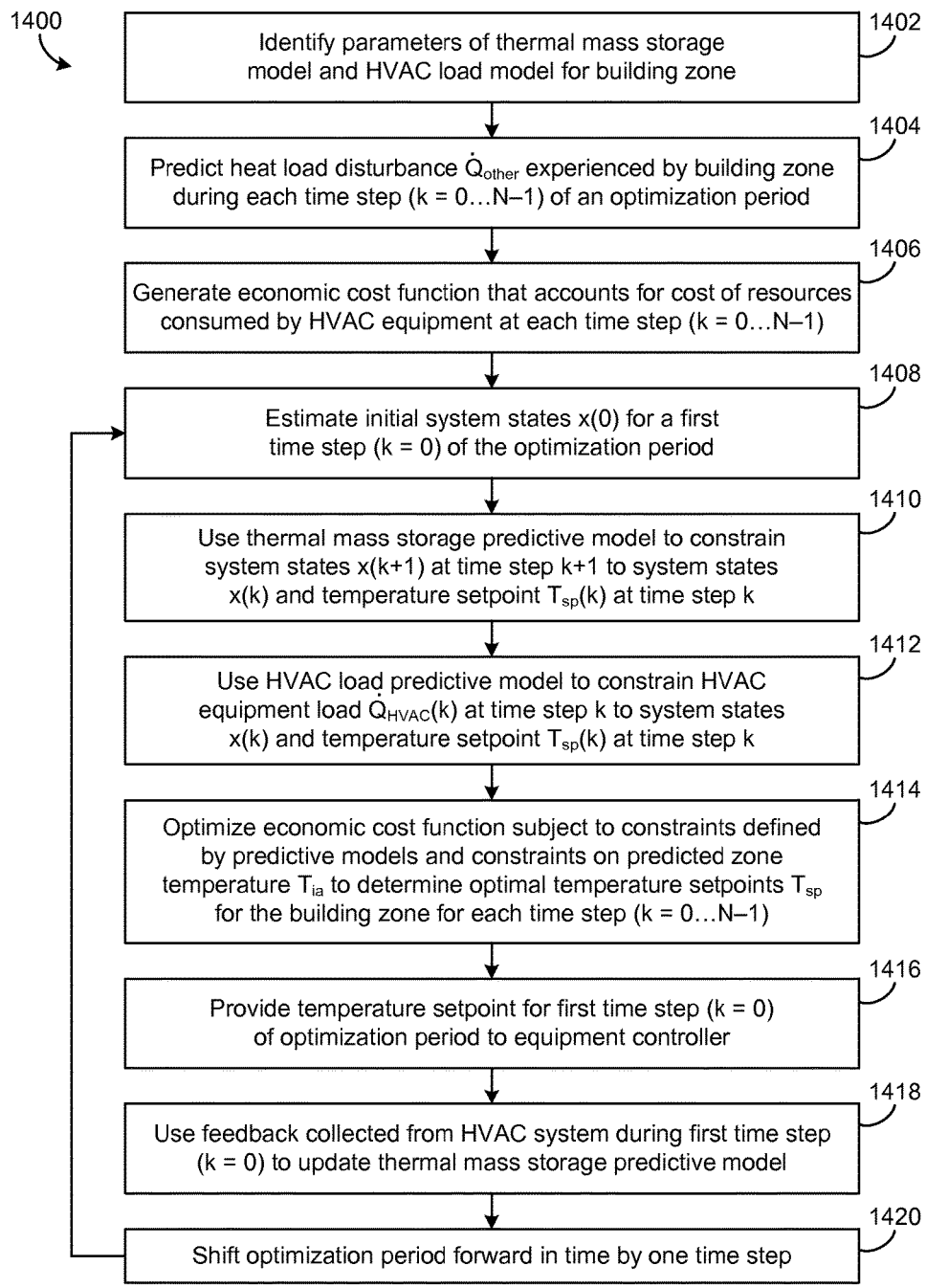
FIG. 14 is a flowchart of a process which can be performed by the model predictive controller of FIG. 5 to generate a predictive model and use the predictive model to determine optimal temperature setpoints for a building zone, according to some embodiments.
Figure 15:
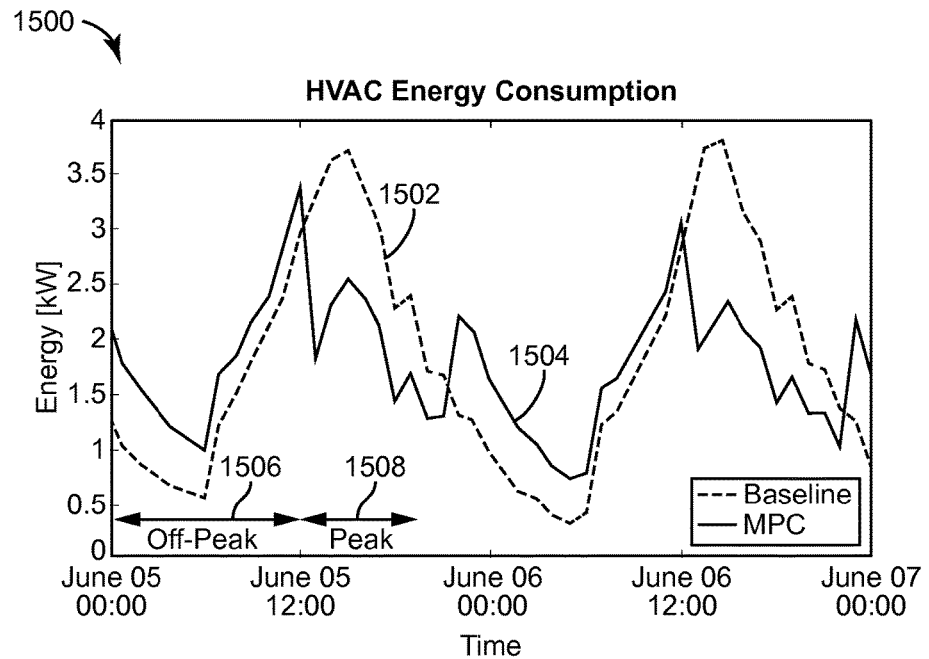
FIG. 15 is a graph comparing the energy consumption of the model predictive control systems of FIGS. 3-4 with a baseline system that does not use model predictive control, according to some embodiments.
Figure 16:
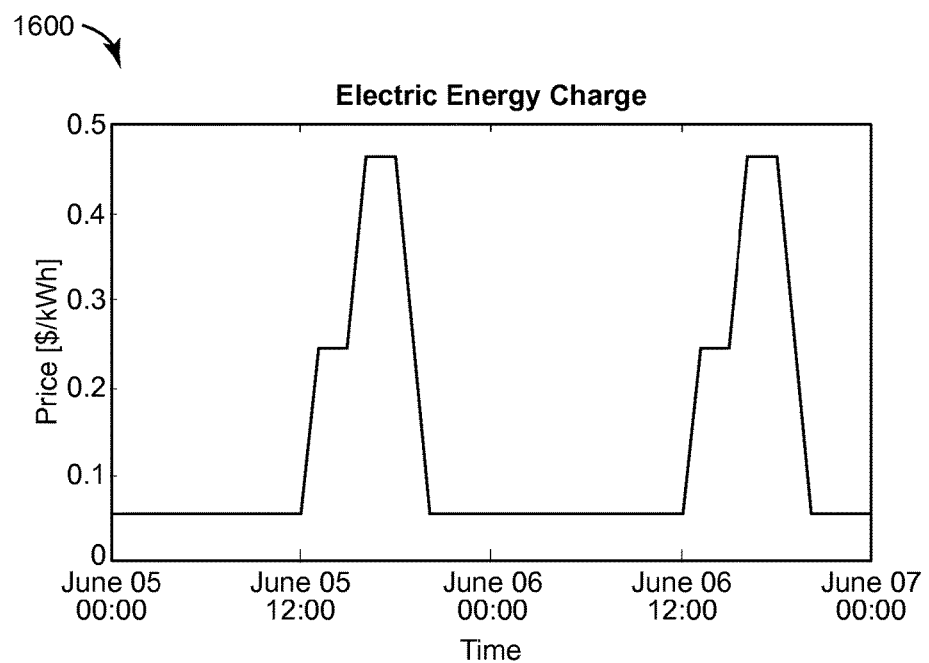
FIG. 16 is a graph of time-varying electricity prices illustrating different electricity prices at different times, according to some embodiments.
Figure 17:
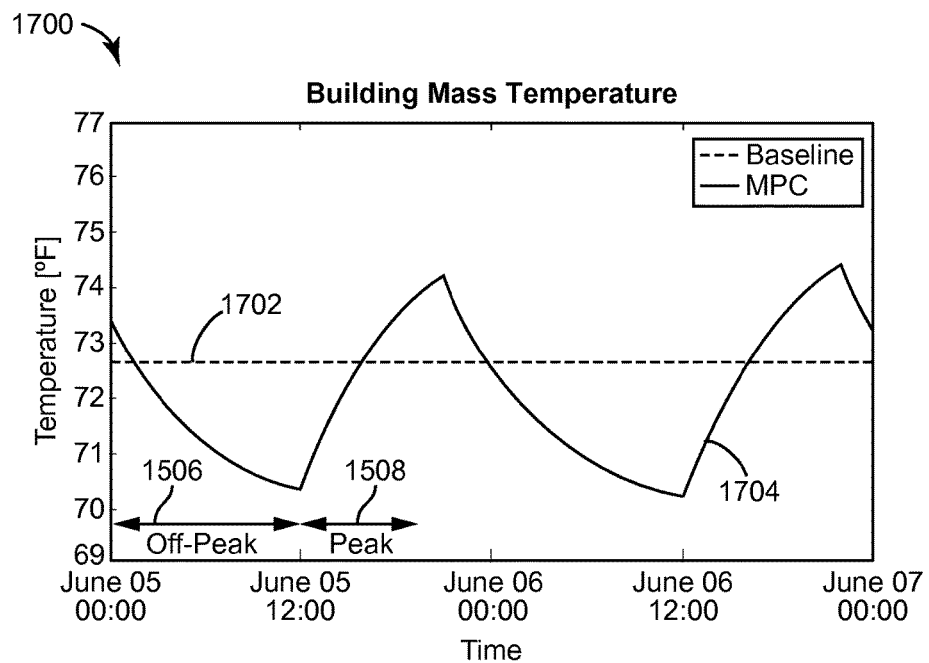
FIG. 17 is a graph comparing the building mass temperature in the model predictive control systems of FIGS. 3-4 with a baseline system that does not use model predictive control, according to some embodiments.
Figure 18:
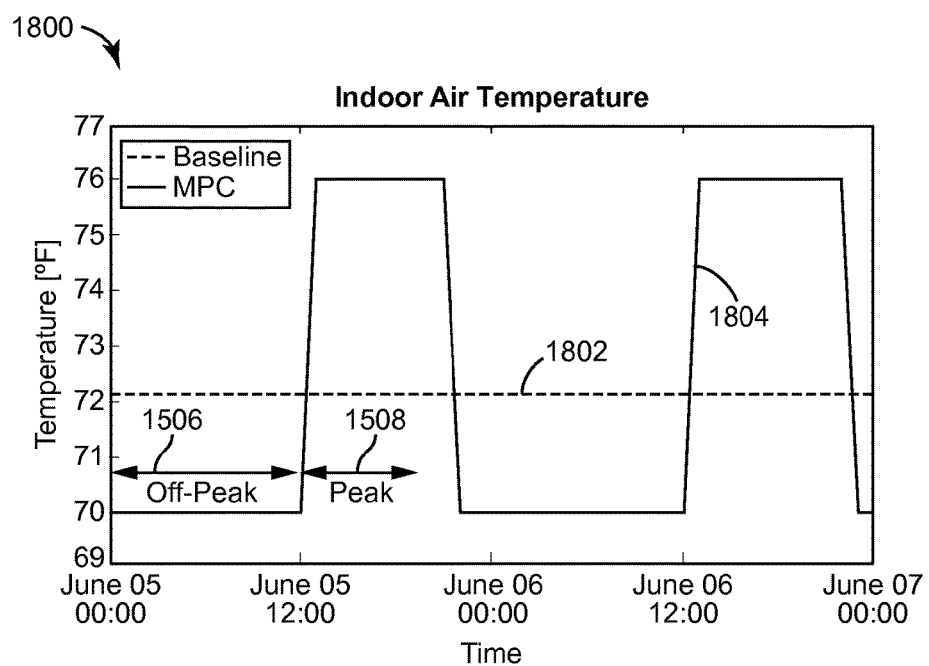
FIG. 18 is a graph comparing the zone air temperature in the model predictive control systems of FIGS. 3-4 with a baseline system that does not use model predictive control, according to some embodiments.

Referring now to FIGS. 12-14, several flowcharts of model predictive control processes 1200-1400 are shown, according to some embodiments. Processes 1200-1400 can be performed by one or more components of model predictive control systems 300-400, as described with reference to FIGS. 3-11. For example, processes 1200-1400 can be performed by model predictive controller 302, smart thermostat 100, equipment controller 406, and/or HVAC equipment 308 to control the temperature of building zone 310.

Referring specifically to FIG. 12, process 1200 is shown to include operating a model predictive controller in system identification mode to identify parameters of a thermal mass storage model and a HVAC load model for a building zone (step 1202). In some embodiments, step 1202 is performed by system identifier 510. Step 1202 can include generating a thermal mass storage model by modeling the heat transfer characteristics of the building zone using a thermal circuit 800, as described with reference to FIG. 8. Step 1202 may also include generating a HVAC load model by modeling the amount of heating/cooling $\dot{Q}_{HVAC}$ provided by HVAC equipment 308 as a function of the temperature setpoint $T_{sp}$ and the zone air temperature $T_{ia}$. The thermal mass storage model and the HVAC load model can be used to generate a system of differential equations that define the relationship between zone air temperature $T_{ia}$, zone mass temperature $T_m$, outdoor air temperature $T_{oa}$, the amount of heating or cooling $\dot{Q}_{HVAC}$ provided by HVAC equipment 308, the heat load disturbance $\dot{Q}_{other}$, and the temperature setpoint $T_{sp}$.

The unknown parameters in the thermal mass storage model and the HVAC load model (e.g., $R_{oi}$, $R_{mi}$, $C_m$, $C_{ia}$) can be organized into parameter matrices A, B, C, and D, as shown in the following equations:

$$\begin{bmatrix} \dot{T}_{ia} \\ \dot{T}_m \\ \dot{I} \end{bmatrix} = \begin{bmatrix} \frac{1}{C_{ia}}\left(K_{p,j} - \frac{1}{R_{mi}} - \frac{1}{R_{oi}}\right) & \frac{1}{C_{ia}R_{mi}} & -\frac{K_{p,j}K_{I,j}}{C_{ia}} \\ \frac{1}{C_mR_{mi}} & -\frac{1}{C_mR_{mi}} & 0 \\ -1 & 0 & 0 \end{bmatrix} \begin{bmatrix} T_{ia} \\ T_m \\ I \end{bmatrix} +$$

$$\begin{bmatrix} -\frac{K_{p,j}}{C_{ia}} & \frac{1}{C_{ia}R_{oi}} \\ 0 & 0 \\ 1 & 0 \end{bmatrix} \begin{bmatrix} T_{sp,j} \\ T_{oa} \end{bmatrix} + \begin{bmatrix} \frac{1}{C_{ia}} \\ 0 \\ 0 \end{bmatrix} \dot{Q}_{other}$$

$$\begin{bmatrix} T_{ia} \\ \dot{Q}_{HVAC,j} \end{bmatrix} = \begin{bmatrix} 1 & 0 & 0 \\ -K_{p,j} & 0 & K_{I,j} \end{bmatrix} \begin{bmatrix} T_{ia} \\ T_m \\ I \end{bmatrix} + \begin{bmatrix} 0 & 0 \\ K_{p,j} & 0 \end{bmatrix} \begin{bmatrix} T_{sp,j} \\ T_{oa} \end{bmatrix}$$

or more compactly:

$$\dot{x} = A_c(\theta)x + B_c(\theta)u + B_d d$$

$$y = C_c(\theta)x + D_c(\theta)u$$

where $x^T = [T_{ia}, T_m, I]$, $u^T = [T_{sp,j}, T_{oa}]$, $d = \dot{Q}_{other}/C_{ia}$, $y^T = [T_{ia}, \dot{Q}_{HVAC,j}]$, $\theta$ is a parameter vector containing all non-zero entries of the system matrices, and $$A_c(\theta) = \begin{bmatrix} -\theta_5(\theta_1 + \theta_2 + \theta_4) & \theta_5\theta_2 & \theta_3\theta_4\theta_5 \\ \theta_6\theta_2 & -\theta_6\theta_2 & 0 \\ -1 & 0 & 0 \end{bmatrix},$$

$$B_c(\theta) = \begin{bmatrix} \theta_1\theta_5 & \theta_4\theta_5 \\ 0 & 0 \\ 1 & 0 \end{bmatrix}, B_d = \begin{bmatrix} \theta_5 \\ 0 \\ 0 \end{bmatrix}, C_c(\theta) = \begin{bmatrix} 1 & 0 & 0 \\ -\theta_4 & 0 & \theta_3\theta_4 \end{bmatrix},$$

$$C_d(\theta) = \begin{bmatrix} 0 \\ 0 \end{bmatrix}, D_c(\theta) = \begin{bmatrix} 0 & 0 \\ \theta_4 & 0 \end{bmatrix}$$

The unknown parameters $\theta$ in the thermal mass storage model and the HVAC load model (i.e., the parameters in matrices A, B, C, and D) can be identified by fitting the parameters $\theta$ to a set of input-output data (e.g., sets of values $T_{ia}$, $T_{oa}$, $T_{sp}$, and $\dot{Q}_{HVAC}$) collected from the HVAC system when operating in the system identification mode. In some embodiments, the input-output data are collected by modulating the temperature setpoint $T_{sp}$ and observing the corresponding values of $T_{ia}$, $T_{oa}$, and $\dot{Q}_{HVAC}$ for a plurality of time steps during the system identification mode. The process of fitting the model parameters $\theta$ to the set of input-output data can be accomplished by performing process 900, as described with reference to FIG. 9.

If HVAC equipment 308 are staged, step 1202 can include filtering input-output data to remove the high frequency dither in the indoor air temperature $T_{ia}$ and can compute a time-averaged version of the HVAC load $\dot{Q}_{HVAC}$ from the discrete HVAC staging trajectory. The thermal model parameters and HVAC load model parameters $\theta$ can then be fit to the input-output data (or filtered input-output data). In some embodiments, step 1202 includes augmenting the resulting state-space model with another integrating disturbance model and estimating the Kalman filter gain for the resulting model. Using data obtained in a secondary experiment or under normal operation, step 1202 can include validating the model through the use of statistics that capture the multi-step prediction accuracy of the resulting model.

Still referring to FIG. 12, process 1200 is shown to include operating the model predictive controller in operational mode to determine temperature setpoints $T_{sp}$ for the building zone (step 1204). In some embodiments, step 1204 is performed by predictive optimizer 522, as described with reference to FIG. 5. To determine the temperature setpoints $T_{sp}$, step 1204 can include optimizing an objective function (i.e., a cost function) that accounts for the cost of operating HVAC equipment 308 over the duration of the optimization period. The costs of operating HVAC equipment 308 can include, for example, the costs of resources consumed by HVAC equipment 308 during operation (e.g., electricity, natural gas, water, etc.), demand charges imposed by an electric utility, peak load contribution charges, equipment degradation/replacement costs, and/or other costs associated with the operation of HVAC equipment 308. The objective function can be optimized subject to constraints provided by the thermal mass storage model and the HVAC load model, as well as constraints on the zone temperature $T_{ia}$. Step 1204 can be accomplished by performing process 1300, described in greater detail with reference to FIG. 13.

In some embodiments, process 1200 includes automatically switching between the system identification mode and the operational mode based on a prediction error of the thermal mass storage model and/or the HVAC load model. For example, process 1200 can include comparing the value of the zone temperature $\hat{T}_{ia}(k|k-1)$ predicted by the thermal mass storage model to the actual measured value of the zone temperature $T_{ia}(k)$. If the difference between the predicted value $\hat{T}_{ia}(k|k-1)$ and the actual value $T_{ia}(k)$ exceeds an error threshold, process 1200 may automatically return to step 1202 and repeat the system identification process. Similarly, process 1200 can include comparing the value of the HVAC equipment load $\hat{\dot{Q}}_{HVAC}(k|k-1)$ predicted by the HVAC load model to the actual value of the HVAC load $\dot{Q}_{HVAC}(k)$. If the difference between the predicted value $\hat{\dot{Q}}_{HVAC}(k|k-1)$ and the actual value $\dot{Q}_{HVAC}(k)$ exceeds an error threshold, process 1200 may automatically return to step 1202 and repeat the system identification process.

Process 1200 is shown to include providing the optimal temperature setpoints $T_{sp}$ to an equipment controller (step 1206) and using the equipment controller to operate HVAC equipment to drive the temperature of the building zone $T_{ia}$ to the optimal temperature setpoints $T_{sp}$ (step 1208). Step 1206 can include sending the optimal temperature setpoints $T_{sp}$ from model predictive controller 302 to an equipment controller 406. In some embodiments, both model predictive controller 302 and equipment controller 406 are components of a smart thermostat 100 (as shown in FIG. 4). In other embodiments, model predictive controller 302 is separate from smart thermostat 100 and configured to send the optimal temperature setpoints to smart thermostat 100 via a communications network 304 (as shown in FIG. 3). Smart thermostat 100 and/or equipment controller 406 can use the optimal temperature setpoints $T_{sp}$ to generate control signals for HVAC equipment 308 which operate to drive the temperature of the building zone $T_{ia}$ to the optimal temperature setpoints $T_{sp}$.

Referring now to FIG. 13, a flowchart of a process 1300 for generating optimal temperature setpoints for a building zone is shown, according to some embodiments. In some embodiments, process 1300 is performed by model predictive controller 302, as described with reference to FIGS. 5-11. Process 1300 can be performed to accomplish step 1204 of process 1200.

Process 1300 is shown to include predicting a heat load disturbance $\dot{Q}_{other}$ experienced by a building zone at each time step (k=0 . . . N-1) of an optimization period (step 1302). In some embodiments, step 1302 is performed by load/rate predictor 518 and state/disturbance predictor 520. Step 1302 can include generating a disturbance estimate $\hat{d}(k)$ for each time step k in the optimization period. In some embodiments, step 1302 includes estimating the disturbance state $\hat{d}(k)$ at each time step k in the optimization period using the following state/disturbance model:

$$\begin{bmatrix} \hat{T}_{ia}(k+1|k) \\ \hat{T}_{m}(k+1|k) \\ \hat{I}(k+1|k) \\ \hat{d}(k+1|k) \end{bmatrix} = A_{aug} \begin{bmatrix} \hat{T}_{ia}(k|k-1) \\ \hat{T}_{m}(k|k-1) \\ \hat{I}(k|k-1) \\ \hat{d}(k|k-1) \end{bmatrix} +$$

$$B_{aug} \begin{bmatrix} T_{sp}(k) \\ T_{oa}(k) \end{bmatrix} + \begin{bmatrix} K_x \\ K_d \end{bmatrix} \left( \begin{bmatrix} T_{ia}(k) \\ \dot{Q}_{HVAC}(k) \end{bmatrix} - \begin{bmatrix} \hat{T}_{ia}(k|k-1) \\ \hat{\dot{Q}}_{HVAC}(k|k-1) \end{bmatrix} \right)$$

$$\begin{bmatrix} \hat{T}_{ia}(k|k-1) \\ \hat{\dot{Q}}_{HVAC}(k|k-1) \end{bmatrix} = C_{aug} \begin{bmatrix} \hat{T}_{ia}(k|k-1) \\ \hat{T}_{m}(k|k-1) \\ \hat{I}(k|k-1) \\ \hat{d}(k|k-1) \end{bmatrix} + D \begin{bmatrix} T_{sp}(k) \\ T_{oa}(k) \end{bmatrix}$$

where $$A_{aug} = \begin{bmatrix} A & B_d \\ 0 & I \end{bmatrix}, B_{aug} = \begin{bmatrix} B \\ 0 \end{bmatrix}, C_{aug} = \begin{bmatrix} C & 0 \end{bmatrix}.$$

Step 1302 can include recording a history of disturbance estimates $\hat{d}_{hist} := \{\hat{d}(k|k-1)\}_{k=1}^{N_{hist}}$ predicted by the state/disturbance model.

Step 1302 can include using the history of disturbance estimates $\hat{d}_{hist}$ to predict the value of $\hat{\dot{Q}}_{other}(k)$ at each time step k. In some embodiments, the heat load disturbance $\hat{\dot{Q}}_{other}(k)$ is a function of the time of day, the day type (e.g., weekend, weekday, holiday), the weather forecasts, building occupancy, and/or other factors which can be used by load/rate predictor 518 to predict the heat load disturbance $\hat{\dot{Q}}_{other}(k)$. For example, step 1302 can include predicting the heat load disturbance using the equation:

$$\hat{\dot{Q}}_{other}(k) = f_{pred}(k\Delta + t_0, \hat{d}_{hist})$$

where $\Delta > 0$ is the sample period and $t_0$ is an initial time. In some embodiments, step 1302 includes using weather forecasts from a weather service 526 and/or load history data from historical data 528 to predict the heat load disturbance $\hat{\dot{Q}}_{other}(k)$ at each time step.

In some embodiments, step 1302 includes using a deterministic plus stochastic model trained from historical load data to predict the heat load disturbance $\hat{\dot{Q}}_{other}(k)$. Step 1302 can include using any of a variety of prediction methods to predict the heat load disturbance $\hat{\dot{Q}}_{other}(k)$ (e.g., linear regression for the deterministic portion and an AR model for the stochastic portion). In some embodiments, step 1302 includes predicting the heat load disturbance $\hat{\dot{Q}}_{other}(k)$ using the techniques described in U.S. patent application Ser. No. 14/717,593.

Still referring to FIG. 13, process 1300 is shown to include estimating initial system states $\hat{x}(0)$ for a first time step (k=0) of the optimization period (step 1304). The initial system states $\hat{x}(0)$ may include the estimated zone air temperature $\hat{T}_{ia}(0)$, the estimated zone mass temperature $\hat{T}_m(0)$, and the estimated integrating disturbance $\hat{I}(0)$ at the beginning of the optimization period. In some embodiments, step 1304 is performed by state/disturbance estimator 520. The initial system states $\hat{x}(0)$ can be estimated using same the state/disturbance estimation model used in step 1302. For example, step 1304 can include estimating the system states $\hat{x}(k)$ at each time step k using the following equation:

$$\hat{x}(k+1|k) = A\hat{x}(k|k-1) + Bu(k) + K(y(k) - \hat{y}(k|k-1))$$

$$\hat{y}(k|k-1) = C\hat{x}(k|k-1) + Du(k)$$

where $\hat{x}(k+1|k)$ is the estimated/predicted state at time step k+1 given the measurement at time step k, $\hat{y}(k|k-1)$ is the predicted output at time step k given the measurement at time step k−1, and K is the estimator gain.

In some embodiments, the estimated state vector $\hat{x}(k+1|k)$, the output vector $\hat{y}(k-1)$, and the input vector u(k) are defined as follows:

$$\hat{x}(k+1|k) = \begin{bmatrix} \hat{T}_{ia}(k+1|k) \\ \hat{T}_m(k+1|k) \\ \hat{I}(k+1|k) \end{bmatrix}, \hat{y}(k|k-1) = \begin{bmatrix} \hat{T}_{ia}(k|k-1) \\ \hat{Q}_{HVAC}(k|k-1) \end{bmatrix},$$

$$u(k) = \begin{bmatrix} T_{sp}(k) \\ T_{oa}(k) \end{bmatrix}$$

where $\hat{T}_{ia}$ is an estimate of the zone air temperature $T_{ia}$, $\hat{T}_m$ is an estimate of the zone mass temperature $T_m$, $\hat{I}$ is an estimate of the integrating disturbance I, $\hat{Q}_{HVAC}$ is an estimate of the heating or cooling load provided by HVAC equipment 308, $T_{sp}$ is the temperature setpoint, and $T_{oa}$ is the outdoor air temperature. The estimated system states $\hat{x}(0)$ at the first time step k=0 can be used as the initial system states.

Still referring to FIG. 13, process 1300 is shown to include using a thermal mass storage model and a heat load model to predict the temperature of the building zone $\hat{T}_{ia}$ and the HVAC equipment load $\hat{Q}_{HVAC}$ at each time step as a function of the estimated system states $\hat{x}$, temperature setpoint trajectory $T_{sp}$, and estimated heat load disturbance $\hat{Q}_{other}$ (step 1306). The thermal mass storage model may be defined as follows:

$$\begin{bmatrix} \hat{T}_{ia}(k+1) \\ \hat{T}_m(k+1) \\ \hat{I}(k+1) \end{bmatrix} = A \begin{bmatrix} \hat{T}_{ia}(k) \\ \hat{T}_m(k) \\ \hat{I}(k) \end{bmatrix} + B \begin{bmatrix} T_{sp}(k) \\ T_{oa}(k) \end{bmatrix} + B_d \hat{Q}_{other}(k)$$

where $\hat{T}_{ia}(k+1)$ is the predicted temperature of the building zone at time step k+1, $\hat{T}_m(k+1)$ is the predicted temperature of the building mass at time step k+1, $\hat{I}(k+1)$ is the predicted value of the integrating disturbance at time step k+1, $\hat{T}_{ia}(k)$ is the predicted temperature of the building zone at time step k, $\hat{T}_m(k)$ is the predicted temperature of the building mass at time step k, $\hat{I}(k)$ is the predicted value of the integrating disturbance at time step k, $T_{sp}(k)$ is the temperature setpoint at time step k, $T_{oa}(k)$ is the outdoor air temperature (measured) at time step k, and $\hat{Q}_{other}(k)$ is the estimated heat load disturbance at time step k.

The HVAC load model may be defined as follows:

$$\left[\hat{Q}_{HVAC}(k)\right] = C \begin{bmatrix} \hat{T}_{ia}(k) \\ \hat{T}_m(k) \\ \hat{I}(k) \end{bmatrix} + D \begin{bmatrix} T_{sp}(k) \\ T_{oa}(k) \end{bmatrix}$$

where $\hat{Q}_{HVAC}(k)$ is the predicted HVAC equipment load at time step k and $\hat{T}_{ia}(k)$, $\hat{T}_m(k)$, $\hat{I}(k)$, $T_{sp}(k)$, and $T_{oa}(k)$ are the same as the corresponding variables in the thermal mass storage model.

Process 1300 is shown to include optimizing an economic cost function subject to constraints on the predicted temperature of the building zone $\hat{T}_{ia}$ to determine optimal temperature setpoints $T_{sp}$ for the building zone at each time step of the optimization period (step 1308). An example of an objective function which can be optimized in step 1308 is shown in the following equation:

$$\min_{T_{sp}, \epsilon_T, \delta T_{sp}} \sum_{k=0}^{N-1} \left( r_{elec}(k) \hat{\ell}_{elec}(k) + p_{\epsilon_T} \epsilon_T(k) + p_{\delta T} \delta T_{sp}(k) \right)$$

where $r_{elec}(k)$ is the price of electricity at time step k, $\hat{\ell}_{elec}(k)$ is the predicted electricity consumption of HVAC equipment 308 at time step k, $\epsilon_T(k)$ is a number of degrees by which the zone temperature constraints are violated at time step k, $p_{\epsilon_T}$ is a zone air temperature penalty coefficient applied to $\epsilon_T(k)$, $\delta T_{sp}(k)$ is a number of degrees by which the zone temperature setpoint $T_{sp}$ changes between time step k−1 and time step k, and $p_{\delta T_{sp}}$ is a temperature setpoint change penalty coefficient applied to $\delta T_{sp}(k)$. Equation 24 accounts for the cost of electricity consumption ($r_{elec}(k) \hat{\ell}_{elec}(k)$), penalizes violations of the indoor air temperature bounds ($p_{\epsilon_T} \epsilon_T(k)$), and penalizes changes in the temperature setpoint ($p_{\delta T} \delta T_{sp}(k)$).

If additional resources (other than electricity) are consumed by HVAC equipment 308, additional terms can be added to the objective function to represent the cost of each resource consumed by HVAC equipment 308. For example, if HVAC equipment 308 consume natural gas and water in addition to electricity, the objective function can be updated to include the terms $r_{gas}(k) \hat{\ell}_{gas}(k)$ and $r_{water}(k) \hat{\ell}_{water}(k)$ in the summation, where $r_{gas}(k)$ is the cost per unit of natural gas at time step k, $\hat{\ell}_{gas}(k)$ is the predicted natural gas consumption of HVAC equipment 308 at time step k, $r_{water}(k)$ is the cost per unit of water at time step k, and $\hat{\ell}_{water}(k)$ is the predicted water consumption of HVAC equipment 308 at time step k.

In some embodiments, step 1308 includes estimating the amount of each resource consumed by HVAC equipment 308 (e.g., electricity, natural gas, water, etc.) as a function of the sensible heating or cooling load $\hat{Q}_{HVAC}$. In some embodiments, a constant efficiency model is used to compute the resource consumption of HVAC equipment 308 as a fixed multiple heating or cooling load $\hat{Q}_{HVAC}$ (e.g., $\hat{\ell}_{elec}(k) = \eta \hat{Q}_{HVAC}(k)$). In other embodiments, equipment models describing a relationship between resource consumption and heating/cooling production can be used to approximate the resource consumption of the HVAC equipment 308. The equipment models may account for variations in equipment efficiency as a function of load and/or other variables such as outdoor weather conditions (e.g., $\hat{\ell}_{elec}(k) = f(\hat{Q}_{HVAC}(k), T_{oa}(k), \eta_{base})$). Step 1308 can include converting the estimated heating/cooling load $\hat{Q}_{HVAC}(k)$ at each time step to one or more resource consumption values (e.g., $\hat{\ell}_{elec}(k)$, $\hat{\ell}_{gas}(k)$, $\hat{\ell}_{water}(k)$, etc.) for inclusion in the objective function.

Step 1308 can include optimizing the objective function to determine optimal values of the temperature setpoint $T_{sp}(k)$ for each time step in the optimization period. The objective function can be optimized subject to a set of constraints (e.g., Equations 25-34). The constraints may include the thermal mass storage model and the HVAC load model, which define the relationship between $\dot{Q}_{HVAC}$, the temperature setpoints $T_{sp}$, and the zone air temperature $T_{ia}$ at each time step. The constraints may also include constraints on the zone air temperature $T_{ia}(k)$ and constraints that define the penalty terms in the objective function.

In some embodiments, step 1308 includes performing the optimization at the beginning of each time step k to determine optimal temperature setpoints $T_{sp}(k)$ for the next N time steps. Once the optimal temperature setpoints $T_{sp}$ have been determined, the optimal temperature setpoint $T_{sp}(k)$ for the current time step k can be provided to smart thermostat 100 and/or equipment controller 406 and the optimization period can be shifted forward in time by one time step. The temperature setpoint $T_{sp}(k)$ for the current time step k along with feedback received from HVAC equipment 308 and building zone 310 during time step k (e.g., measurements of $T_{ia}(k)$, $T_{oa}(k)$, $\dot{Q}_{HVAC}(k)$, etc.) can be used to update the state/disturbance estimates the next time the optimization is performed. Steps 1304-1308 can be repeated at the beginning of each time step to determine the optimal setpoint trajectory $T_{sp}$ for the new (i.e., time shifted) optimization period.

Referring now to FIG. 14, a flowchart of a process 1400 for controlling the temperature of a building zone using model predictive control is shown, according to some embodiments. Process 1400 can be performed by one or more components of model predictive control systems 300-400, as described with reference to FIGS. 3-11. For example, process 1400 can be performed by model predictive controller 302, smart thermostat 100, equipment controller 406, and/or HVAC equipment 308 to control the temperature of building zone 310.

Process 1400 is shown to include identifying parameters of a thermal mass storage model and a HVAC load model for a building zone (step 1402). In some embodiments, step 1202 is performed by system identifier 510. Step 1402 can include generating a thermal mass storage model by modeling the heat transfer characteristics of the building zone using a thermal circuit 800, as described with reference to FIG. 8. Step 1402 may also include generating a HVAC load model by modeling the amount of heating/cooling $\dot{Q}_{HVAC}$ provided by HVAC equipment 308 as a function of the temperature setpoint $T_{sp}$ and the zone air temperature $T_{ia}$. The thermal mass storage model and the HVAC load model can be used to generate a system of differential equations that define the relationship between zone air temperature $T_{ia}$, zone mass temperature $T_m$, outdoor air temperature $T_{oa}$, the amount of heating or cooling $\dot{Q}_{HVAC}$ provided by HVAC equipment 308, the heat load disturbance $\dot{Q}_{other}$ and the temperature setpoint $T_{sp}$.

The unknown parameters in the thermal mass storage model and the HVAC load model (e.g., $R_{oi}$, $R_{mi}$, $C_m$, $C_{ia}$) can be organized into parameter matrices A, B, C, and D, as shown in the following equations:

$$\begin{bmatrix} \dot{T}_{ia} \\ \dot{T}_m \\ \dot{I} \end{bmatrix} = \begin{bmatrix} \frac{1}{C_{ia}}\left(K_{p,j} - \frac{1}{R_{mi}} - \frac{1}{R_{oi}}\right) & \frac{1}{C_{ia}R_{mi}} & -\frac{K_{p,j}K_{l,j}}{C_{ia}} \\ \frac{1}{C_m R_{mi}} & -\frac{1}{C_m R_{mi}} & 0 \\ -1 & 0 & 0 \end{bmatrix} \begin{bmatrix} T_{ia} \\ T_m \\ I \end{bmatrix} +$$

$$\begin{bmatrix} -\frac{K_{p,j}}{C_{ia}} & \frac{1}{C_{ia}R_{oi}} \\ 0 & 0 \\ 1 & 0 \end{bmatrix} \begin{bmatrix} T_{sp,j} \\ T_{oa} \end{bmatrix} + \begin{bmatrix} \frac{1}{C_{ia}} \\ 0 \\ 0 \end{bmatrix} \dot{Q}_{other}$$

$$\begin{bmatrix} T_{ia} \\ \dot{Q}_{HVAC,j} \end{bmatrix} = \begin{bmatrix} 1 & 0 & 0 \\ -K_{p,j} & 0 & K_{l,j} \end{bmatrix} \begin{bmatrix} T_{ia} \\ T_m \\ I \end{bmatrix} + \begin{bmatrix} 0 & 0 \\ K_{p,j} & 0 \end{bmatrix} \begin{bmatrix} T_{sp,j} \\ T_{oa} \end{bmatrix}$$

or more compactly:

$$\dot{x} = A_c(\theta)x + B_c(\theta)u + B_d d$$

$$y = C_c(\theta)x + D_c(\theta)u$$

where $x^T = [T_{ia}, T_m, I]$, $u^T = [T_{sp,j}, T_{oa}]$, $d = \dot{Q}_{other}/C_{ia}$, $y^T = [T_{ia}, \dot{Q}_{HVAC,j}]$, $\theta$ is a parameter vector containing all non-zero entries of the system matrices, and $$A_c(\theta) = \begin{bmatrix} -\theta_5(\theta_1 + \theta_2 + \theta_4) & \theta_5\theta_2 & \theta_3\theta_4\theta_5 \\ \theta_6\theta_2 & -\theta_6\theta_2 & 0 \\ -1 & 0 & 0 \end{bmatrix},$$

$$B_c(\theta) = \begin{bmatrix} \theta_1\theta_5 & \theta_4\theta_5 \\ 0 & 0 \\ 1 & 0 \end{bmatrix}, B_d = \begin{bmatrix} \theta_5 \\ 0 \\ 0 \end{bmatrix}, C_c(\theta) = \begin{bmatrix} 1 & 0 & 0 \\ -\theta_4 & 0 & \theta_3\theta_4 \end{bmatrix},$$

$$C_d(\theta) = \begin{bmatrix} 0 \\ 0 \end{bmatrix}, D_c(\theta) = \begin{bmatrix} 0 & 0 \\ \theta_4 & 0 \end{bmatrix}$$

The unknown parameters $\theta$ in the thermal mass storage model and the HVAC load model (i.e., the parameters in matrices A, B, C, and D) can be identified by fitting the parameters $\theta$ to a set of input-output data (e.g., sets of values $T_{ia}$, $T_{oa}$, $T_{sp}$, and $\dot{Q}_{HVAC}$) collected from the HVAC system when operating in the system identification mode. In some embodiments, the input-output data are collected by modulating the temperature setpoint $T_{sp}$ and observing the corresponding values of $T_{ia}$, $T_{oa}$, and $\dot{Q}_{HVAC}$ for a plurality of time steps during the system identification mode. The process of fitting the model parameters $\theta$ to the set of input-output data can be accomplished by performing process 900, as described with reference to FIG. 9.

If HVAC equipment 308 are staged, step 1402 can include filtering input-output data to remove the high frequency dither in the indoor air temperature $T_{ia}$ and can compute a time-averaged version of the HVAC load $\dot{Q}_{HVAC}$ from the discrete HVAC staging trajectory. The thermal model parameters and HVAC load model parameters $\theta$ can then be fit to the input-output data (or filtered input-output data). In some embodiments, step 1402 includes augmenting the resulting state-space model with another integrating disturbance model and estimating the Kalman filter gain for the resulting model. Using data obtained in a secondary experiment or under normal operation, step 1402 can include validating the model through the use of statistics that capture the multi-step prediction accuracy of the resulting model.

Still referring to FIG. 14, process 1400 is shown to include predicting a heat load disturbance $\dot{Q}_{other}$ experienced by a building zone at each time step (k=0 . . . N-1) of an optimization period (step 1404). In some embodiments, step 1404 is performed by load/rate predictor 518 and state/disturbance predictor 520. Step 1404 can include generating a disturbance estimate $\hat{d}(k)$ for each time step k in the optimization period. In some embodiments, step 1404 includes estimating the disturbance state $\hat{d}(k)$ at each time step k in the optimization period using the following state/disturbance model:

$$\begin{bmatrix} \hat{T}_{ia}(k+1|k) \\ \hat{T}_m(k+1|k) \\ \hat{I}(k+1|k) \\ \hat{d}(k+1|k) \end{bmatrix} = A_{aug} \begin{bmatrix} \hat{T}_{ia}(k|k-1) \\ \hat{T}_m(k|k-1) \\ \hat{I}(k|k-1) \\ \hat{d}(k|k-1) \end{bmatrix} +$$

$$B_{aug} \begin{bmatrix} T_{sp}(k) \\ T_{oa}(k) \end{bmatrix} + \begin{bmatrix} K_x \\ K_d \end{bmatrix} \left( \begin{bmatrix} T_{ia}(k) \\ \dot{Q}_{HVAC}(k) \end{bmatrix} - \begin{bmatrix} \hat{T}_{ia}(k|k-1) \\ \dot{\hat{Q}}_{HVAC}(k|k-1) \end{bmatrix} \right)$$

$$\begin{bmatrix} \hat{T}_{ia}(k|k-1) \\ \dot{\hat{Q}}_{HVAC}(k|k-1) \end{bmatrix} = C_{aug} \begin{bmatrix} \hat{T}_{ia}(k|k-1) \\ \hat{T}_m(k|k-1) \\ \hat{I}(k|k-1) \\ \hat{d}(k|k-1) \end{bmatrix} + D \begin{bmatrix} T_{sp}(k) \\ T_{oa}(k) \end{bmatrix}$$

where $$A_{aug} = \begin{bmatrix} A & B_d \\ 0 & I \end{bmatrix}, B_{aug} = \begin{bmatrix} B \\ 0 \end{bmatrix}, C_{aug} = [C \ 0].$$

Step 1404 can include recording a history of disturbance estimates $\hat{d}_{hist} := \{\hat{d}(k|k-1)\}_{k=1}^{N_{hist}}$ predicted by the state/disturbance model.

Step 1404 can include using the history of disturbance estimates $\hat{d}_{hist}$ to predict the value of $\dot{\hat{Q}}_{other}(k)$ at each time step k. In some embodiments, the heat load disturbance $\dot{\hat{Q}}_{other}(k)$ is a function of the time of day, the day type (e.g., weekend, weekday, holiday), the weather forecasts, building occupancy, and/or other factors which can be used by load/rate predictor 518 to predict the heat load disturbance $\dot{\hat{Q}}_{other}(k)$. For example, step 1404 can include predicting the heat load disturbance using the equation:

$$\dot{\hat{Q}}_{other}(k) = f_{pred}(k\Delta + t_0, \hat{d}_{hist})$$

where $\Delta > 0$ is the sample period and $t_0$ is an initial time. In some embodiments, step 1404 includes using weather forecasts from a weather service 526 and/or load history data from historical data 528 to predict the heat load disturbance $\dot{\hat{Q}}_{other}$ (k) at each time step.

In some embodiments, step 1404 includes using a deterministic plus stochastic model trained from historical load data to predict the heat load disturbance $\dot{\hat{Q}}_{other}(k)$. Step 1404 can include using any of a variety of prediction methods to predict the heat load disturbance $\dot{\hat{Q}}_{other}(k)$ (e.g., linear regression for the deterministic portion and an AR model for the stochastic portion). In some embodiments, step 1404 includes predicting the heat load disturbance $\dot{\hat{Q}}_{other}(k)$ using the techniques described in U.S. patent application Ser. No. 14/717,593.

Still referring to FIG. 14, process 1400 is shown to include generating an economic cost function that accounts for a cost of resources consumed by HVAC equipment at each time step (k=0 . . . N−1) of an optimization period (step 1406). An example of an objective function which can be generated in step 1406 is shown in the following equation:

$$\min_{T_{sp}, \epsilon_T, \delta T_{sp}} \sum_{k=0}^{N-1} \left( r_{elec}(k) \hat{\ell}_{elec}(k) + p_{\epsilon_T} \epsilon_T(k) + p_{\delta T} \delta T_{sp}(k) \right)$$

where $r_{elec}(k)$ is the price of electricity at time step k, $\hat{\ell}_{elec}(k)$ is the predicted electricity consumption of HVAC equipment 308 at time step k, $\epsilon_T(k)$ is a number of degrees by which the zone temperature constraints are violated at time step k, $p_{\epsilon_T}$ is a zone air temperature penalty coefficient applied to $\epsilon_T(k)$, $\delta T_{sp}(k)$ is a number of degrees by which the zone temperature setpoint $T_{sp}$ changes between time step k−1 and time step k, and $p_{\delta T_{sp}}$ is a temperature setpoint change penalty coefficient applied to $\delta T_{sp}(k)$. Equation 24 accounts for the cost of electricity consumption ($r_{elec}(k) \hat{\ell}_{elec}(k)$), penalizes violations of the indoor air temperature bounds ($p_{\epsilon_T} \epsilon_T(k)$), and penalizes changes in the temperature setpoint ($p_{\delta T} \delta T_{sp}(k)$).

If additional resources (other than electricity) are consumed by HVAC equipment 308, additional terms can be added to the objective function to represent the cost of each resource consumed by HVAC equipment 308. For example, if HVAC equipment 308 consume natural gas and water in addition to electricity, the objective function can be updated to include the terms $r_{gas}(k) \hat{\ell}_{gas}(k)$ and $r_{water}(k) \hat{\ell}_{water}(k)$ in the summation, where $r_{gas}(k)$ is the cost per unit of natural gas at time step k, $\hat{\ell}_{gas}(k)$ is the predicted natural gas consumption of HVAC equipment 308 at time step k, $r_{water}(k)$ is the cost per unit of water at time step k, and $\hat{\ell}_{water}(k)$ is the predicted water consumption of HVAC equipment 308 at time step k.

In some embodiments, step 1406 includes estimating the amount of each resource consumed by HVAC equipment 308 (e.g., electricity, natural gas, water, etc.) as a function of the sensible heating or cooling load $\dot{\hat{Q}}_{HVAC}$. In some embodiments, a constant efficiency model is used to compute the resource consumption of HVAC equipment 308 as a fixed multiple heating or cooling load $\dot{\hat{Q}}_{HVAC}$ (e.g., $\hat{\ell}_{elec}(k) = \eta \dot{\hat{Q}}_{HVAC}(k)$). In other embodiments, equipment models describing a relationship between resource consumption and heating/cooling production can be used to approximate the resource consumption of the HVAC equipment 308. The equipment models may account for variations in equipment efficiency as a function of load and/or other variables such as outdoor weather conditions (e.g., $\hat{\ell}_{elec}(k) = f(\dot{\hat{Q}}_{HVAC}(k), T_{oa}(k), \eta_{base}))$. Step 1406 can include converting the estimated heating/cooling load $\dot{\hat{Q}}_{HVAC}(k)$ at each time step to one or more resource consumption values (e.g., $\hat{\ell}_{elec}(k)$, $\hat{\ell}_{gas}(k)$, $\hat{\ell}_{water}(k)$, etc.) for inclusion in the objective function.

Still referring to FIG. 14, process 1400 is shown to include estimating initial system states $\hat{x}(0)$ for a first time step (k=0) of the optimization period (step 1408). The initial system states $\hat{x}(0)$ may include the estimated zone air temperature $\hat{T}_{ia}(0)$, the estimated zone mass temperature $\hat{T}_m(0)$, and the estimated integrating disturbance $\hat{I}(0)$ at the beginning of the optimization period. In some embodiments, step 1408 is performed by state/disturbance estimator 520. The initial system states $\hat{x}(0)$ can be estimated using same the state/disturbance estimation model used in step 1404. For example, step 1408 can include estimating the system states $\hat{x}(k)$ at each time step k using the following equation:

$$\hat{x}(k+1|k) = A\hat{x}(k|k-1) + Bu(k) + K(y(k) - \hat{y}(k|k-1))$$

$$\hat{y}(k|k-1) = C\hat{x}(k|k-1) + Du(k)$$

where $\hat{x}(k+1|k)$ is the estimated/predicted state at time step k+1 given the measurement at time step k, $\hat{y}(k|k-1)$ is the predicted output at time step k given the measurement at time step k−1, and K is the estimator gain.

In some embodiments, the estimated state vector $\hat{x}(k+1|k)$, the output vector $\hat{y}(k|k-1)$, and the input vector u(k) are defined as follows:

$$\hat{x}(k+1|k) = \begin{bmatrix} \hat{T}_{ia}(k+1|k) \\ \hat{T}_m(k+1|k) \\ \hat{I}(k+1|k) \end{bmatrix}, \hat{y}(k|k-1) = \begin{bmatrix} \hat{T}_{ia}(k|k-1) \\ \hat{Q}_{HVAC}(k|k-1) \end{bmatrix},$$

$$u(k) = \begin{bmatrix} T_{sp}(k) \\ T_{oa}(k) \end{bmatrix}$$

where $\hat{T}_{ia}$ is an estimate of the zone air temperature $T_{ia}$, $\hat{T}_m$ is an estimate of the zone mass temperature $T_m$, $\hat{I}$ is an estimate of the integrating disturbance I, $\hat{Q}_{HVAC}$ is an estimate of the heating or cooling load provided by HVAC equipment 308, $T_{sp}$ is the temperature setpoint, and $T_{oa}$ is the outdoor air temperature. The estimated system states $\hat{x}(0)$ at the first time step k=0 can be used as the initial system states.

Still referring to FIG. 14, process 1400 is shown to include using a thermal mass storage predictive model to constrain system states $\hat{x}(k+1|k)$ at time step k+1 to the system states (k) and the temperature setpoint $T_{sp}(k)$ at time step k (step 1410). An example of a constraint which can be generated based on the thermal mass storage predictive model is:

$$\begin{bmatrix} \hat{T}_{ia}(k+1) \\ \hat{T}_m(k+1) \\ \hat{I}(k+1) \end{bmatrix} = A \begin{bmatrix} \hat{T}_{ia}(k) \\ \hat{T}_m(k) \\ \hat{I}(k) \end{bmatrix} + B \begin{bmatrix} T_{sp}(k) \\ T_{oa}(k) \end{bmatrix} + B_d \hat{Q}_{other}(k)$$

where $\hat{T}_{ia}(k+1)$ is the predicted temperature of the building zone at time step k+1, $\hat{T}_m(k+1)$ is the predicted temperature of the building mass at time step k+1, $\hat{I}(k+1)$ is the predicted value of the integrating disturbance at time step k+1, $\hat{T}_{ia}(k)$ is the predicted temperature of the building zone at time step k, $\hat{T}_m(k)$ is the predicted temperature of the building mass at time step k, $\hat{I}(k)$ is the predicted value of the integrating disturbance at time step k, $T_{sp}(k)$ is the temperature setpoint at time step k, $T_{oa}(k)$ is the outdoor air temperature (measured) at time step k, and $\hat{Q}_{other}(k)$ is the estimated heat load disturbance at time step k.

Process 1400 is shown to include using a HVAC load predictive model to constrain the HVAC equipment load $\hat{Q}_{HVAC}(k)$ at time step k to systems states (k) and the temperature setpoint $T_{sp}(k)$ at time step k (step 1412). An example of a constraint which can be generated based on the HVAC load model is:

$$\left[ \hat{Q}_{HVAC}(k) \right] = C \begin{bmatrix} \hat{T}_{ia}(k) \\ \hat{T}_m(k) \\ \hat{I}(k) \end{bmatrix} + D \begin{bmatrix} T_{sp}(k) \\ T_{oa}(k) \end{bmatrix}$$

where $\hat{Q}_{HVAC}(k)$ is the predicted HVAC equipment load at time step k and $\hat{T}_{ia}(k)$, $\hat{T}_m(k)$, $\hat{I}(k)$, $T_{sp}(k)$, and $T_{oa}(k)$ are the same as the corresponding variables in the thermal mass storage model.

Still referring to FIG. 14, process 1400 is shown to include optimizing the economic cost function subject to constraints defined by the predictive models and constraints on the predicted zone temperature $\hat{T}_{ia}(k)$ to determine optimal temperature setpoints $T_{sp}$ for the building zone for each time step (k=0 . . . N−1) of the optimization period (step 1414). The objective function can be optimized subject to a set of constraints (e.g., Equations 25-34). The constraints may include the thermal mass storage model and the HVAC load model, which define the relationship between $\hat{Q}_{HVAC}$, the temperature setpoints $T_{sp}$, and the zone air temperature $T_{ia}$ at each time step. The constraints may also include constraints on the zone air temperature $T_{ia}(k)$ and constraints that define the penalty terms in the objective function. The optimization performed in step 1414 may generate a temperature setpoint $T_{sp}(k)$ for each time step in the optimization period.

Process 1400 is shown to include providing the temperature setpoint $T_{sp}$ for the first time step (k=0) of the optimization period to an equipment controller (step 1416). Step 1416 can include sending the optimal temperature setpoints $T_{sp}$ from model predictive controller 302 to an equipment controller 406. In some embodiments, both model predictive controller 302 and equipment controller 406 are components of a smart thermostat 100 (as shown in FIG. 4). In other embodiments, model predictive controller 302 is separate from smart thermostat 100 and configured to send the optimal temperature setpoints to smart thermostat 100 via a communications network 304 (as shown in FIG. 3). In some embodiments, only the temperature setpoint for the first time step (i.e., $T_{sp}(0)$) is provided to the equipment controller in step 1416. The remaining temperature setpoints are for future time steps and may be updated the next time the optimization is performed (e.g., at the beginning of the next time step).

In some embodiments, step 1416 includes providing the entire set of temperature setpoints $T_{sp}$ (i.e., a temperature setpoint $T_{sp}(k)$ for each time step k) to the equipment controller. In the event that communication between model predictive controller 302 and equipment controller 406 is lost (e.g., network connectivity is disrupted), equipment controller 406 can use the set of temperature setpoints provided in step 1416 until communications between model predictive controller 302 and equipment controller 406 are restored. For example, equipment controller 406 can use each temperature setpoint $T_{sp}(k)$ received in step 1416 to control HVAC equipment 308 during the corresponding time step k until communications between model predictive controller 302 and equipment controller 406 are restored.

Still referring to FIG. 14, process 1400 is shown to include using feedback collected from the HVAC system during the first time step (k=0) to update the thermal mass storage predictive model (step 1418). The feedback collected from the HVAC system may include measurements of the zone air temperature $T_{ia}$ and/or measurements of the HVAC equipment load $\dot{Q}_{HVAC}$. Step 1418 may include calculating the difference between the value of the zone air temperature $\hat{T}_{ia}(k|k-1)$ predicted in step 1408 and the actual measured value of the zone air temperature $T_{ia}(k)$ collected in step 1418. Similarly, step 1418 may include calculating the difference between the value of the HVAC equipment load $\hat{\dot{Q}}_{HVAC}(k|k-1)$ predicted in step 1408 and the actual measured value of the HVAC equipment load $\dot{Q}_{HVAC}(k)$ collected in step 1418.

The updating performed in step 1418 may include multiplying the Kalman gain matrix K generated in step 1402 by the vector of differences, as shown in the following equation:

$$\begin{bmatrix} \hat{T}_{ia}(k+1|k) \\ \hat{T}_m(k+1|k) \\ \hat{I}(k+1|k) \\ \hat{d}(k+1|k) \end{bmatrix} = A_{aug} \begin{bmatrix} \hat{T}_{ia}(k|k-1) \\ \hat{T}_m(k|k-1) \\ \hat{I}(k|k-1) \\ \hat{d}(k|k-1) \end{bmatrix} +$$

$$B_{aug}\begin{bmatrix} T_{sp}(k) \\ T_{oa}(k) \end{bmatrix} + \begin{bmatrix} K_x \\ K_d \end{bmatrix} \left( \begin{bmatrix} T_{ia}(k) \\ \dot{Q}_{HVAC}(k) \end{bmatrix} - \begin{bmatrix} \hat{T}_{ia}(k|k-1) \\ \hat{\dot{Q}}_{HVAC}(k|k-1) \end{bmatrix} \right)$$

In some embodiments, the updating performed in step 1418 is equivalent to the updating step of a Kalman filter in which the predicted states $\hat{x}(k+1|k)$ are calculated based on the error between the predicted system output $\hat{y}(k|k-1)$ at time step k and the actual/measured values of the predicted output variables y(k).

Process 1400 is shown to include shifting the optimization forward in time by one time step (step 1420) and returning to step 1408. Steps 1408-1420 can be repeated at the beginning of each time step to generate a set of temperature setpoints $T_{sp}$ for each time step in the shifted optimization period. The first temperature setpoint $T_{sp}(0)$ generated for the shifted optimization period can be provided to the equipment controller and used to control the HVAC equipment.

Performance Graphs

Referring now to FIGS. 15-18, several graphs 1500-1800 illustrating the performance of model predictive control (MPC) systems 300-400 are shown, according to some embodiments. Graph 1500 compares the energy consumption of MPC systems 300-400 to the energy consumption of a baseline temperature control system without MPC. Graph 1600 indicates the cost of electricity (i.e., $/kWh) which varies over time. Line 1502 represents the energy consumption of the baseline system, whereas line 1504 represents the energy consumption of MPC systems 300-400. MPC systems 300-400 use more energy than the baseline system during an off-peak period 1506 when energy prices are low. However, MPC systems 300-400 use less energy than the baseline system during a peak period 1508 when energy prices are high. Advantageously, this results in a cost savings relative to the baseline system.

Graph 1700 compares the building mass temperature trajectories of the baseline system and MPC systems 300-400. Line 1702 represents the temperature $T_m$ of the solid mass within building zone 310 when the baseline system is used to provide temperature control. Since the baseline system does not store energy in the building mass, the temperature $T_m$ remains relatively constant over the duration of the optimization period. Line 1704 represents the temperature $T_m$ of the solid mass within building zone 310 when MPC systems 300-400 are used to provide temperature control. During the off-peak period 1506, building zone 310 is precooled, which results in a decrease in the temperature $T_m$ of the building mass. During the peak period 1508, thermal energy from the air within building zone 310 is moved into the building mass, which increases the temperature $T_m$ of the building mass and provides cooling for the air within building zone 310.

Graph 1800 compares the zone air temperature trajectories of the baseline system and MPC systems 300-400. Line 1802 represents the temperature $T_{ia}$ of the air within building zone 310 when the baseline system is used to provide temperature control. The temperature $T_{ia}$ remains relatively constant over the duration of the optimization period. Line 1704 represents the zone air temperature $T_{ia}$ within building zone 310 when MPC systems 300-400 are used to provide temperature control. During the off-peak period 1506, building zone 310 is precooled to the minimum comfortable zone temperature $T_{min}$ (e.g., 70° F.). The zone air temperature $T_{ia}$ remains relatively constant during the off-peak period 1506, but the temperature of the building mass $T_m$ decreases as heat is removed from building zone 310. During the peak period 1508, the building zone temperature $T_{ia}$ is allowed to increase to the maximum comfortable zone temperature $T_{max}$ (e.g., 76° F.). Heat from the air within building zone 310 flows into the building mass, which provides cooling for the air within building zone 310 and increases the temperature of the building mass $T_m$.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A thermostat for monitoring and controlling temperature of a building zone, the thermostat comprising:
a base configured to attach to a mounting surface upon which the thermostat is mounted;
an equipment controller physically coupled to the base and configured to drive the temperature of the building zone to an optimal temperature setpoint by operating HVAC equipment to provide heating or cooling to the building zone, wherein operating the HVAC equipment causes the HVAC equipment to add heat to the building zone or remove heat from the building zone, thereby affecting the temperature of the building zone; and
a model predictive controller physically coupled to the base and configured to determine the optimal temperature setpoint by:
generating a cost function that accounts for a cost operating the HVAC equipment during each of a plurality of time steps in an optimization period;
using a predictive model to predict the temperature of the building zone during each of the plurality of time steps, wherein the predictive model comprises a thermal mass storage model that defines the temperature of the building zone as a function of at least one of:
heat transfer between air within the building zone and solid mass within the building zone;
heat transfer between the building zone and the HVAC equipment; and
an unmeasured heat load disturbance; and
optimizing the cost function subject to a constraint on the predicted temperature of the building zone to determine optimal temperature setpoints for each of the plurality of time steps.

2. The thermostat of claim 1, wherein the model predictive controller is configured to determine the cost of operating the HVAC equipment during each of the plurality of time steps using a set of time-varying utility rates comprising a utility rate value for each time step;
wherein the time-varying utility rates are received from a utility provider or predicted by the model predictive controller.

3. The thermostat of claim 1, wherein the model predictive controller is configured to predict the temperature of the building zone during each of the plurality of time steps as a function of a temperature setpoint trajectory comprising a temperature setpoint for each of the plurality of time steps.

4. The thermostat of claim 1, wherein the model predictive controller is configured to optimize the cost function subject to a constraint on the optimal temperature setpoints that limits the optimal temperature setpoints within a temperature setpoint range.

5. The thermostat of claim 1, wherein the model predictive controller is configured to generate the predictive model by performing a system identification process comprising:
modulating the temperature setpoint within a constrained temperature setpoint range;
collecting a set of input-output data comprising values of the temperature setpoint and values of the temperature of the building zone that result from modulating the temperature setpoint during each of a plurality of time steps during a learning period; and
fitting parameters of the predictive model to the set of input-output data.

6. The thermostat of claim 1, wherein the model predictive controller is configured to predict a value of the unmeasured heat load disturbance experienced by the building zone at each of the plurality of time steps in the optimization period.

7. The thermostat of claim 1, wherein the predictive model comprises an HVAC load model that defines the heating or cooling provided by the HVAC equipment as a function of the temperature of the building zone and the temperature setpoint.

8. The thermostat of claim 1, wherein the model predictive controller is configured to predict the cost of operating the HVAC equipment as a function of an amount of the heating or cooling provided by the HVAC equipment at each time step of the optimization period.

9. The thermostat of claim 1, wherein the constraint on the predicted temperature of the building zone requires the model predictive controller to maintain the predicted temperature of the building zone within:
a first zone temperature range during a first time step of the optimization period; and
a second zone temperature range, different from the first zone temperature range, during another time step of the optimization period subsequent to the first time step.

10. A method performed by a thermostat for a building zone for monitoring and controlling temperature of the building zone, the method comprising:
attaching a base of the thermostat to a mounting surface upon which the thermostat is mounted and physically coupling the base to a processing circuit of the thermostat;
generating, by the processing circuit, a cost function that accounts for a cost operating HVAC equipment during each of a plurality of time steps in an optimization period;
using, by the processing circuit, a predictive model to predict the temperature of the building zone during each of the plurality of time steps, wherein the predictive model comprises a thermal mass storage model that defines the temperature of the building zone as a function of at least one of:
heat transfer between air within the building zone and solid mass within the building zone;
heat transfer between the building zone and the HVAC equipment; and
an unmeasured heat load disturbance;
optimizing, by the processing circuit, the cost function subject to a constraint on the predicted temperature of the building zone to determine optimal temperature setpoints for each of the plurality of time steps; and operating, by the processing circuit, HVAC equipment to provide heating or cooling to the building zone to drive the temperature of the building zone to the optimal temperature setpoints, wherein operating the HVAC equipment causes the HVAC equipment to add heat to the building zone or remove heat from the building zone, thereby affecting the temperature of the building zone.

11. The method of claim 10, further comprising:
receiving a set of time-varying utility rates from a utility provider or predicting the time-varying utility rates, the set of time-varying utility rates comprising a utility rate value for each time step; and
determining the cost of operating the HVAC equipment during each of the plurality of time steps using the set of time-varying utility rates.

12. The method of claim 10, wherein using the predictive model to predict the temperature of the building zone comprises predicting the temperature of the building zone during each of the plurality of time steps as a function of a temperature setpoint trajectory comprising a temperature setpoint for each of the plurality of time steps.

13. The method of claim 10, wherein optimizing the cost function comprises optimizing the cost function subject to a constraint on the optimal temperature setpoints that limits the optimal temperature setpoints within a temperature setpoint range.

14. The method of claim 10, further comprising generating the predictive model by performing a system identification process comprising:
modulating the temperature setpoint within a constrained temperature setpoint range;
collecting a set of input-output data comprising values of the temperature setpoint and values of the temperature of the building zone that result from modulating the temperature setpoint during each of a plurality of time steps during a learning period; and
fitting parameters of the predictive model to the set of input-output data.

15. The method of claim 10, further comprising predicting a value of the unmeasured heat load disturbance experienced by the building zone at each of the plurality of time steps in the optimization period.

16. The method of claim 10, wherein the predictive model comprises an HVAC load model that defines the heating or cooling provided by the HVAC equipment as a function of the temperature of the building zone and the temperature setpoint.

17. The method of claim 10, further comprising predicting the cost of operating the HVAC equipment as a function of an amount of the heating or cooling provided by the HVAC equipment at each time step of the optimization period.

18. A thermostat for monitoring and controlling temperature of a building zone, the thermostat comprising:
a base configured to attach to a mounting surface upon which the thermostat is mounted;
an equipment controller physically coupled to the base and configured to drive the temperature of the building zone to a zone temperature setpoint by operating HVAC equipment to provide heating or cooling to the building zone, wherein operating the HVAC equipment causes the HVAC equipment to add heat to the building zone or remove heat from the building zone, thereby affecting the temperature of the building zone; and
a model predictive controller physically coupled to the base and configured to determine the zone temperature setpoint by:
generating a cost function that accounts for a cost operating the HVAC equipment during each of a plurality of time steps in an optimization period;
using a predictive model to predict the temperature of the building zone during each of the plurality of time steps, wherein the predictive model comprises a thermal mass storage model that defines the temperature of the building zone as a function of at least one of:
heat transfer between air within the building zone and solid mass within the building zone;
heat transfer between the building zone and the HVAC equipment; and
an unmeasured heat load disturbance; and
performing an optimization of the cost function subject to a constraint on the predicted temperature of the building zone to determine a temperature setpoint trajectory comprising a temperature setpoint value for each of the plurality of time steps.

* * * * *